US012434276B2

(12) United States Patent
McDonnell

(10) Patent No.: US 12,434,276 B2
(45) Date of Patent: Oct. 7, 2025

(54) CLEANER APPARATUS

(71) Applicant: Joseph McDonnell, Miramar, FL (US)

(72) Inventor: Joseph McDonnell, Miramar, FL (US)

(73) Assignee: IFLO LLC, Miramar, FL (US)

(*) Notice: Subject to any disclaimer, the term of this patent is extended or adjusted under 35 U.S.C. 154(b) by 0 days.

(21) Appl. No.: 19/178,135

(22) Filed: Apr. 14, 2025

(65) Prior Publication Data

US 2025/0249490 A1 Aug. 7, 2025

Related U.S. Application Data

(63) Continuation of application No. 18/305,817, filed on Apr. 24, 2023, now Pat. No. 12,275,045, which is a continuation of application No. 18/049,694, filed on Oct. 26, 2022, now Pat. No. 11,654,462.

(51) Int. Cl.
*B08B 9/032* (2006.01)
*F24F 13/22* (2006.01)

(52) U.S. Cl.
CPC ............ *B08B 9/0325* (2013.01); *F24F 13/22* (2013.01); *F24F 2221/225* (2013.01)

(58) Field of Classification Search
CPC .................................................... B08B 9/0325
See application file for complete search history.

(56) References Cited

U.S. PATENT DOCUMENTS 4,962,778 A 10/1990 Driskill
5,402,813 A 4/1995 Keen
5,514,344 A 5/1996 D'Agaro
6,487,867 B1 12/2002 Herren
7,392,658 B1 7/2008 Hardy, III
7,686,034 B1 3/2010 Coogle
8,277,745 B2 10/2012 Mehus et al.
(Continued)

FOREIGN PATENT DOCUMENTS

CN 107477680 A 12/2017
CN 108302631 A 7/2018
(Continued)

OTHER PUBLICATIONS

International Preliminary Report on Patentability dated May 8, 2025 for corresponding International Application No. PCT/US2023/019761.

(Continued)

*Primary Examiner* — Jason Y Ko
(74) *Attorney, Agent, or Firm* — Harness, Dickey & Pierce, P.L.C.

(57) ABSTRACT

A cleaner apparatus includes an apparatus housing; a spray outlet assembly extending from the apparatus housing and configured to be directly exposed to an interior of a separate device; a pump device configured to pump an amount of cleaning composition through the spray outlet assembly to spray the amount as a fluid stream; a controller configured to operate the pump device to cause the amount to be pumped through the spray outlet assembly without manual intervention; and a structure connector that is configured to at least partially hold the cleaner apparatus in place in relation to an opening in the separate device housing, such that the apparatus housing is external to the separate device, and the spray outlet assembly is at least partially inserted through the opening to extend from the apparatus housing to the separate device interior.

20 Claims, 23 Drawing Sheets

(56) References Cited

U.S. PATENT DOCUMENTS

| | | | |
|---|---|---|---|
| 8,840,729 | B1 | 9/2014 | Herren et al. |
| 9,289,803 | B1 | 3/2016 | Parks |
| 9,943,778 | B1 | 4/2018 | Gutierrez et al. |
| 9,975,152 | B1 | 5/2018 | McClarren |
| 10,006,656 | B1 | 6/2018 | Parks |
| 10,514,182 | B1 | 12/2019 | Oviedo |
| 11,285,520 | B2 | 3/2022 | McDonald et al. |
| 12,083,238 | B1 | 9/2024 | Thompson |
| 2003/0010381 | A1 | 1/2003 | Kimbrough et al. |
| 2005/0269418 | A1 | 12/2005 | Fuller |
| 2006/0038863 | A1 | 2/2006 | Piccinino et al. |
| 2006/0237806 | A1 | 10/2006 | Martin et al. |
| 2007/0224050 | A1 | 9/2007 | Ward |
| 2009/0064698 | A1 | 3/2009 | Spanger |
| 2009/0165868 | A1 | 7/2009 | Pearson |
| 2010/0147876 | A1 | 6/2010 | Mehus et al. |
| 2013/0146094 | A1 | 6/2013 | Riefenstein et al. |
| 2014/0075967 | A1 | 3/2014 | Arensmeier et al. |
| 2014/0109988 | A1 | 4/2014 | Oakner et al. |
| 2015/0048034 | A1 | 2/2015 | Reinolds |
| 2017/0045282 | A1 | 2/2017 | Thornberry, Jr. |
| 2018/0112889 | A1 | 4/2018 | Barker et al. |
| 2018/0259222 | A1 | 9/2018 | Murphy |
| 2019/0337027 | A1 | 11/2019 | Raynes, II |
| 2019/0353367 | A1 | 11/2019 | Atchison |
| 2020/0181898 | A1 | 6/2020 | Huitron |
| 2021/0239356 | A1 | 8/2021 | Thompson |

FOREIGN PATENT DOCUMENTS

| | | | |
|---|---|---|---|
| CN | 111256274 | A | 6/2020 |
| CN | 113007787 | A | 6/2021 |
| KR | 2010-0083913 | A | 7/2010 |
| WO | 2011/075324 | A1 | 6/2011 |
| WO | 2012/164289 | A1 | 12/2012 |

OTHER PUBLICATIONS

International Search Report and Written Opinion thereof dated Aug. 3, 2023 for corresponding International Application No. PCT/US2023/019761.

Request for Ex Parte Reexamination of U.S. Pat. No. 11,719,464, filed on Nov. 21, 2024 in U.S. Appl. No. 90/019,736.

CLEANER APPARATUS

CROSS-REFERENCE TO RELATED APPLICATIONS

This is a continuation of U.S. application Ser. No. 18/305,817, filed on Apr. 24, 2023, which is a continuation application of U.S. application Ser. No. 18/049,694, filed Oct. 26, 2022, the entire contents of each of which are incorporated herein by reference.

BACKGROUND

Field

The present disclosure relates generally to air-conditioning systems, and more particularly to providing cleaner chemical compositions to clean surfaces of air-conditioning systems without manual intervention.

Description of Related Art

Air-conditioning systems may include an air handler, also referred to as an air handling unit (AHU) that may circulate and cool air within a space and/or structure. An air handler may move air, via operation of an air mover such as a blower or fan, to flow in thermal communication with a heat exchanger such as an air coil. The air handler may circulate a refrigerant through the heat exchanger to absorb (e.g., remove) heat from the flow of air to cool the air, and the air-conditioning system may circulate the refrigerant through a heat exchanger to discharge the absorbed heat into a heat sink (e.g., the ambient environment).

SUMMARY

According to some example embodiments, a cleaner apparatus for spraying a cleaning composition may include an apparatus housing at least partially defining an interior of the cleaner apparatus. The cleaner apparatus may include a spray outlet assembly extending from the apparatus housing to an exterior of the apparatus housing, the spray outlet assembly configured to be directly exposed to an interior of a separate device. The cleaner apparatus may include a pump device configured to pump an amount of the cleaning composition through the spray outlet assembly such that the spray outlet assembly is configured to spray the amount of the cleaning composition as a fluid stream. The cleaner apparatus may include a controller configured to operate the pump device to cause the amount of the cleaning composition to be pumped through the spray outlet assembly without manual intervention. The cleaner apparatus may include a structure connector that is configured to connect the cleaner apparatus to an external structure to at least partially hold the cleaner apparatus in place in relation to an opening in a housing of the separate device, such that the apparatus housing of the cleaner apparatus is external to the separate device, and the spray outlet assembly is at least partially inserted into the interior of the separate device through the opening in the housing of the separate device, such that the spray outlet assembly extends from the apparatus housing external to the separate device and through the opening in the housing of the separate device to the interior of the separate device.

According to some example embodiments, a heat exchanger cleaner apparatus for spraying a cleaning composition into an air handler of an air conditioning system to contact with an outer surface of a heat exchanger of the air handler may include a spray outlet assembly, a pump device, a connector interface, and a controller. The spray outlet assembly may be configured to be inserted into an interior of the air handler to be directly exposed to the outer surface of the heat exchanger. The pump device may be configured to be operated to pump an amount of the cleaning composition through the spray outlet assembly such that the spray outlet assembly sprays the amount of the cleaning composition as a fluid stream at least partially contacting the outer surface of the heat exchanger. The connector interface may be configured to detachably couple with a complementary connector interface of a cartridge having a cartridge reservoir configured to hold the cleaning composition, to establish flow communication between the cartridge reservoir and the pump device, such that the pump device is in fluid communication between the connector interface and the spray outlet assembly, and the pump device is configured to be operated to pump the amount of the cleaning composition from the cartridge reservoir and through the spray outlet assembly. The controller may be configured to operate the pump device to cause the amount of the cleaning composition to be supplied through the spray outlet assembly without manual intervention.

The spray outlet assembly may include a conduit and a spray nozzle. The conduit may have a proximate end and a distal end, the proximate end coupled in fluid communication with an outlet of the pump device, the conduit configured to extend at least from the proximate end and through an opening in an outer housing of the air handler into the interior of the air handler such that the distal end of the conduit is within the interior of the air handler. The spray nozzle may be coupled to the distal end of the conduit and configured to spray the amount of the cleaning composition to spray the amount of the cleaning composition as the fluid stream at least partially contacting the outer surface of the heat exchanger.

The conduit may include a plurality of structures coupled in series between the spray nozzle and the pump device.

The connector interface of the heat exchanger cleaner apparatus or the complementary connector interface of the cartridge may include a check valve that is configured to open in response to the connector interface of the heat exchanger cleaner apparatus coupling with the complementary connector interface of the cartridge to establish the fluid communication between the cartridge reservoir and the pump device.

The heat exchanger cleaner apparatus may include an internal reservoir that is in fluid communication between the check valve and the pump device, such that the connector interface is configured to detachably couple with the complementary connector interface of the cartridge to establish flow communication from the cartridge reservoir to the internal reservoir, and the pump device has an inlet that is exposed to the internal reservoir and is configured to be operated to pump the amount of the cleaning composition from the internal reservoir and through the spray outlet assembly. The controller may be configured to operate the pump device such that the pump device causes at least a portion of the cleaning composition held in the internal reservoir to flow from the internal reservoir to the spray outlet assembly through the pump device.

The controller may be configured to operate the pump device to pump the amount of the cleaning composition from the cartridge reservoir and through the spray outlet assembly in response to an elapse of a particular period of time.

The controller may be configured to repeatedly operate the pump device at a fixed time interval that is the particular period of time, based on monitoring a timer that increments a timer value at a fixed frequency, operating the pump device to pump the amount of the cleaning composition in response to the timer value reaching a particular time value corresponding to the elapse of the particular period of time, and resetting the timer value to an initial timer value in response to operating the pump device.

The controller may be configured to monitor a counter that increments a counter value in response to each operation of the pump device by the controller to pump the cleaning composition and generate a depletion signal in response to the counter value reaching a particular counter value that corresponds to at least partial depletion of a fixed reservoir of the cleaning composition.

The controller may be configured to cause the counter value to be reset to an initial counter value in response receiving a reset signal.

The heat exchanger cleaner apparatus may further include a network communication interface that is configured to establish a network communication link with a remote computing device. The controller may be configured to perform at least one of causing the depletion signal to be transmitted to the remote computing device via the network communication link, or causing the counter value to be reset to the initial counter value in response to receiving the reset signal from the remote computing device via the network communication link.

The heat exchanger cleaner apparatus may further include a network communication interface that is configured to establish a network communication link with a remote computing device. The controller may be configured to operate the pump device to pump the amount of the cleaning composition in response to a pumping command signal received from the remote computing device via the network communication link.

The heat exchanger cleaner apparatus may further include a structure connector that is configured to detachably couple with an outer housing of the heat exchanger cleaner apparatus, the structure connector configured to connect the heat exchanger cleaner apparatus to an external structure to at least partially hold the heat exchanger cleaner apparatus in place in relation to an opening of the air handler.

The controller may be configured to cause at least a portion of the air conditioning system to shut down.

According to some example embodiments, a method for operating the heat exchanger cleaner apparatus may include controlling the pump device of the heat exchanger cleaner apparatus to cause the pump device to pump the amount of the cleaning composition from an apparatus through the spray outlet assembly without manual intervention.

The method may further include operating the pump device in response to an elapse of a particular period of time.

The method may further include repeatedly operating the pump device at a fixed time interval that is the particular period of time, based on monitoring a timer that increments a timer value at a fixed frequency, operating the pump device in response to the timer value reaching a particular time value corresponding to the elapse of the particular period of time, and resetting the timer value to an initial timer value in response to operating the pump device.

The method may further include monitoring a counter that increments a counter value in response to each operation of the pump device and generating a depletion signal in response to the counter value reaching a particular counter value that corresponds to at least partial depletion of a fixed reservoir of the cleaning composition.

The method may further include causing the counter value to be reset to an initial counter value in response to receiving a reset signal.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
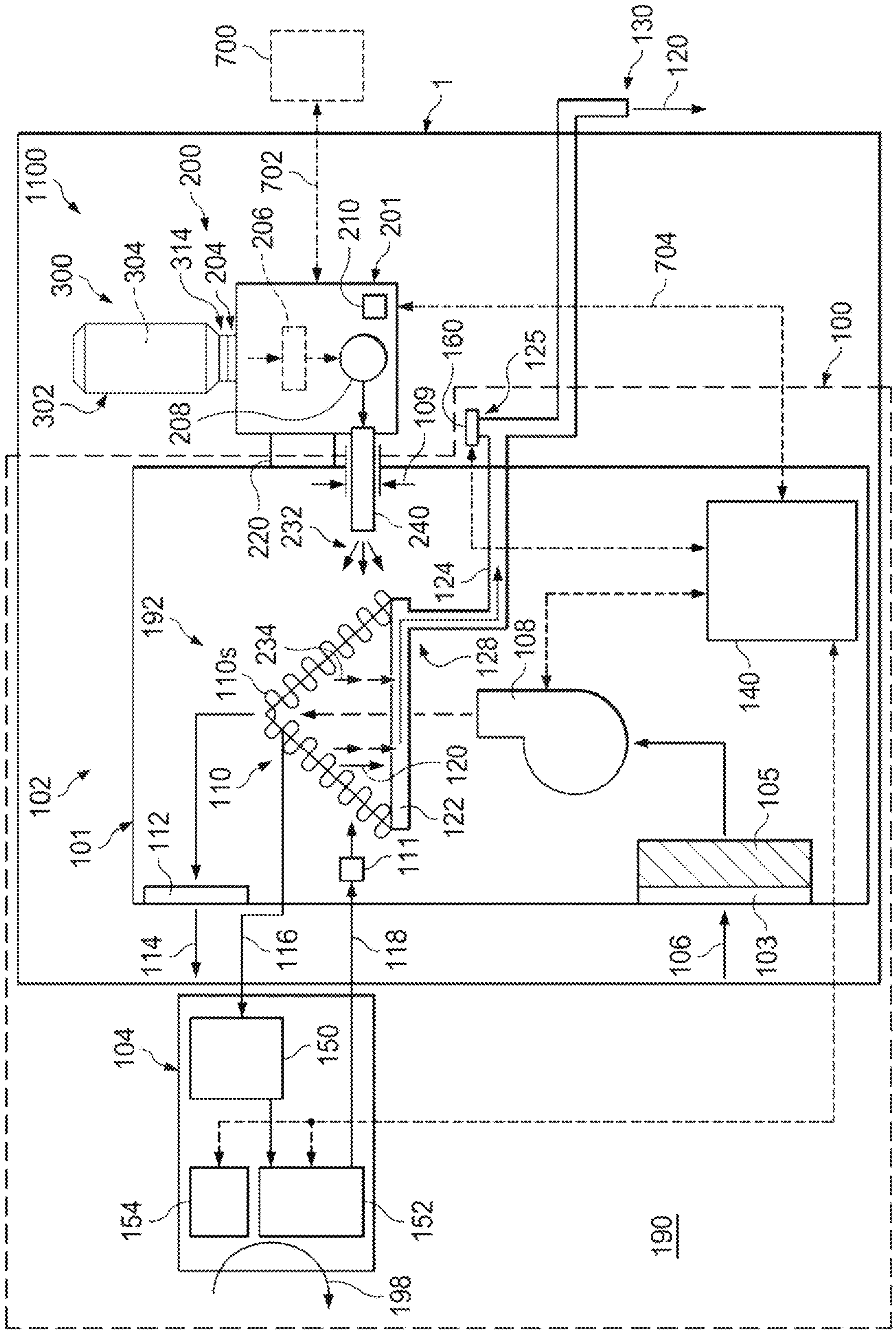
FIG. 1 is a schematic view of an air-conditioning system and a heat exchanger cleaner apparatus system according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments of the inventive concepts.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It will be understood that elements and/or properties thereof (e.g., structures, surfaces, directions, or the like), which may be referred to as being "perpendicular," "parallel," "flush," or the like with regard to other elements and/or properties thereof (e.g., structures, surfaces, directions, or the like) may be "perpendicular," "parallel," "flush," or the like or may be "substantially perpendicular," "substantially parallel," "substantially flush," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially flush" with regard to other elements and/or properties thereof will be understood to be "flush" with regard to the other elements and/or properties thereof within manufacturing tolerances and/or material tolerances and/or have a deviation in magnitude and/or angle from "flush," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

FIG. 1 is a schematic view of an air conditioning system 100 according to some example embodiments. The air conditioning system 100, which may be interchangeably referred to as an air conditioning system, air conditioner, or the like, may be configured to provide cooling of air within an interior of a structure 1 and may be at least partially located within the structure 1, but example embodiments are not limited thereto. The air conditioning system 100 may be included as a part of a Heating, ventilation, and air conditioning (HVAC) system, but example embodiments are not limited thereto, and in some example embodiments the air conditioning system 100 may be separate from any heating system.

Referring to FIG. 1, the air conditioning system 100 may include an air handler 102 and a condenser assembly 104 that are configured to draw return air 106 from an interior of the structure 1, cool (e.g., absorb heat from) the drawn return air 106 into conditioned air 114, and discharge (e.g., supply) the conditioned air 114 back into the interior of the structure 1. The air handler 102 may include, within a housing 101 that may at least partially comprise metal (e.g., steel) and at least define an interior 192 space, an air intake 103, an air filter 105, an air mover 108 (e.g., fan, blower, etc.), a heat exchanger 110 (e.g., evaporator coil), an expansion valve 111, a drip pan 122, a condensate drain line 124 (also referred to herein as a condensate drain conduit, condensate drain pipe, etc.), a controller 140, a float switch 160, and an air outlet 112. The condenser assembly 104 may include a compressor 150, a second heat exchanger 152 (e.g., condenser coil), and an air mover 154 (e.g., fan, blower, etc.).

It will be understood that example embodiments of an air conditioning system, air handler, condenser assembly, or the like may have different arrangements of devices therein and may omit or add to the aforementioned elements of the air conditioning system 100 as shown in FIG. 1. It will be understood, for example, that elements shown as being included in the air handler 102 may in some example embodiments be located in the condenser assembly 104 (e.g., the controller 140 may be located in the condenser assembly 104 instead of the air handler 102). As shown, the condenser assembly 104 may be located external to the structure 1 while the air handler 102 is located internal to the structure 1, but example embodiments are not limited thereto.

In some example embodiments, the air conditioning system 100 may draw return air 106 into the air handler 102 via the air intake 103 and through the air filter 105, where the air filter 105 may be any known air filter that is configured to remove some matter (e.g., particulate matter, including dust) from the return air 106. The air mover 108 (e.g., blower) may induce the flow of air into, through, and out of, the air handler 102. The air mover 108 may cause return air 106 to be drawn through the air filter 105 to remove some matter and may move (e.g., blow) the return air 106 through the air mover 108 and to the heat exchanger 110. The return air 106 may flow in thermal communication with (e.g., in contact with outer surfaces of) one or more coils of the heat exchanger 110 so that heat is removed from the return air 106 to cool the return air 106 into conditioned air 114. The air handler 102 may move the conditioned air 114 out of the air handler 102 and back into an interior space of the structure 1 via the air outlet 112.

The air conditioning system 100 may circulate a working fluid (e.g., a refrigerant, including known R22 refrigerant, R410A refrigerant, or any known refrigerant) between the heat exchangers 110 and 152 to remove heat from the return air 106 when the return air 106 flows in thermal communication (e.g., through and/or in contact with one or more coils of) the heat exchanger 110. The heat exchanger 110 may include any known heat exchanger used for an air conditioning system, for example an evaporator coil exchanger that includes one or more coils of one or more tubes through which the working fluid flows (e.g., as a cooled liquid). The heat exchanger 110 may cause heat to be transferred from the return air 106 and into the working fluid when the return air 106 is caused to flow across (e.g., in contact with, in thermal communication with, etc.) the one or more coils (e.g., one or more outer surfaces 110*s* thereof), thereby resulting in the working fluid becoming heated (e.g., heated into a low-pressure gas). The heated working fluid may be drawn, via fluid line 116 (e.g., fluid conduit, pipe, etc.) into the condenser assembly 104.

The air conditioning system 100 may include, in the condenser assembly 104, a compressor 150 (which may be any known compressor) that induces flow of the working fluid through the air conditioning system 100. The compressor 150 may draw the heated working fluid from the fluid line 118 and may compress the heated working fluid into a high-pressure gas. The heated working fluid may pass (e.g., flow), for example as the high-pressure gas, from the compressor 150 to the heat exchanger 152 (which may be any known heat exchanger and may be referred to as a condenser coil). The air mover 154 may cause ambient air 198 from the ambient environment 190 to be drawn across (e.g., in thermal communication with) one or more tubes of the heat exchanger 152 to remove heat from the heated working fluid passing through the one or more tubes of the heat exchanger 152, thereby discharging the heat originally removed from the return air 106 into the ambient environment 190 which serves as a heat sink for the air conditioning system 100. As a result, the working fluid passing through the heat exchanger 152 may be cooled back into a liquid. The working fluid may then pass (e.g., flow, circulate, etc.) back to the air handler 102 via a fluid line 118, where the working fluid may pass through an expansion valve 111 (which may be any known expansion valve) to cool the working fluid which then passes into the heat exchanger 110 to remove additional heat from return air 106.

As noted above, the circulation of working fluid through the heat exchanger 110, heat exchanger 152, fluid lines 116 and 118, and expansion valve 111 may be induced by operation of the compressor 150.

As further shown, the air conditioning system 100 may include a controller 140 that is configured to control elements of the air conditioning system 100, including for example controlling operation of the air handler 102, condenser assembly 104, or any part thereof. As described further below, the controller 140 may be implemented by a computing device, including a memory storing a program of instructions and a processor configured to execute the program of instructions. While the controller 140 is shown as being included within the housing 101 of the air handler 102, it will be understood that the controller 140 may be located external to the housing 101 and, in some example embodiments, may be located within the condenser assembly 104 or may be attached to an exterior of the air handler 102 for ease of manual access.

Still referring to FIG. 1, when heat is removed from the return air 106 based on the return air 106 passing in thermal communication with the heat exchanger 110, water may condense out of the cooled return air as condensate 120 at the heat exchanger 110, for example on one or more outer surfaces 110*s* thereof. The air handler 102 may include a drip pan 122 located beneath the heat exchanger 110, and the condensate 120 may fall under gravity from the one or more outer surfaces 110*s* of the heat exchanger 110 to collect in the drip pan 122. The air handler 102 may further include a condensate drain line 124 having an inlet opening 128 coupled to the drip pan 122 (e.g., a bottom surface where the drip pan 122 has an inclined surface that is angled downwards towards the inlet opening 128 of the condensate drain line 124) and an outlet opening 130 that is external to the structure 1 and open to the ambient environment 190, as shown. Condensate 120 collected in the drip pan 122 may pass under gravity to the inlet opening 128 of the condensate drain line 124, and the condensate drain line 124 may direct the condensate 120 to flow out of the air handler 102 and out of the structure 1 to the ambient environment 190 via the outlet opening 130 of the condensate drain line 124.

As shown in FIG. 1, the air conditioning system 100 may include a float switch 160 that is located in the drip pan 122 and/or in the condensate drain line 124 (e.g., at an opening 125 into the condensate drain line 124 as shown). The float switch 160 may be a switch that is configured to be actuated based on backflow and/or overflow of condensate 120 in the condensate drain line 124. For example, the float switch 160 may be any known float switch and may be configured to be closed or opened (e.g., actuated) based on accumulation of condensate 120 in the drip pan 122 to at least a threshold volume held therein. The float switch 160 may be communicatively (e.g., electrically) coupled to the controller 140, and the controller 140 may be configured to shut down some or all of the air conditioning system 100 (e.g., shut down the air handler 102, the air mover 108, the compressor 150, and/or the air mover 154) in response to the float switch 160 being actuated, thereby reducing or preventing damage being caused in the structure and/or air conditioning system 100 due to the condensate 120 accumulation.

In some example embodiments, various substances may accumulate on one or more outer surfaces 110*s* of one or more elements of the heat exchanger 110 (e.g., an evaporator coil through which the liquid working fluid may circulate to remove heat from the return air 106) due to condensation of condensate 120 on the one or more outer surfaces 110*s*. Such substances may include, for example, mold, algae, mildew, bacteria, fungi, dander, pollen, zooglea (also referred to as *zoogloea*), any combination thereof, or the like. Such accumulation of substances on the outer surface(s) of the heat exchanger 110 elements may cause reduced heat exchange (e.g., heat transfer) performance of the heat exchanger 110 in removing heat from the return air 106. Additionally or alternatively, such accumulation of substances on the outer surface(s) of the heat exchanger 110 elements may cause reduced performance of the air conditioning system due to clogging air flow conduits through portions of the heat exchanger 110 (e.g., reducing cross-sectional flow area between adjacent heat exchanger tubes, coils, structures, or the like) which may cause the air conditioning system to become overworked to sustain a flow rate of air therethrough and more prone to breakdown and/or damage (e.g., of damage to the air mover 108 and/or of the heat exchanger 110). Additionally, such substances may accumulate in one or more portions of the air conditioning system 100 (e.g., the drip pan 122, the condensate drain line 124, etc.), which may clog one or more portions of the condensate removal elements (e.g., drip pan 122, condensate drain line 124, etc.) of the air handler 102, which may cause damage to the air handler 102 and/or to a structure in which the air handler 102 is included, including water damage.

Still referring to FIG. 1, in some example embodiments a heat exchanger cleaner apparatus system 1100 may be coupled to the air handler 102 at an opening 109 into the interior 192 of the air handler 102 which is at least partially defined by the housing 101 of the air handler 102. The heat exchanger cleaner apparatus system 1100 may be configured to dispense a cleaning composition into contact with an outer surface 110*s* of a heat exchanger 110 of the air handler 102. As described herein, an outer surface 110*s* of a heat exchanger may include any of an upper surface, a lower surface, an inward-facing surface, an outward-facing surface, a side surface, any combination thereof, or the like of any portion of the heat exchanger 110, where any portion of the heat exchanger 110 may include any coils, tubes, or the like included in the heat exchanger 110. As described herein, the heat exchanger cleaner apparatus system 1100 may be configured to dispense (e.g., pump, spray, etc.) a cleaning composition into the interior 192 of the air handler 102 to contact an outer surface 110*s* of the heat exchanger 110 (e.g., an outer surface of an evaporator coil) to reduce, remove, and/or prevent accumulation of various substances (e.g., mold, algae, mildew, bacteria, fungi, dander, pollen, zooglea (also referred to as *zoogloea*), any combination thereof, or the like) on the outer surface 110*s* of the heat exchanger 110, thereby improving heat transfer performance of the heat exchanger 110 (e.g., between the working fluid in the heat exchanger 110 coils and the return air 106 passing in thermal communication with the heat exchanger 110) and thus improve operational efficiency and/or performance of the air conditioning system 100 at least with regards to cooling the return air 106. The cleaning composition 230 sprayed onto one or more outer surfaces 110*s* of the heat exchanger 110 may then, together with any byproducts of removal of substances from the one or more outer surfaces 110*s* by the cleaning composition, fall as material 234 into the drip pan 122 to be removed from the air handler 102 via the condensate drain line 124. The cleaning composition included in material 234 may further remove, break down, etc. accumulated substances (e.g., mold, algae, mildew, bacteria, fungi, dander, pollen, zooglea (also referred to as *zoogloea*), any combination thereof, or the like) in the drip pan 122 and/or the condensate drain line 124 as the cleaning composition falls from the one or more outer surfaces 110*s* into the drip pan 122 and is further drawn into the condensate drain line 124, thereby mitigating clogging of the drip pan 122 and/or the condensate drain line by said substances.

In some example embodiments, the heat exchanger cleaner apparatus 200 may be configured to dispense (e.g., pump, spray, etc.) the cleaning composition into contact with the outer surface 110*s* of the heat exchanger 110 without human intervention (e.g., automatically), for example to dispense discrete amounts (e.g., a particular amount, which may be a particular volume and/or particular mass) of the cleaning composition at a particular (or, alternatively, predetermined) fixed time interval, thereby reducing or preventing accumulation of the various substances on the one or more outer surface 110*s* of the heat exchanger 110 (e.g., evaporator coil) while reducing or minimizing human intervention and/or effort expended to implement the dispensing. Because the heat exchanger cleaner apparatus 200 is configured to dispense the cleaning composition (e.g., repeatedly at a fixed time interval) without human intervention, the accumulation of potential substances (e.g., mold, algae, mildew, bacteria, fungi, dander, pollen, zooglea (also referred to as *zoogloea*), any combination thereof, or the like) on the one or more outer surface 110*s* of the heat exchanger 110 (e.g., evaporator coil) may be reduced, removed, or prevented. Such reduction, removal, or prevention of substance accumulation on the one or more outer surfaces 110s of the heat exchanger may thereby improve overall heat transfer efficiency and/or performance of the air handler 102 and thus improve performance of the air conditioning system 100, at least with regard to cooling the return air 106, and may further reduce or prevent the likelihood of condensate 120 backup and/or overflow which might otherwise result in shutdown of at least the air handler 102 and/or air conditioning system 100, flooding damage to the air handler 102 and/or structure in which the air handler 102 is located, or the like. Because human intervention is not required to implement the dispensing (e.g., pumping, spraying, etc.) of the cleaning composition, particularly dispensing of the cleaning composition repeatedly at a fixed time interval, the likelihood of such accumulation resulting in significant reduction in air conditioning system performance and/or efficiency, and/or resulting in damage to at least one of the air conditioning system 100 or the structure 1, due to a missed or forgotten manual dispensing of cleaning composition by a human operator is reduced or prevented, thereby improving operational performance and/or efficiency of the air conditioning system 100 and reducing workload by a human operator.

As shown in FIG. 1, the heat exchanger cleaner apparatus system 1100 may include a heat exchanger cleaner apparatus 200 and a cartridge 300 that is coupled (e.g., detachably coupled) to the heat exchanger cleaner apparatus 200 to supply cleaning composition to the heat exchanger cleaner apparatus 200 to be further supplied into the interior 192 of the air handler 102 to be sprayed onto an outer surface 110s of the heat exchanger. The heat exchanger cleaner apparatus 200 may include a housing 201, in which a pump device 208 may be located, a connector interface 204 coupled in fluid communication with an inlet of the pump device 208 (e.g., via one or more internal conduits, reservoirs, or the like within the housing 201), and a spray outlet assembly 240 coupled in fluid communication with an outlet of the pump device 208 (e.g., via one or more internal conduits, reservoirs, or the like within the housing 201). The pump device 208 may be any well-known pump device (e.g., a gear pump, screw pump, or the like) configured to be operated (e.g., actuated) to selectively supply (e.g., pump) an amount of cleaning composition to the spray outlet assembly 240.

As shown, the connector interface 204 may be configured to couple with a complementary connector interface 314 of a cartridge 300 which has a cartridge reservoir 304 configured to hold the cleaning composition, to establish flow communication from the cartridge reservoir 304 to the pump device 208, such that the pump device 208 is in fluid communication between the connector interface 204 and the spray outlet assembly 240, and the pump device 208 is configured to be operated to pump the amount of the cleaning composition from the cartridge reservoir 304 and through the spray outlet assembly 240.

As shown, the heat exchanger cleaner apparatus 200 may include an internal reservoir 206 which may be located in fluid communication between connector interface 204 and the inlet of the pump device 208, although it will be understood that in some example embodiments the internal reservoir 206 may be omitted. The connector interface 204 may be configured to supply cleaning composition from the cartridge reservoir 304 to the internal reservoir 206, where the volume of the internal reservoir 206 may be equal to or greater than the volume of the particular amount of cleaning composition that the heat exchanger cleaner apparatus 200 is configured to supply ("dispense") to the heat exchanger 110 outer surface 110s. The connector interface 204 may include, for example, a check valve, where the check valve is configured to open in response to the connector interface 204 coupling (e.g., detachably coupling, reversibly coupling, etc.) with the complementary connector interface 314. The connector interfaces 204 and 314 may be complementary connectors, including bayonet connector interfaces, threaded connector interfaces, or the like. The cartridge 300 may correspond to any example embodiments of the cartridge 300 as described herein.

The spray outlet assembly 240 may be configured to extend from the heat exchanger cleaner apparatus 200 (e.g., from the housing 201 thereof) into the interior 192 of the air handler 102 via an opening 109 in the housing 101 of the air handler from the exterior (at which the heat exchanger cleaner apparatus 200 is located) so that the spray outlet assembly 240 is at least partially located within the interior 192 of the air handler 102 and that a distal end of the spray outlet assembly 240 that is distal from the housing 201 of the heat exchanger cleaner apparatus 200 (and which may include a spray nozzle, also referred to herein as a spray head) is directly exposed to (e.g., without any interposing structures) an outer surface 110s of the heat exchanger 110 of the air handler 102. The spray outlet assembly 240 may be configured to receive cleaning composition discharged by the pump device 208 outlet and spray a fluid stream 232 of the cleaning composition 230 into the air handler 102 interior 192 to contact one or more outer surfaces 110s of the heat exchanger 110. The spray outlet assembly 240 may include any known spray outlet head, spray head, spray nozzle, or the like configured to cause the fluid stream 232 to have any particular stream shape (e.g., spray pattern) to control the trajectory of the cleaning composition in the fluid stream 232. Additionally, the spray outlet assembly 240 may be configured to be positioned at least partially in the air handler interior 192 so that the fluid stream 232 deposits cleaning composition on at least a portion (or, in some example embodiments, an entirety) of one or more outer surfaces 110s of the heat exchanger 110 (e.g., outer surfaces of one or more evaporator coils of an air handler heat exchanger 110 (e.g., an evaporator) which are directly exposed to the spray outlet assembly 240 in the interior 192 of the air handler 102. For example, in some example embodiments the spray outlet assembly 240 (e.g., the spray nozzle at the distal end thereof) may be configured to direct cleaning composition 230 pumped into the spray outlet assembly 240 from a pump device 208 into the air handler interior 192 as a conical fluid stream (e.g., conical spray pattern) configured to deposit one or more droplets of cleaning composition to contact one or more outer surfaces directly exposed to the spray outlet assembly 240 in the air handler interior 192.

The controller 210 may correspond to (e.g., include any of the elements of) any of the example embodiments of the controller 210 as described herein and may be configured to operate (e.g., control) the pump device 208 to cause the amount of the cleaning composition to be supplied (e.g., sprayed, pumped, discharged, etc.) through the spray outlet assembly 240 by the pump device 208 without manual intervention. The heat exchanger cleaner apparatus 200 may include a power source (e.g., batteries) and the controller 210 may be configured to selectively supply power to the pump device 208 to operate the pump device 208 to discharge (e.g., pump) a particular amount of cleaning composition (e.g., a volume corresponding to the volume of internal reservoir 206) into the spray outlet assembly 240 via the outlet of the pump device 208.

The heat exchanger cleaner apparatus 200 may be configured to be coupled (e.g., detachably coupled) to the air handler 102 via a structure connector 220. The structure connector 220 may correspond to the structure connector 220 according to any of the example embodiments as described herein and may be configured to be coupled (e.g., detachably coupled) to the housing 201 and/or to the air handler 102 (e.g., housing 101) similarly to any of the example embodiments of the structure connector 220 as described herein.

In some example embodiments, the heat exchanger cleaner apparatus 200 may include a network communication interface (e.g., as part of the controller 210 or as a separate element according to any of the example embodiments of the heat exchanger cleaner apparatus 200) and the controller 210 may be configured to operate the pump device 208 based on receiving and processing command signals received at the heat exchanger cleaner apparatus 200 via the network communication interface.

Figure 2A:
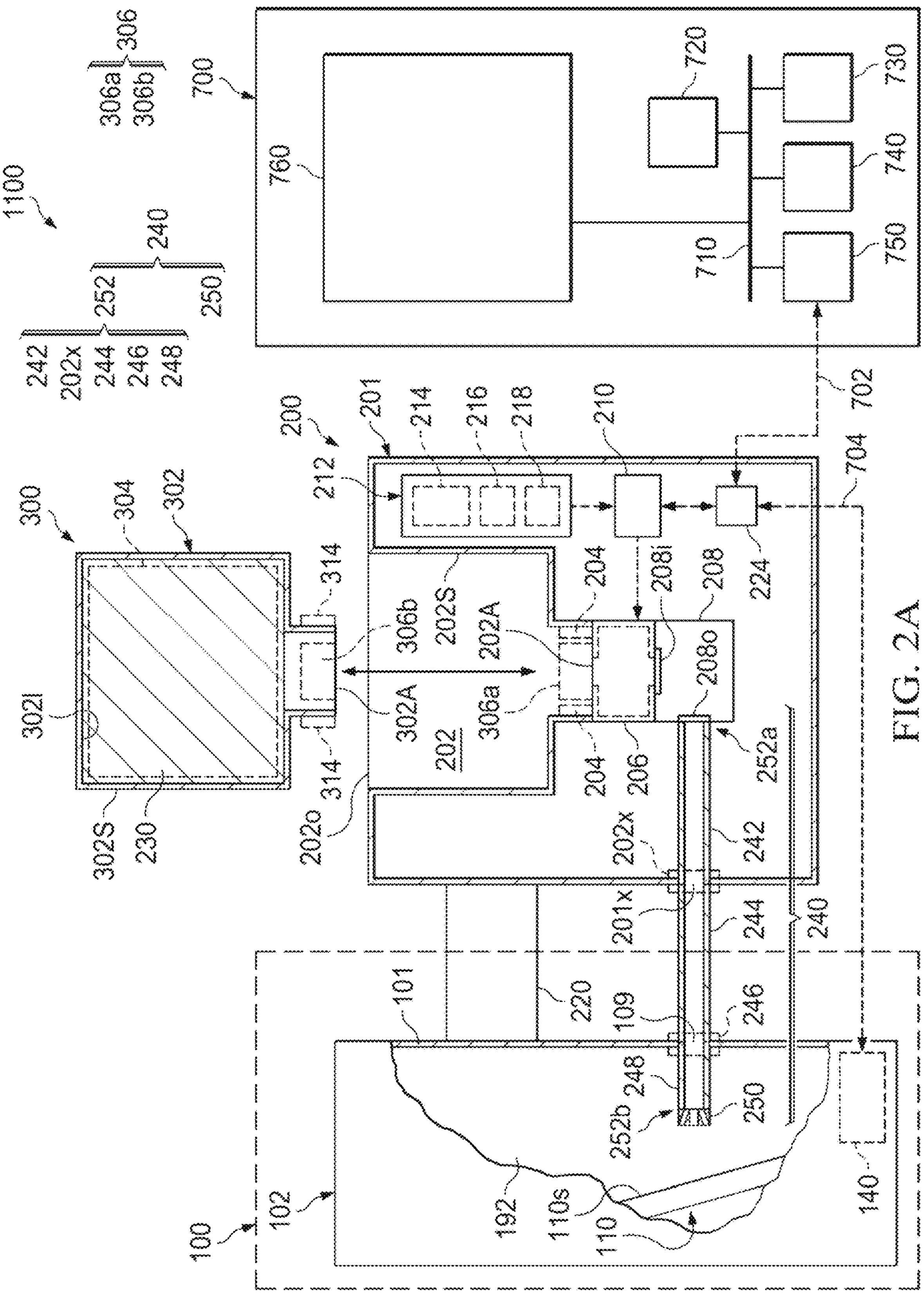
FIGS. 2A and 2B are schematic views of a heat exchanger cleaner apparatus system including a heat exchanger cleaner apparatus and a cartridge according to some example embodiments.
Figure 2B:
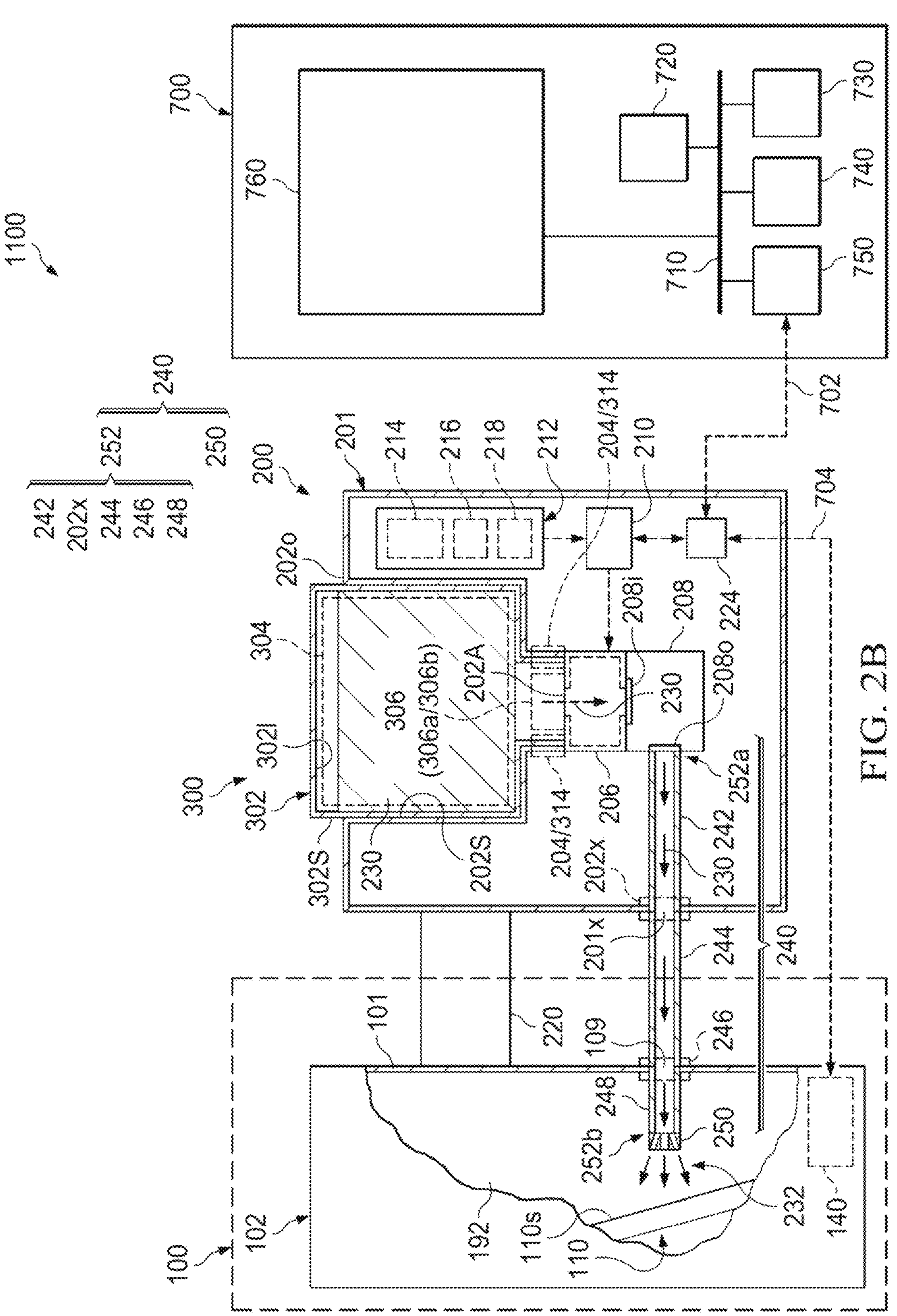

FIGS. 2A and 2B are schematic views of a heat exchanger cleaner apparatus 200 according to some example embodiments. Referring to FIGS. 2A and 2B in reference to FIG. 1, the heat exchanger cleaner apparatus 200 is configured to pump (also referred to herein as supply, dispense, drive, or the like) a cleaning composition 230 through a spray outlet assembly 240 into an interior 192 of the air handler 102 shown in FIG. 1 to spray a fluid stream 232 (also referred to as a fluid spray stream, a spray stream, a spray pattern, or the like) of the cleaning composition 230 that at least partially contacts an outer surface 110*s* of a heat exchanger 110 (e.g., evaporator coil) of the air handler 102. Cleaning composition 230 sprayed in the fluid stream 232 to contact an outer surface 110*s* of the heat exchanger 110 may subsequently fall from the outer surface 110*s* as part of material 234 falling under gravity into the drip pan 122 to be removed from the air handler 102 via the condensate drain line 124, along with any substances caused to be removed (e.g., cleaned) from the outer surface 110*s* by the cleaning composition.

Referring to FIGS. 2A and 2B, the heat exchanger cleaner apparatus 200 may include a housing 201 at least partially defining an interior of the heat exchanger cleaner apparatus 200, and apparatus reservoir 202 (which may be at least partially defined by the housing 201) and which is configured to at least partially accommodate and hold a cartridge 300 configured to hold the cleaning composition 230 therein, a spray outlet assembly 240, an internal reservoir 206, and a pump device 208 that is configured to be actuated (e.g., operated) to selectively pump (also referred to interchangeably as "pump") an amount (e.g., a particular amount, which may be a particular volume and/or a particular mass) of the cleaning composition 230 from an inlet 208*i* of the pump device 208 (which may be open, such as directly exposed to, the internal reservoir 206) to the spray outlet assembly 240 extending through the opening 201*x* in the housing 201 via the outlet 2080 of the pump device 208.

As shown in FIGS. 2A and 2B, the apparatus reservoir 202 (which may be at least partially defined by one or more surfaces of the housing 201) may include an inner surface 202S at least partially defining an interior volume space in which a cartridge 300 may be at least partially accommodated and held. The apparatus reservoir 202 may further include an apparatus reservoir outlet 202A that is configured to be in fluid communication with the pump device 208 to enable cleaning composition 230 to flow from the apparatus reservoir 202 to the pump device 208. For example, the apparatus reservoir outlet 202A may be open to the internal reservoir 206, such that the apparatus reservoir outlet 202A is configured to establish fluid communication from the apparatus reservoir 202 to the pump device 208 inlet 208*i* via the internal reservoir 206. In some example embodiments, where the internal reservoir 206 is omitted from the heat exchanger cleaner apparatus 200, the apparatus reservoir outlet 202A may be open to the inlet 208*i* of the pump device 208 (e.g., directly, wherein the inlet 208*i* is the same as the apparatus reservoir outlet 202A, or via a conduit), such that the apparatus reservoir outlet 202A is configured to establish fluid communication from the apparatus reservoir 202 to the pump device 208 inlet 208*i*.

Still referring to FIGS. 2A and 2B, the heat exchanger cleaner apparatus system 1100 may include both the heat exchanger cleaner apparatus 200 and a cartridge 300, also referred to interchangeably as a "cleaner cartridge," "cleaning composition cartridge," or the like according to some example embodiments. In some example embodiments, the heat exchanger cleaner apparatus 200 may be configured to receive and couple with a cartridge 300 that contains (e.g., holds) the cleaning composition 230 within a cartridge reservoir 304 such that a flow path is established between the cartridge reservoir 304 and the pump device 208. The cartridge 300 may be provided instead of the cleaning composition 230 being poured into, and directly held within, the apparatus reservoir 202 in contact with the inner surface 202S thereof. Replenishment of the cleaning composition 230 held in the heat exchanger cleaner apparatus 200 may be simplified based on the cleaning composition 230 being held in the cartridge 300 which is coupled (e.g., detachably coupled) with the heat exchanger cleaner apparatus 200 to position the cartridge reservoir 304 in fluid communication with at least the inlet 208*i* of the pump device 208, as replenishment of the total cleaning composition 230 held in the heat exchanger cleaner apparatus system 1100 (e.g., in the heat exchanger cleaner apparatus 200) may involve replacing a cartridge 300 that is coupled (e.g., detachably coupled) to the heat exchanger cleaner apparatus 200 based on being inserted into the apparatus reservoir 202 instead of directly pouring the cleaning composition 230 directly into the apparatus reservoir 202. Such simplification may include reducing or preventing inadvertent spilling of cleaning composition 230 during the replenishment process.

As shown in FIGS. 2A and 2B, the cartridge 300 may include a cartridge housing 302 that has at least an inner surface 302I defining an interior volume space which may at least partially be a cartridge reservoir 304 which may hold the cleaning composition 230 therein, such that the inner surface 302I may be understood to at least partially define the cartridge reservoir 304. In some example embodiments, the cartridge reservoir 304 may have a particular volume, for example 36 oz and thus may be configured to hold the particular volume (e.g., 36 oz) of cleaning composition 230.

As further shown, the apparatus reservoir 202 and the cartridge 300 may be sized and shaped so that the cartridge 300 may be received (e.g., accommodated) at least partially into the apparatus reservoir 202 to establish a sliding contact fit between the outer surface 302S of the cartridge housing 302 and the inner surface 202S of the apparatus reservoir 202, for example so that the cartridge 300 occupies all or substantially all of the internal volume space of the apparatus reservoir 202 when the cartridge 300 is coupled to the heat exchanger cleaner apparatus 200.

As shown in FIGS. 2A and 2B, the cartridge 300 may have a greater volume than the apparatus reservoir 202 and may protrude out of the opening 2020 of the apparatus reservoir 202 when the cartridge 300 is received into the apparatus reservoir 202 and coupled (e.g., detachably coupled) with the heat exchanger cleaner apparatus 200.

Such protrusion of the cartridge 300 may enable easier human access to grasp the cartridge 300 to simplify replacement of cartridges 300, but example embodiments are not limited thereto: in some example embodiments the cartridge 300 may be located entirely within the apparatus reservoir 202 when the cartridge 300 is coupled to the heat exchanger cleaner apparatus 200.

As shown in FIGS. 2A and 2B, the heat exchanger cleaner apparatus 200 may include the apparatus reservoir 202 which is configured to receive the cartridge 300 to enable the cartridge 300 to be coupled with the heat exchanger cleaner apparatus 200, but example embodiments are not limited thereto. For example, in some example embodiments, the apparatus reservoir 202 may be entirely absent from the heat exchanger cleaner apparatus 200, and the cartridge 300 (e.g., a connector interface 314 thereof) may couple with a port (e.g., having a complementary connector interface 204) that is exposed at the outer surface of the housing 201 of the heat exchanger cleaner apparatus 200 to put the cartridge reservoir 304 in fluid communication with the pump device 208 (e.g., the inlet 208*i* thereof).

As shown, the cartridge 300 may have a cartridge housing 302 that defines a cartridge outlet 302A through which the cleaning composition 230 may exit the cartridge reservoir 304 when a flow path is established between the cartridge reservoir 304 and the pump device 208 (e.g., via apparatus reservoir outlet 202A, internal reservoir 206, etc.).

The cartridge outlet 302A may include a connector interface 314 configured to establish a connection with the heat exchanger cleaner apparatus 200, and the heat exchanger cleaner apparatus 200 (e.g., the apparatus reservoir 202, the internal reservoir 206, the housing 201, any combination thereof, or the like) may further include a complementary connector interface 204 to enable a complementary connection with the cartridge 300 to thereby detachably couple the cartridge 300 to the heat exchanger cleaner apparatus 200. Such complementary connector interfaces 204 and 314 may include any known connector interface, for example a friction fit connector, a threaded connector, a bayonet connector, any combination thereof, or the like.

As further shown, at least one of the cartridge 300 or the heat exchanger cleaner apparatus 200 may include a check valve 306 that is configured to be opened based on the heat exchanger cleaner apparatus 200 being coupled with the cartridge 300 (e.g., in response to establishing a threaded connection, bayonet connection, friction fit connection, or the like between the complementary connector interfaces 204 and 314 of the heat exchanger cleaner apparatus 200 and the cartridge 300). For example, as shown in FIGS. 2A and 2B, the check valve 306 may be a check valve 306*a* included in the heat exchanger cleaner apparatus 200 (e.g., coupled to the apparatus reservoir outlet 202A, the internal reservoir 206, the connector interface 204, the apparatus reservoir 202, the housing 101, the pump device 208, any combination thereof, or the like) and configured to selectively open to establish fluid communication through the apparatus reservoir outlet 202A to the inlet 208*i* of the pump device 208 based on cartridge 300 coupling with the heat exchanger cleaner apparatus 200 (e.g., via connector interfaces 204 and 314 detachably coupling). In another example, as shown in FIGS. 2A and 2B, the check valve 306 may be a check valve 206*b* included in the cartridge 300 (e.g., coupled to the cartridge outlet 302A, the cartridge reservoir 304, the connector interface 314, the housing 201, any combination thereof, or the like) and configured to selectively open to establish fluid communication through the cartridge outlet 302A from the cartridge reservoir 304 to the inlet 208*i* of the pump device 208 based on cartridge 300 coupling with the heat exchanger cleaner apparatus 200 (e.g., via connector interfaces 204 and 314 detachably coupling). In another example, check valves 306 and 306*b* may be separate portions of a check valve 306 and which engage to form the check valve 306 and to open same in response to the cartridge 300 coupling with the heat exchanger cleaner apparatus 200 (e.g., via connector interfaces 204 and 314 coupling). The check valve 306 may be configured to actuate to open a flow path between the cartridge reservoir 304 and the apparatus reservoir 202 and/or between the cartridge reservoir 304 and the pump device 208 and/or between the cartridge reservoir 304 and the internal reservoir 206 in response to the heat exchanger cleaner apparatus 200 being coupled with the cartridge 300, so that the cartridge reservoir 304 is in fluid communication with the pump device 208 (e.g., the inlet 208*i*) via the cartridge outlet 302A, the check valve 306, the apparatus reservoir outlet 202A, and the like.

In an example, the check valve 306 may at least partially be a part of the cartridge 300 (e.g., as check valve 306*b*) such that the check valve 306 is fixed to the cartridge housing 302 (e.g., via adhesive and/or the cartridge housing 302 being a plastic material (e.g., high density polyethylene or HDPE) that is formed to at least partially enclose the check valve 306*b*). In another example, the check valve 306 may at least partially be a part of the heat exchanger cleaner apparatus 200 (e.g., as check valve 306*a*) such that the check valve 306 is fixed to the housing 201 (e.g., via adhesive and/or the housing 201 being a plastic material (e.g., high density polyethylene or HDPE) that is formed to at least partially enclose the check valve 306*a*). For example, in some example embodiments, the check valve 306 may be fixed to the apparatus reservoir 202 and/or the pump device 208 as check valve 306*a*. The check valve 306 may be included in a connector (e.g., connector interface 204) that is configured to couple with the cartridge 300 to establish the detachable coupling between the heat exchanger cleaner apparatus 200 and the cartridge 300. For example, the check valve 306 may be included in a threaded connector, bayonet connector, friction fit connector, or the like. In another example, the check valve 306 may be removably (e.g., detachably) coupled to the apparatus reservoir 202, housing 201, internal reservoir 206, connector interface 204, and/or the pump device 208 via a set of complementary connectors (e.g., threaded, bayonet, etc.), and the check valve 306 may be detached from the heat exchanger cleaner apparatus 200 and coupled to the cartridge 300 prior to coupling of the heat exchanger cleaner apparatus 200 with the cartridge 300, and the check valve 306 may be detached from the cartridge 300 subsequent to removal of an empty cartridge 300 from the heat exchanger cleaner apparatus 200 and then attached to a new, full cartridge 300 prior to coupling of the full cartridge 300 to the heat exchanger cleaner apparatus 200, such that a check valve 306 may be re-used between separate cartridges 300.

Accordingly, in some example embodiments, the heat exchanger cleaner apparatus 200 (e.g., the apparatus reservoir 202) may be configured to receive (e.g., at least partially accommodate) a cartridge 300 that includes a cartridge reservoir 304 configured to hold the cleaning composition 230, and a cartridge outlet 302A, and the heat exchanger cleaner apparatus 200 may be configured to couple with the cartridge 300 (e.g., based on detachable coupling of the complementary and respective connector interfaces 204 and 314 of the heat exchanger cleaner apparatus 200 and the cartridge 300) so that the cartridge reservoir 304 is in fluid communication (e.g., via an open flow channel) with at least the pump device 208 (e.g., the inlet 208*i* thereof) via the cartridge outlet 302A. Additionally, in some example embodiments, the heat exchanger cleaner apparatus 200 or the cartridge 300 may include a check valve 306 that is configured to open in response to the heat exchanger cleaner apparatus 200 coupling with the cartridge 300 to establish the fluid communication between the cartridge reservoir 304 and at least the pump device 208 via the cartridge outlet 302A.

Still referring to FIGS. 2A and 2B, the pump device 208 may be configured to pump (e.g., selectively pump) an amount of cleaning composition 230 that is a particular amount (e.g., a particular volume, particular mass, etc.) so that the heat exchanger cleaner apparatus 200 may pump a particular amount of cleaning composition 230, drawn through the inlet 208*i*, through the outlet 2080 (e.g., repeatedly at a fixed time interval). For example, in some example embodiments, the amount of cleaning composition 230 as described herein that is pumped from the inlet 208*i* (e.g., from the internal reservoir 206, apparatus reservoir 202, and/or cartridge reservoir 304 via the inlet 208*i*) when the pump device 208 is operated once may be 3 oz of cleaning composition 230, and the pump device 208 may be configured to be operated (e.g., may be configured to operate for a particular period of time associated at the controller 210 with pumping a corresponding particular amount of cleaning composition 230) to cause the particular amount of cleaning composition 230 to be pumped from the cartridge reservoir 304 of the cartridge 300 (e.g., via internal reservoir 206) to the spray outlet assembly 240 to be sprayed into the interior 192 of the air handler 102 as fluid stream 232 to contact one or more outer surfaces 110*s* of the air handler heat exchanger 110.

The spray outlet assembly 240 may include a conduit 252 having a proximate end 252*a* and a distal end 252*b*, where the proximate end 252*a* is coupled in fluid communication with the outlet 2080 of the pump device 208, the conduit 252 is configured to extend at least from the proximate end 252*a*, through an opening 201*x* in the housing 201 of the heat exchanger cleaner apparatus 200, and through an opening 109 in the housing 101 of the air handler 102 into the interior 192 of the air handler 102 such that a distal end 252*b* of the conduit 252 is within the interior 192 of the air handler 102. The spray outlet assembly 240 may further include a spray nozzle 250 coupled to the distal end 252*b* of the conduit 252. The conduit 252 partially or entirely comprise a rigid piece of material, such as a metal (e.g., stainless steel) tube, a plastic (e.g., rigid polyvinylchloride) tube, or the like. The conduit 252 may partially or entirely comprise a flexible piece of material, such as rubber, flexible polyvinylchloride, silicone, or the like. In some example embodiments, the opening 109 may have a diameter of about ½ inches to about ⅝ inches. In some example embodiments, some or all of the spray outlet assembly 240, including any conduit structures, connectors, or the like comprising the conduit 252, the spray nozzle, or the like a diameter (in the direction perpendicular to the longitudinal or central axis thereof) of about ½ inches to about ⅝ inches.

The spray nozzle 250 may be any known spray nozzle (e.g., spray head) configured to cause a received fluid (e.g., cleaning composition 230) to be sprayed in a fluid stream 232 having a particular spray pattern/shape (e.g., a conical spray pattern, a planar or flat spray pattern, etc.). In some example embodiments, the cleaning composition 230 pumped into the conduit 252 via the proximate end 252*a* from the outlet 2080 of the pump device 208 may be directed by the conduit 252 to the spray nozzle 250 via the distal end 252*b* of the conduit 252. The spray nozzle 250 may be configured to cause the cleaning composition 230 directed to the spray nozzle 250 through the conduit 252 to be sprayed as a fluid stream 232 into the interior 192 of the air handler 102 to at least partially contact the outer surface 110*s* of the heat exchanger 110. The spray nozzle 250 may be any known type of spray nozzle, spray head, or the like and may be configured to spray the cleaning composition as the fluid stream 232 in any type of spray pattern (e.g., a conical spray pattern, a flat planar spray pattern, etc.). The spray nozzle 250 may be configured to have an outer diameter that is equal to or less than an outer diameter of the conduit 252 to enable ease of insertion of the spray nozzle 250 into the interior 192 of the air handler 102 via the opening 109.

The spray nozzle 250 and the distal end 252*b* of the conduit 252 may have complementary connectors (e.g., threaded connectors, bayonet connectors, etc.) configured to enable ease of replacement of the spray nozzle 250 coupled to the conduit 252 with different spray nozzles 250 configured to spray fluid streams having different spray patterns, thereby improving ease of configuration of the spray outlet assembly 240 to spray cleaning composition to contact one or more outer surfaces 110*s* of the heat exchanger 110. However, it will be understood that in some example embodiments the spray nozzle 250 may be fixed to the distal end of the conduit 252 (e.g., via the spray nozzle 250 being bonded via adhesive, welding, or the like to the distal end 252*b*).

The outlet 2080 of the pump device 208 and the proximate end 252*a* of the conduit 252 may have complementary connectors (e.g., threaded connectors, bayonet connectors, etc.) configured to enable ease of replacement of the spray outlet assembly 240. However, it will be understood that in some example embodiments the proximate end 252*a* of the conduit 252 may be fixed to the outlet 2080 of the pump device 208 (e.g., via the proximate end 252*a* being bonded via adhesive, welding, or the like to the outlet 2080 of the pump device 208).

In some example embodiments, the conduit 252 may be a single structure (e.g., a single tube that is a single, unitary piece of material extending continuously from the proximate end 252*a* to the distal end 252*b*. In some example embodiments, for example as shown in FIGS. 2A to 2B, the conduit 252 may include a plurality of separate structures, such as a plurality of separate conduit structures 242, 244, 248, which are coupled in series between the spray nozzle 250 and the pump device 208 (e.g., directly or via one or more connectors 202*x* and/or 246). For example, as shown, the conduit 252 may include a first conduit structure 242 coupled (e.g., detachably via complementary connectors or fixed via adhesive, welding, or the like) at a first end to the outlet 2080 of the pump device 208 and coupled (e.g., detachably via complementary connectors or fixed via adhesive, welding, or the like) at an opposite second end to a connector 202*x* that is at (e.g., at least partially extends through) the opening 201*x* in the housing 201 of the heat exchanger cleaner apparatus 200 such that the first conduit structure 242 extends through an interior of the heat exchanger cleaner apparatus 200. The connector 202*x* at the opening 201*x* may include a connector interface (e.g., a threaded connector, bayonet connector, fitting, or the like) that is configured to detachably or fixedly couple with a separate conduit structure comprising the conduit 252 that is external to the housing 201 of the heat exchanger cleaner apparatus 200, to thereby couple the separate conduit structure in fluid communication with the first conduit structure 242 via the opening 201*x* and any fitting or connector thereof.

As shown, the conduit 252 may include a second conduit structure 244 coupled (e.g., detachably via complementary connectors or fixed via adhesive, welding, or the like) at a first end to the first conduit structure 242 or connector 202*x* at the opening 201*x* and coupled (e.g., detachably via complementary connectors or fixed via adhesive, welding, or the like) at an opposite second end to a connector 246 located within the opening 109 of the housing 101 of the air handler 102. In some example embodiments, the connector 202*x* may be a flange, bracket, gasket, fitting, or the like which may be configured to at least seal a connection between the first and second conduit structures 242 and 244. The connector 246 may be a flange, bracket, gasket, fitting, or the like which may be configured to at least seal a connection between the conduit 252 and the housing 101 of the air handler 102. The connector 246 may include a first complementary connector interface (e.g., a threaded or bayonet connector) configured to detachably couple with the second conduit structure 244 outside the air handler 102 and a second, opposite complementary connector interface (e.g., a threaded or bayonet connector) configured to detachably couple with the third conduit structure 248 within the interior 192 of the air handler 102. The conduit 252 may include a third conduit structure 248 coupled (e.g., detachably via complementary connectors or fixed via adhesive, welding, or the like) at a first end to the connector 246 and coupled (e.g., detachably via complementary connectors or fixed via adhesive, welding, or the like) at an opposite second end to the spray nozzle 250.

Adjacent structures of the first to third conduit structures 242, 244, and/or 248, the connector 202*x*, and/or the connector 246 may be coupled to each other via complementary connectors, including for example complementary threaded connectors, bayonet connectors, or the like. The third conduit structure 248 and the spray nozzle 250 may be coupled to each other via complementary connectors, including for example complementary threaded connectors, bayonet connectors, or the like. The first conduit structure 242 and the outlet 2080 of the pump device 208 may be coupled to each other via complementary connectors, including for example complementary threaded connectors, bayonet connectors, or the like.

One or more of the first to third conduit structures 242, 244, and/or 248, connector 202*x*, connector 246, and/or spray nozzle 250 may be integrated into a single, unitary piece of material. For example, in some example embodiments the conduit structures 244 and 248 may be integrated together in a single, unitary piece of material that is a rigid (e.g., metal) or flexible (e.g., plastic) tube coupled at a first end to a connector 202*x* at the opening 201*x* to be coupled (e.g., detachably or affixed via welding, molding, adhesive, or the like) to the separate first conduit structure 242 via the connector 202*x* and coupled (e.g., detachably or affixed via welding, molding, adhesive, or the like) at a second, opposite end to the spray nozzle 250, where the first conduit structure 242 may be a same or different material composition as the integrated conduit structures 244, 248, and where the connector 246 may be omitted or may be a gasket surrounding an outer surface of the conduit 252 (e.g., the single unitary piece of material defining the tube that is integrated conduit structures 244, 248) and filling an annular space between the outer surface of the conduit 252 and an inner edge of the opening 109. The connector 246 may further include a seal, O-ring, or the like along the inner surface of the opening 109 to further establish a connection with the outer surface of the conduit 252. In some example embodiments, the connector 246 may include an adaptor (e.g., a variable inner diameter connector) that is configured to couple different serially-coupled conduit structures of the conduit 252 (e.g., conduit structures 244 and 248) that have different outer diameters and/or inner diameters. In another example, in some example embodiments the conduit structures 242 and 244 may be integrated together in a single, unitary piece of material that is a rigid (e.g., metal) or flexible (e.g., plastic) tube coupled (e.g., detachably or affixed via welding, molding, adhesive, or the like) at a first end to the outlet 2080 of the pump device 208 and coupled (e.g., detachably or affixed via welding, molding, adhesive, or the like) at a second, opposite end to the third conduit structure 248 (e.g., directly or via connector 246), where the third conduit structure 248 may be a same or different material composition as the integrated conduit structures 242, 244, and where the connector 202*x* may be omitted or may be a gasket surrounding an outer surface of the conduit 252 (e.g., the single unitary piece of material defining the tube that is integrated conduit structures 242, 244) and filling an annular space between the outer surface of the conduit 252 and an inner edge of the opening 201*x*. The connector 202*x* may further include a seal, O-ring, or the like along the inner surface of the opening 201*x* to further establish a connection with the outer surface of the conduit 252. In some example embodiments, the connector 202*x* may include an adaptor (e.g., a variable inner diameter connector) that is configured to couple different serially-coupled conduit structures of the conduit 252 (e.g., conduit structures 242 and 244) that have different outer diameters and/or inner diameters.

In another example, in some example embodiments the conduit structures 242, 244, and 246 may be integrated together in a single, unitary piece of material that is a rigid (e.g., metal) or flexible (e.g., plastic) tube coupled (e.g., detachably or affixed via welding, molding, adhesive, or the like) at a first end to the outlet 2080 of the pump device 208 and coupled (e.g., detachably or affixed via welding, molding, adhesive, or the like) at a second, opposite end to the spray nozzle 250, where the spray nozzle 250 may be a same or different material composition as the integrated conduit structures 242, 244, 248, and where one or both of the connectors 246 and/or 202*x* may be omitted or may be a gasket surrounding an outer surface of the conduit 252 (e.g., the single unitary piece of material defining the tube that is integrated conduit structures 242, 244, 248) and filling an annular space between the outer surface of the conduit 252 and an inner edge of the openings 201*x* or 109.

In some example embodiments, at least a portion of the conduit 252 may be integral to (e.g., fixed to via welding, adhesive, or the like, part of a same piece of material as at least a portion of, etc.) at least a portion of the pump device 208 and thus may be considered to be part of a same device as the pump device 208. For example, in some example embodiments the first conduit structure 242 may be considered to be a part (e.g., discharge conduit) of the pump device 208, such that a distal end of the first conduit structure 242 that is proximate to the opening 201*x* may be considered to be the outlet 2080 of the pump device 208, and said distal end may be coupled to the second conduit structure 244 directly or via a connector 202*x* at the opening 201*x*. The second conduit structure 244 may be a same piece of material as or a separate, coupled piece of material with regard to the third conduit structure 248 and coupled thereto directly or via connector 246. It will be understood that in some example embodiments the connector 202*x* may be absent such that separate conduit structures 242 and 244 may be directly coupled to each other via respective complementary connector interfaces (e.g., complementary threaded interfaces, bayonet interfaces, etc.), and where the first conduit structure 242 may extend through opening 201*x* to be coupled to the second conduit structure 244 externally to the housing 201. It will be understood that in some example embodiments the connector 246 may be absent such that separate conduit structures 244 and 248 may be directly coupled to each other via respective complementary connector interfaces (e.g., complementary threaded interfaces, bayonet interfaces, etc.).

In some example embodiments, the conduit 252 may be at least partially adjustable in length, to enable variable positioning of the spray nozzle 250 in the interior 192 of the air handler 102. For example, the conduit 252 may include the conduit structures 244 and 248 integrated together into a single telescopically extendable tube device configured to be telescopically extendable along its respective longitudinal axis to enable adjustment of the distance of the spray nozzle 250 along the longitudinal axis from the housing 201 of the heat exchanger cleaner apparatus 200, thereby enabling adjustable positioning of the spray nozzle 250 in the interior 192 of the air handler 102 to adjustably control a spacing distance of the spray nozzle 250 from the heat exchanger 110 to adjustably control the impingement of the fluid stream 232 sprayed by the spray nozzle on one or more outer surface 110*s* of the heat exchanger 110 (e.g., adjustably control an area of the outer surface(s) impinged by the fluid stream 232) based on adjustable positioning of a spacing distance of the spray nozzle 250 from the heat exchanger 110.

The spray outlet assembly 240 is configured to establish fluid communication between the outlet 2080 of the pump device 208 of the heat exchanger cleaner apparatus 200 and the interior 192 of the air handler 102 and to direct a fluid stream 232 (e.g., an amount) of cleaning composition 230 pumped into the conduit 252 by the pump device 208 as a fluid stream 232 into the interior to contact an outer surface 110*s* of the heat exchanger 110 to reduce and/or remove substances (e.g., mold, algae, mildew, bacteria, fungi, dander, pollen, zooglea (also referred to as *zoogloea*), any combination thereof, or the like) from the outer surface 110*s* of the heat exchanger 110, thereby improving heat transfer efficiency and/or performance of the heat exchanger 110 and thus of the air conditioning system 100 to remove heat from the air 106.

In some example embodiments, the heat exchanger cleaner apparatus 200 includes a structure connector 220 that is configured to connect the heat exchanger cleaner apparatus 200 to an external structure (e.g., a housing 101 of the air handler 102 as shown) to at least partially hold the heat exchanger cleaner apparatus 200 in place in relation to the opening 109 through the housing 101 of the air handler 102 (e.g., at least partially structurally support the heat exchanger cleaner apparatus 200 in relation to the opening 109). As described further herein, the structure connector 220 may have various structures. For example, the structure connector 220 may include an adhesive connector, a magnet, or the like to couple with the housing 101 of the air handler 102.

In some example embodiments, the pump device 208 may include any known positive displacement pump, a gear pump, or the like that is configured to operate for a particular period of time to move the amount of the cleaning composition 230 from the inlet 208*i* which is in fluid communication with the apparatus reservoir 202, cartridge reservoir 304, internal reservoir 206, or the like to the outlet 2080 which is in fluid communication with the spray outlet assembly 240, based on a control signal generated by the controller 210.

As described herein, a cleaning composition 230 may be any known chemical composition (e.g., solution, liquid, fluid, etc.) that may be configured to clean (e.g., remove) potential buildup substances (e.g., mold, algae, mildew, bacteria, fungi, dander, pollen, zooglea (also referred to as *zoogloea*), any combination thereof, or the like) from an outer surface 110*s* of the heat exchanger 110 of the air handler 102. In some example embodiments, the cleaning composition 230 may be a chemical substance that is or includes a chelating agent (e.g., chelant) including, for example, sodium hexametaphosphate, that is configured to remove potential buildup substances from the outer surface 110*s* of the heat exchanger 110 of the air handler 102 based on chelation upon contact with the potential buildup substances. For example, the cleaning composition 230 may be a liquid solution that includes 3%-7% sodium hexametaphosphate, by weight of the total weight of the cleaning composition 230. Based on the heat exchanger cleaner apparatus 200 being configured to pump cleaning composition 230 through the spray outlet assembly 240, where the cleaning composition 230 is dispensed into the interior 192 of the air handler 102 to contact an outer surface 110*s* of the heat exchanger 110 of the air handler, the heat exchanger cleaner apparatus 200 may be configured to enable removal of potential buildup substances (e.g., mold, algae, mildew, bacteria, fungi, dander, pollen, zooglea (also referred to as *zoogloea*), any combination thereof, or the like) from an outer surface 110*s* of the heat exchanger 110 of the air handler 102 by the cleaning composition 230, which may thereby reduce or prevent the reduction in heat transfer performance of the heat exchanger 110 due to the potential buildup substances.

As shown in FIGS. 2A and 2B, the heat exchanger cleaner apparatus 200 may include a power supply 212 that is configured to supply electrical power to devices included therein, including the controller 210, the pump device 208, a network communication interface 224, a sensor, or the like. As shown, the power supply 212 may include a battery 214, which may include any known rechargeable battery (e.g., a lithium ion battery). As further shown, in some example embodiments the power supply 212 may include a wired power connection 216 which may be configured to couple to a power outlet provided at the structure 1 and/or the air handler 102. The power supply 212 may further include a charging circuit 218 that may be configured to recharge the battery 214 from the wired power connection 216 and may be configured to enable the battery 214 to supply power to operate the heat exchanger cleaner apparatus 200 in the absence of electrical power being received via the wired power connection 216.

As shown in FIGS. 2A and 2B, the controller 210 may be configured to operate the pump device 208 to cause a particular amount of the cleaning composition 230 to be pumped from the inlet 208*i* (e.g., from the apparatus reservoir 202, internal reservoir 206, and/or cartridge reservoir 304 via the inlet 208*i*) and through the spray outlet assembly 240 (e.g., via the outlet 2080) without manual intervention. For example, the controller 210 may be configured to cause an electrical signal to be generated and transmitted to the pump device 208 to cause the pump device 208 to operate for a period of time (e.g., a particular, or alternatively predetermined prior of time), to thus cause a particular amount of the cleaning composition 230 to be pumped from the inlet 208*i* to the outlet 2080.

The controller 210 may include a memory (e.g., a solid state drive, or SSD) storing a program of instructions, and the controller 210 may include a processor (e.g., a Central Processing Unit, or CPU) configured to execute the program of instructions to implement any functionality of the controller 210 according to any example embodiments. However, example embodiments are not limited thereto. For example, in some example embodiments, the controller 210 may include circuitry that is configured to implement a timer circuit (e.g., a clock, timer, or any combination thereof) and is configured to generate a signal to operate the pump device 208 based on the timer circuit counting a particular time interval.

In some example embodiments, the controller 210 is configured to operate the pump device 208 to cause the pump device 208 to pump an amount of cleaning composition 230 through the spray outlet assembly 240 to be sprayed through the spray nozzle 250 thereof into the interior 192 of the air handler 102 into contact with an outer surface 110*s* of a heat exchanger 110 of the air handler 102. In some example embodiments, the controller 210 may be configured to generate a signal to cause at least a portion of the pump device 208 to operate to pump cleaning composition 230 therethrough for a particular period of time that is associated, at the controller 210, with causing a particular amount of cleaning composition 230 to be pumped by the pump device 208. The controller 210 may cause a particular amount of cleaning composition 230 to be pumped based on accessing a look-up-table that is stored in a memory of the controller 210, where the look-up-table is empirically generated and associates a period of time of pump device operation of at least a portion of the pump device 208 (e.g., a period of time of generation of a control signal) with pumping (e.g., selective pumping) of a corresponding amount of cleaning composition 230 by the pump device 208. The controller 210 may determine a particular amount of cleaning composition 230 to be pumped, access the look-up-table to determine a corresponding duration or period of applied control signal to the pump device 208, and then generate a control signal that is transmitted to the pump device 208 to cause at least a portion of the pump device 208 to be operated for the corresponding duration or period.

In some example embodiments, the controller 210 is configured to operate the pump device 208 to cause an amount of cleaning composition 230 (e.g., 3 oz) to be pumped in response to an elapse of a particular period of time (e.g., 7 days, or 168 hours). The controller 210 may be configured to operate the pump device 208 repeatedly upon repeated elapse of the particular period of time, which may be referred to as a "fixed time interval" (e.g., a fixed time interval of 7 days). In some example embodiments, the apparatus reservoir 202, cartridge reservoir 304, and/or internal reservoir 206 may be configured to hold a total volume of 36 oz, so that the heat exchanger cleaner apparatus 200 may be configured to pump 3 oz of cleaning composition 230 to be sprayed as a fluid stream 232 in the interior 192 of the air handler 102 to at least partially contact an outer surface 110*s* of the heat exchanger 110 every 7 days for a period of 12 weeks (84 days).

The controller 210 may be configured to repeatedly operate the pump device 208 at a fixed time interval (e.g., 7 days), based on monitoring a timer that increments a timer value at a fixed frequency, operating the pump device 208 in response to the timer value reaching a particular time value corresponding to the elapse of the particular period of time, and resetting the timer value to an initial timer value (e.g., 0 days) in response to operating the pump device 208. For example, the controller 210 may include and/or implement a clock and/or timer that counts a period of elapsed time from an initial timer value (e.g., increments from 0 days) at a fixed frequency (e.g., counts days, hours, minutes and/or seconds at a fixed frequency of days, hours, minutes and/or seconds). In response to determining that a threshold timer value is reached (e.g., a timer value corresponding to the particular period of time and/or fixed time interval of 7 days), the controller 210 may generate a signal to cause the pump device 208 to operate for at least a particular (e.g., predetermined) period of time to cause an amount (e.g., particular amount) of the cleaning composition 230 to be pumped through the spray outlet assembly 240 via the outlet 2080 and further re-set the timer value so that the controller 210 may subsequently cause the pump device 208 to pump another amount of the cleaning composition 230 upon a re-elapse of the particular period of time. The controller 210 may be configured to perform this process repeatedly so long as electrical power is supplied to the controller 210 (e.g., from power supply 212), so that the process may be performed (e.g., repeatedly at a fixed time interval) without human intervention.

In some example embodiments, the controller 210 is configured to implement a counter that increments a counter value, starting from an initial value (e.g., 0), in response to each operation of the pump device 208. As a result, where the controller 210 repeatedly operates the pump device 208 at a fixed time interval, the controller 210 may track the number (e.g., quantity) of pumpings of an amount of cleaning composition 230 (e.g., the number of operations of the pump device 208) over time. Therefore, where the heat exchanger cleaner apparatus 200 and/or heat exchanger cleaner apparatus system 1100 is configured to hold a particular total amount of cleaning composition 230 (e.g., 36 oz) (e.g., in the cartridge reservoir 304), the controller 210 may track the counter value to determine when the total amount of cleaning composition 230 available to be pumped to be sprayed in the fluid stream 232 into the interior 192 of the air handler 102 is about to be depleted or is depleted and may generate a signal (e.g., a depletion signal) in response to the counter value reaching a value that corresponds to partial or complete (e.g., total, final, etc.) depletion of the cleaning composition 230 held by the heat exchanger cleaner apparatus system 1100.

For example, where the cartridge 300 is configured to hold a particular total amount of cleaning composition 230 that is 36 oz, and where the controller 210 is configured to cause the pump device 208 to pump an amount of 3 oz of cleaning composition 230 at a fixed time interval of 7 days, the total amount of cleaning composition 230 may be depleted upon completion of 12 dispensings (e.g., pumpings). The controller 210 may store a threshold counter value of 10, 11, or 12 that corresponds to partial depletion, near-depletion, or total depletion of the total amount of cleaning composition 230 held in the heat exchanger cleaner apparatus system 1100 (e.g., held in the cartridge reservoir 304 of the cartridge 300. The controller 210 may implement and/or monitor a counter that increments a counter value in response to each operation of the pump device 208, and generate a depletion signal in response to the counter value reaching a particular counter value that corresponds to at least partial depletion of a fixed reservoir (e.g., the cartridge reservoir 304) of the cleaning composition (e.g., 10, 11, or 12). As described herein, the controller 210 may transmit the depletion signal to a display interface (e.g., an LED, an audio speaker), which may be included in the heat exchanger cleaner apparatus 200 or may be included in a remote computing device, to provide a depletion warning. The controller 210 may further or alternatively be configured to cause the depletion signal to a remote computing device (e.g., via a network communication interface 224 as described herein) in order to inform a remote human user supported by the remote computing device of the partial or complete depletion (e.g., final depletion) of the total amount of cleaning composition 230 held in the heat exchanger cleaner apparatus system 1100. The human user may then be informed of the partial or complete depletion so that the human user may take action to replenish the cleaning composition held in the heat exchanger cleaner apparatus system 1100 (e.g., based on detaching and replacing the depleted cartridge 300 with a new, full cartridge 300 coupled to the heat exchanger cleaner apparatus 200.

Additionally, the heat exchanger cleaner apparatus 200 may include a counter reset interface 222 (e.g., a button) that is configured to cause the counter value to be reset to an initial counter value (e.g., 0) in response to human interaction with the counter reset interface 222 (e.g., in response to a human user pushing the button after replenishing the total amount of cleaning composition 230 held in the heat exchanger cleaner apparatus system 1100, for example in the cartridge reservoir 304 of the cartridge 300 that is coupled to the heat exchanger cleaner apparatus 200 based on the cartridge 300 being detachably coupled to the heat exchanger cleaner apparatus 200).

Still referring to FIGS. 2A and 2B, the heat exchanger cleaner apparatus 200 may include a network communication interface 224 that is communicatively coupled to the controller 210. It will be understood that the network communication interface 224 may be separate from the controller 210 as shown or may be included in and/or implemented by the controller 210. The network communication interface 224 may be any known network communication transceiver, including a wireless network communication transceiver such as a WI-FI transceiver, 5G cellular network communication transceiver, an ad hoc network communication transceiver such as a Bluetooth® transceiver, any combination thereof, or the like.

The controller 210 may be configured to establish a network communication link (which may be a wired network communication link, a wireless network communication link, an ad hoc wireless network communication link, or the like) with a remote computing device as described herein and may engage in one-way or two-way communication with the remote computing device via the network communication link.

In some example embodiments, the controller 210 may communicate signals over the network communication link that indicate operations of the controller 210 (e.g., indicating operation of the pump device 208 at particular points in time, a present timer value, a present counter value, etc.). In some example embodiments, the controller 210 may communicate the depletion signal (generated in response to the counter value reaching a threshold value) to the remote computing device 700 via the network communication link 702.

In some example embodiments, the controller 210 may be configured to perform operations in response to receiving signals from the remote computing device via the network communication link. For example, the controller 210 may be configured to cause the counter value of the counter value to be reset to an initial counter value (e.g., 0) in response to receiving a reset signal from the remote computing device via the network communication link (which may be transmitted by the remote computing device in response to a human user replenishing the total amount of cleaning composition 230 held in the heat exchanger cleaner apparatus system 1100 for example based on detaching a cartridge 300 with a substantially empty cartridge reservoir 304 from the heat exchanger cleaner apparatus 200 and further coupling a new cartridge 300 with a cartridge reservoir 304 substantially full of cleaning composition 230 to the heat exchanger cleaner apparatus 200).

Still referring to FIGS. 2A and 2B, in some example embodiments, the heat exchanger cleaner apparatus system 1100 (e.g., the heat exchanger cleaner apparatus 200) may be communicatively coupled to a remote computing device 700 communicatively via a network communication link 702.

In some example embodiments, the network communication interface 224 (e.g., a wireless network communication transceiver) is configured to establish a network communication link with a remote computing device 700. The remote computing device 700 may be configured to support a human user.

As shown, the remote computing device 700 may include a processor 720 (e.g., a CPU), a memory 730 (e.g., a SSD), a power supply 740 (e.g., a rechargeable battery), a network communication interface 750 (e.g., a wireless network communication transceiver), and an interface 760 that may include a display device (e.g., an LED display panel, an OLED display panel, or the like) a button, a touchscreen display device, any combination thereof, or the like that are communicatively and/or electrically coupled via a bus connection 710.

At least some of the remote computing device 700, including for example the processor 720, the memory 730, the network communication interface 750, or any combination thereof, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. It will be understood that any type of non-transitory computer readable storage device may be used as the memory 730 in addition or alternative to an SSD. In some example embodiments, the processing circuitry may include a non-transitory computer readable storage device, or memory (e.g., memory 730), for example a solid state drive (SSD), storing a program of instructions, and a processor (e.g., processor 720) that is communicatively coupled to the non-transitory computer readable storage device (e.g., via a bus connection 710) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, any part of the remote computing device 700) will be understood to implement the functionality of said implemented element (e.g., the functionality of the remote computing device 700).

As shown, the network communication interface 224 of the heat exchanger cleaner apparatus 200 may be configured to establish a network communication link 702 with the remote computing device 700 (e.g., with network communication interface 750) and may be configured to implement one-way or two-way communication between the heat exchanger cleaner apparatus 200 and the remote computing device 700.

In some example embodiments, the controller 210 is configured to generate and transmit signals to the remote computing device 700 via the wireless network communication link 702.

In some example embodiments, the controller 210 may communicate signals over the network communication link 702 that indicate operations of the controller 210 (e.g., indicating actuation of the pump device 208 at particular points in time, a present timer value, a present counter value, etc.). In some example embodiments, the controller 210 may communicate the depletion signal (generated in response to the counter value reaching a threshold value) to the remote computing device 700 via the network communication link 702.

In some example embodiments, the controller 210 may be configured to perform operations in response to receiving signals from the remote computing device 700 via the network communication link 702. Such signals may be generated at the remote computing device 700 based on operation of at least a portion of the remote computing device 700 (e.g., based on operation of the processor 720), which may be based on human user interaction with at least a portion of an interface of the remote computing device 700 (e.g., the interface 760, which may be a touchscreen display). For example, the remote computing device 700 may generate a reset signal based on human interaction with an interface 760 to indicate that the amount of cleaning composition 230 held in the heat exchanger cleaner apparatus system 1100 (e.g., held in the cartridge 300 coupled to the heat exchanger cleaner apparatus 200) has been replenished (e.g., via replacement of a cartridge 300 coupled to the heat exchanger cleaner apparatus 200). The remote computing device 700 may transmit the reset signal to the heat exchanger cleaner apparatus 200 via the network communication link 702, and the controller 210 may be configured to cause the counter value of the counter value to be reset to an initial counter value (e.g., 0) in response to receiving the reset signal from the remote computing device 700 via the network communication link 702. As a result, a human user may be able to remotely reset the counter value used by the heat exchanger cleaner apparatus 200 in response to cleaning composition 230 replenishment without direct interaction with the heat exchanger cleaner apparatus (e.g., via a button on the heat exchanger cleaner apparatus 200).

In some example embodiments, the controller 210 may be communicatively coupled to the air conditioning system 100 via communication link 704, which may be a wired connection and/or wireless communication link with one or more portions of the air conditioning system 100 (e.g., with controller 140). The controller 210 may be configured to communicate (e.g., transmit and/or receive signals) with the air conditioning system 100 (e.g., controller 140) via the communication link 704 to cause some or all of the air conditioning system 100 to shut down in response to receiving a shutdown command signal from the remote computing device 700 via the network communication link 702. For example, the remote computing device 700 may display a warning notification to a supported user (e.g., via interface 760) in response to receiving the warning signal to the remote computing device 700. The remote computing device 700 may enable the human user to interact with the interface 760 (e.g., a touchscreen display) to command the remote computing device 700 to transmit a shutdown signal to the heat exchanger cleaner apparatus 200 in response to the warning signal via the network communication link 702. The remote computing device 700 may transmit the shutdown signal to the heat exchanger cleaner apparatus 200 via the network communication link 702. The controller 210 may be communicatively coupled to the controller 140 of the air handler 102 via the communication link 704 which may include a wired electrical connection, a wireless network communication link, or the like. The controller may generate a signal, and transmit the signal via communication link 704, to cause some or all of the air conditioning system 100 to shut down (e.g., transmit a signal to the controller 140 via a wired electrical connection, a network communication link with a network communication interface of the air conditioning system 100 that may be included in and/or implemented by controller 140, etc.), for example based on causing the controller 140 to shut down some or all of the air conditioning system 100 in response to receiving the shutdown signal.

In some example embodiments, the controller 210 may be configured to shut down operation of the heat exchanger cleaner apparatus system 1100 (e.g., disable or inhibit operation of the pump device 208, regardless of timer and/or counter values) in response to receiving a signal from the air conditioning system 100 and/or a remote computing device 700, where the signal may indicate (e.g., based on being processed by the controller 210) that the air conditioning system 100 is at least partially shut down. Such a received signal may be received at the controller from a part of the air conditioning system 100 (e.g., controller 140) via a communication link 704 which may include a wired electrical connection between the heat exchanger cleaner apparatus 200 and the part of the air conditioning system 100 (e.g., air handler 102, controller 140, etc.). Such a received signal may be received at the controller from a part of the air conditioning system 100 (e.g., controller 140) via a communication link 704 which may include a wireless network communication link between the heat exchanger cleaner apparatus 200 and the part of the air conditioning system 100 (e.g., air handler 102, controller 140, etc.). Such a received signal may be received at the controller from the remote computing device 700 via a wireless network communication link 702 between the heat exchanger cleaner apparatus 200 and the remote computing device 700. The controller 210 may be further configured to enable operation of the pump device 208 (e.g., enable causing the pump device 208 to operate based on pumping command signals, timer values, and/or counter values as described herein) in response to receiving an enable command from a part of the air conditioning system 100 (e.g., controller 140) via a communication link 704 (e.g., a wired electrical connection and/or wireless communication link) and/or a remote computing device 700 via wireless network communication link 702.

In some example embodiments, the remote computing device 700 may enable the human user to interact with the interface 760 (e.g., via a touchscreen display) to command the remote computing device 700 to transmit a pumping signal to the heat exchanger cleaner apparatus 200 to cause the controller 210 to implement an immediate operation of the pump device 208 to immediately pump an amount of the cleaning composition 230 to the spray outlet assembly 240, thereby allowing more frequent or user-commanded pumpings of cleaning composition. The remote computing device may transmit the pumping signal to the heat exchanger cleaner apparatus 200 via the network communication link

702, and the controller 210 may operation the pump device 208 in response to receiving the pumping signal.

Figure 3A:
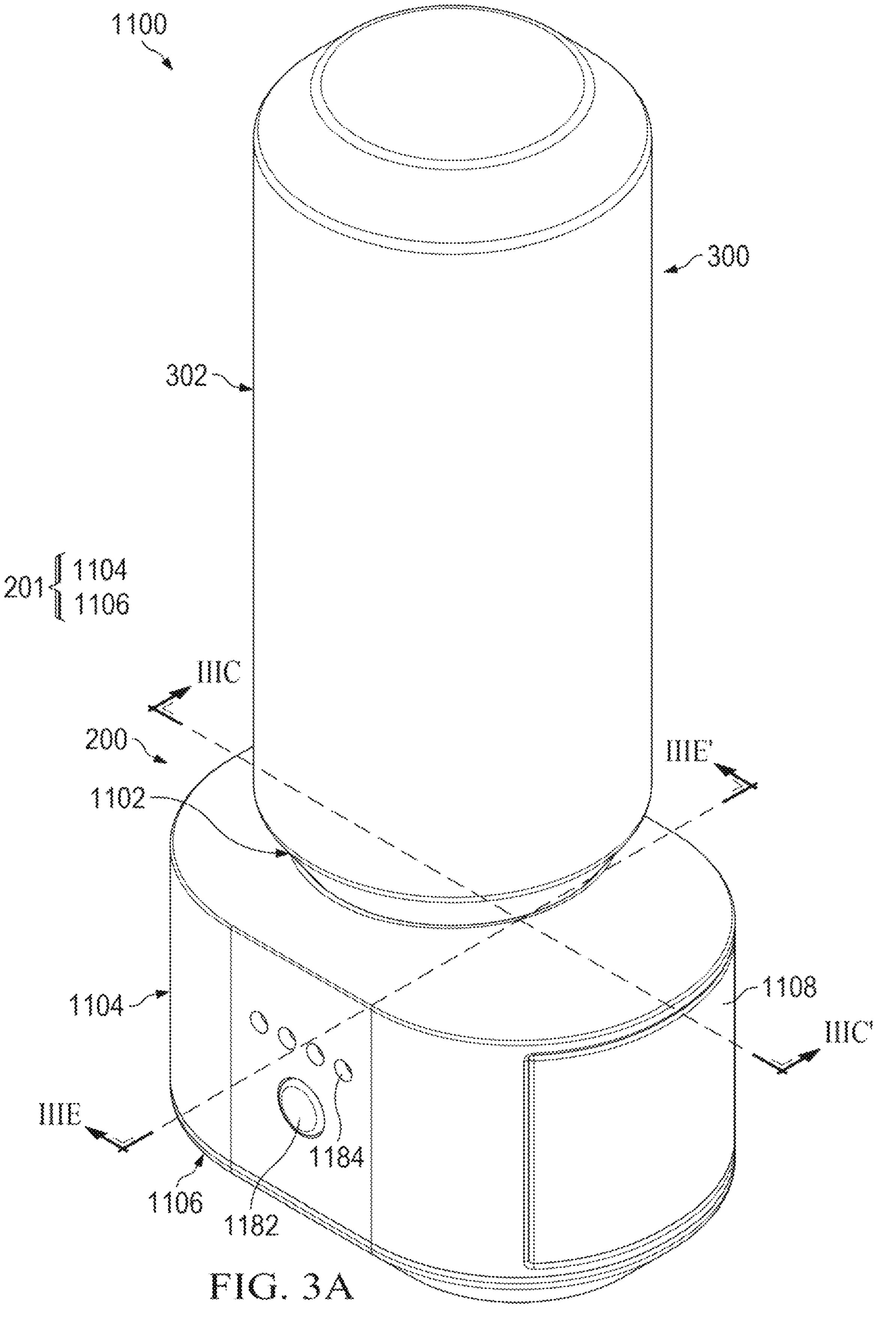
FIG. 3A is a perspective top-front-right view of a heat exchanger cleaner apparatus system according to some example embodiments.
Figure 3B:
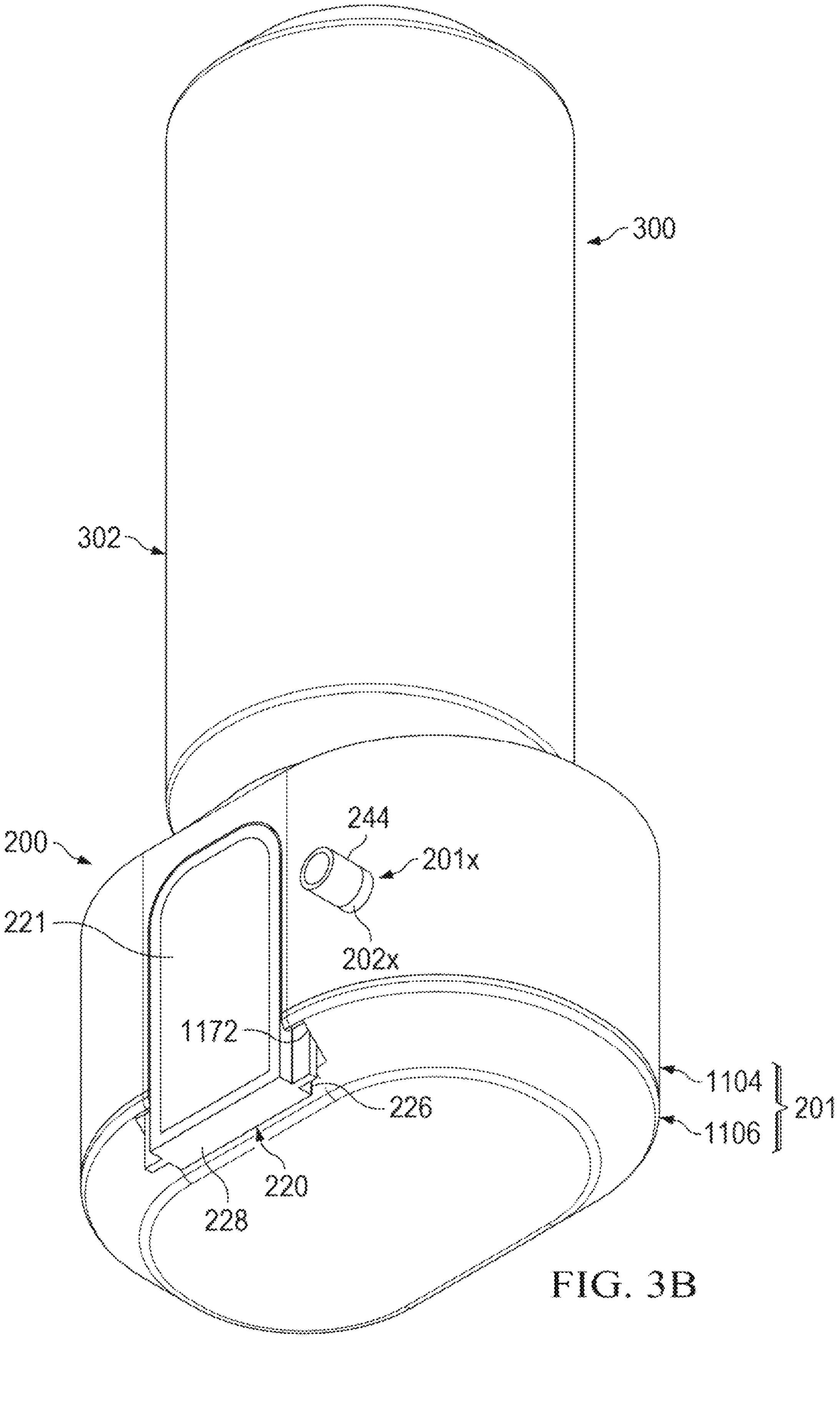
FIG. 3B is a perspective bottom-rear-left view of the heat exchanger cleaner apparatus system of FIG. 3A according to some example embodiments.
Figure 3C:
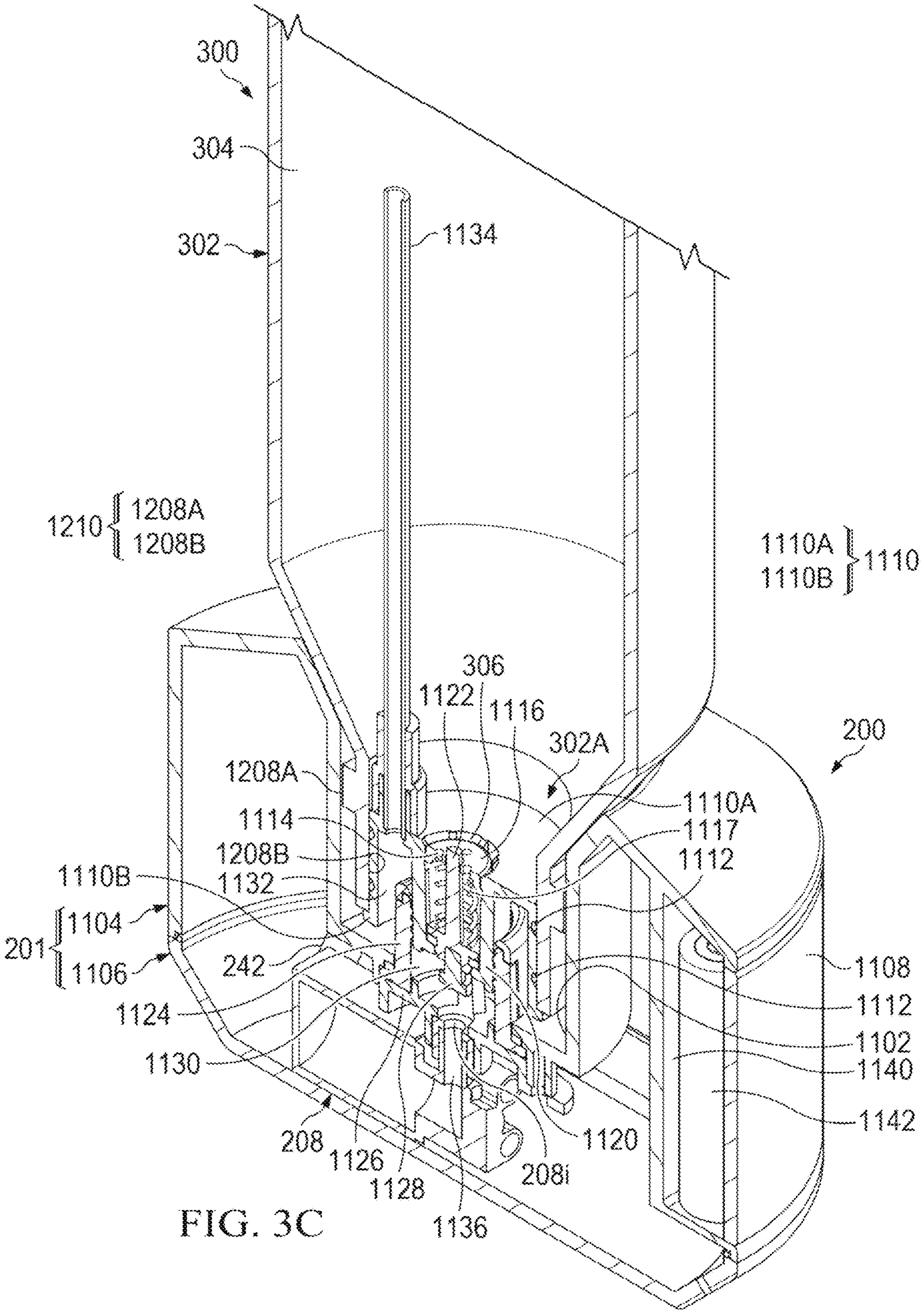
FIG. 3C is a perspective cross-sectional view of the heat exchanger cleaner apparatus system along cross-sectional view line IIIC-IIIC' of FIG. 3A according to some example embodiments.
Figure 3D:
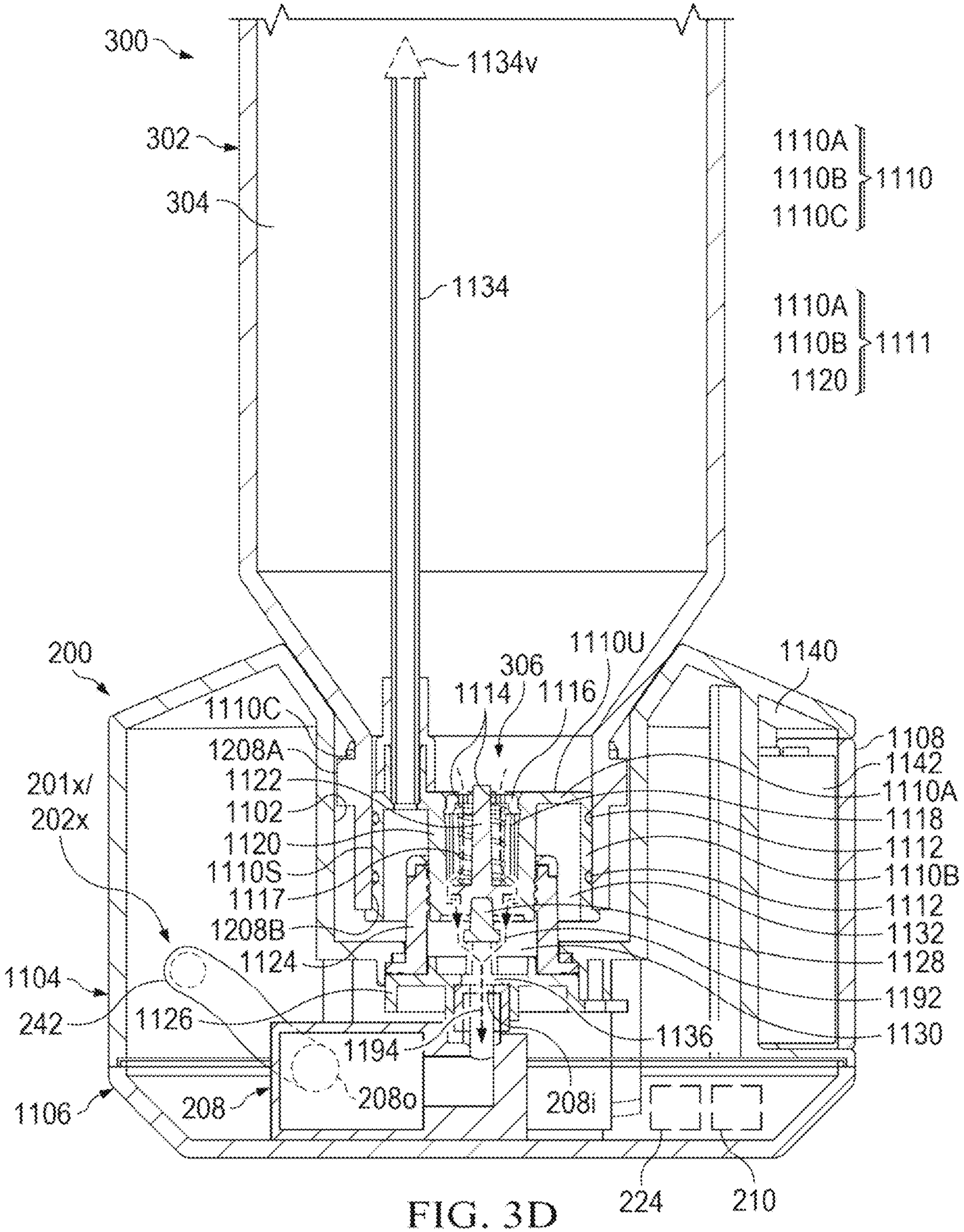
FIG. 3D is a plan cross-sectional view of the heat exchanger cleaner apparatus system along cross-sectional view line IIID-IIID' of FIG. 3A according to some example embodiments.
Figure 3E:
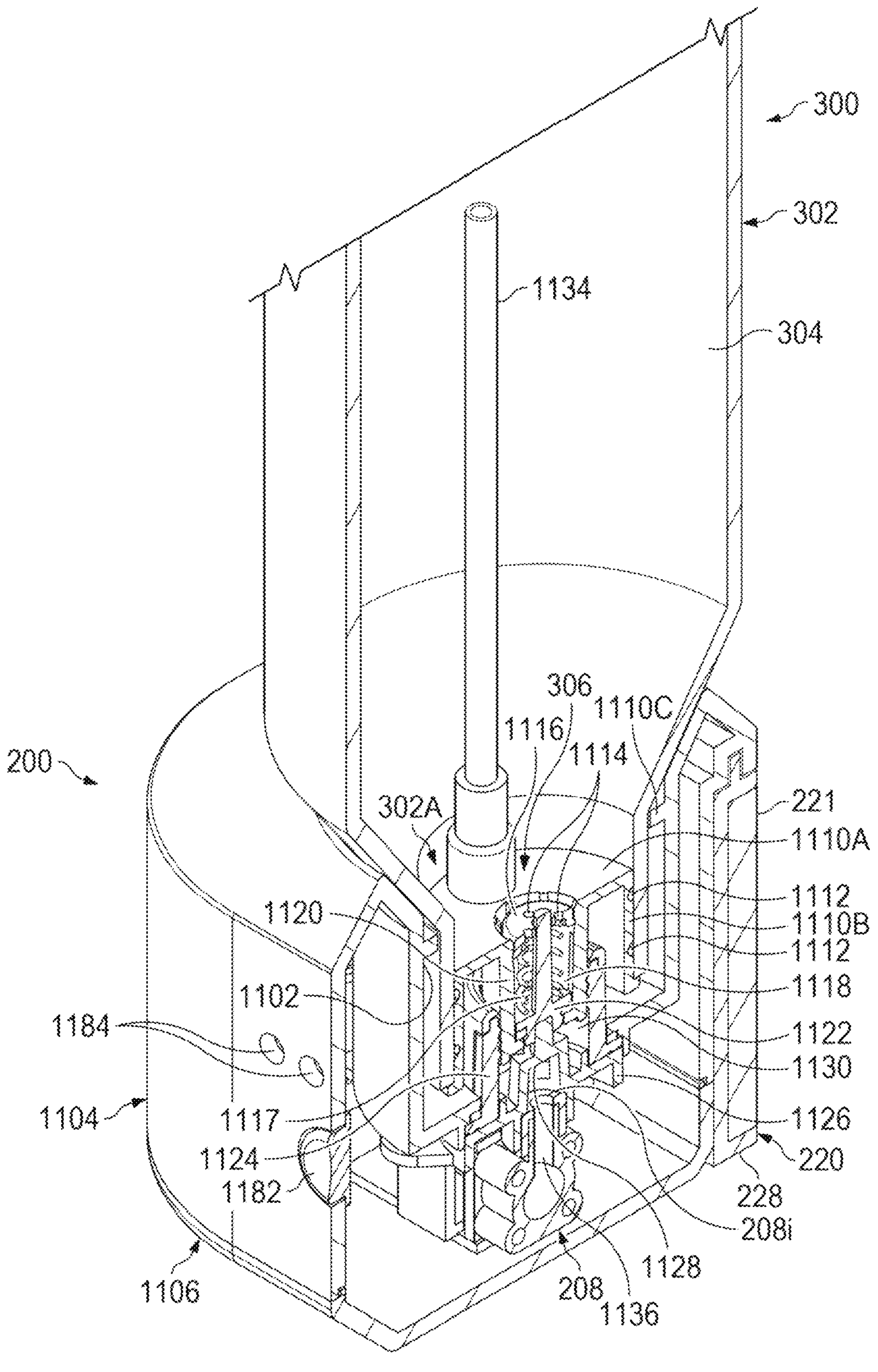
FIG. 3E is a perspective cross-sectional view of the heat exchanger cleaner apparatus system along cross-sectional view line IIIE-IIIE' of FIG. 3A according to some example embodiments.
Figure 3F:
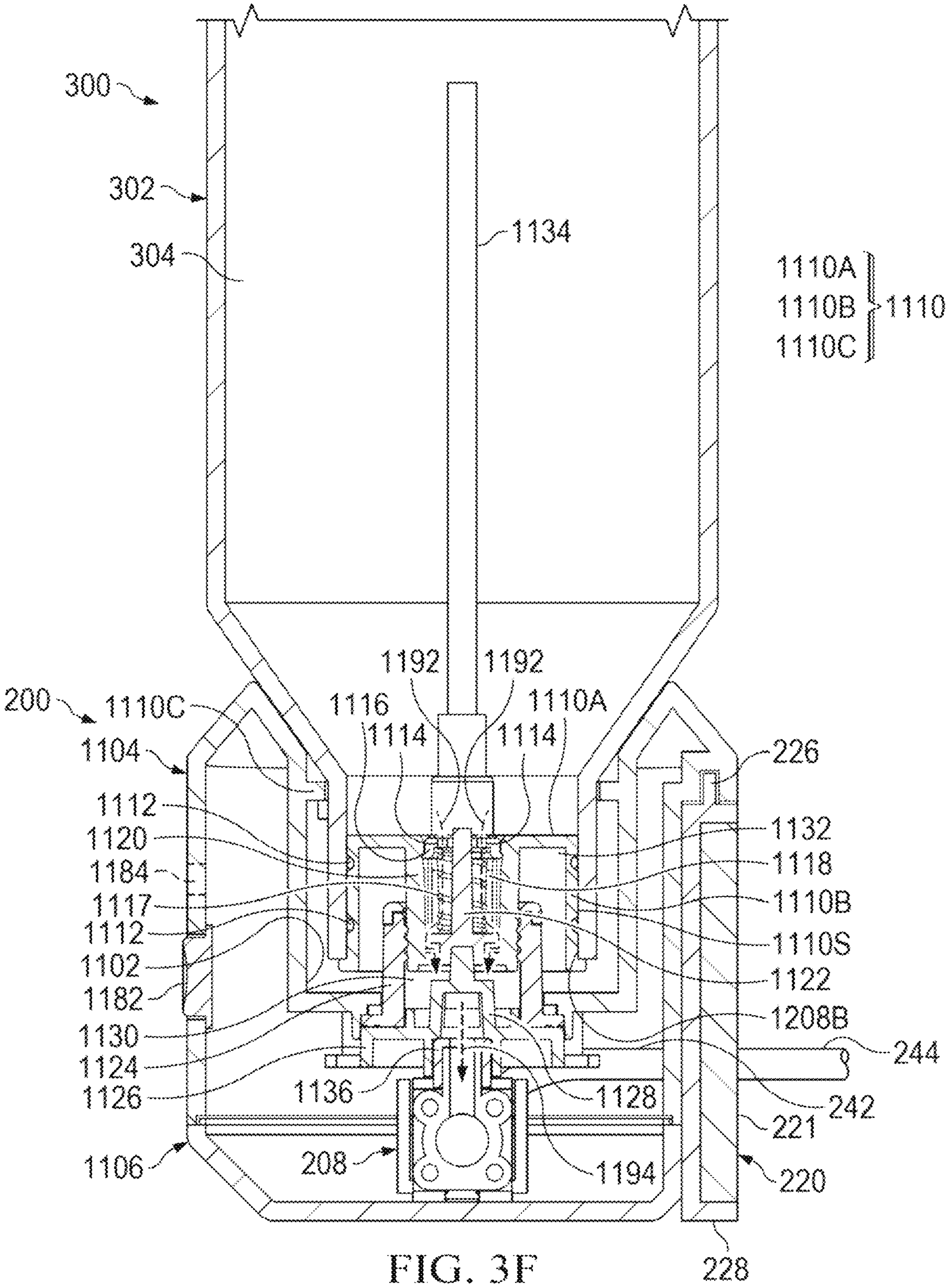
FIG. 3F is a plan cross-sectional view of the heat exchanger cleaner apparatus system along cross-sectional view line IIIF-IIIF' of FIG. 3A according to some example embodiments.

FIG. 3A is a perspective top-front-right view of a heat exchanger cleaner apparatus system according to some example embodiments. FIG. 3B is a perspective bottom-rear-left view of the heat exchanger cleaner apparatus system of FIG. 3A according to some example embodiments. FIG. 3C is a perspective cross-sectional view of the heat exchanger cleaner apparatus system along cross-sectional view line IIIC-IIIC' of FIG. 3A according to some example embodiments. FIG. 3D is a plan cross-sectional view of the heat exchanger cleaner apparatus system along cross-sectional view line IIID-IIID' of FIG. 3A according to some example embodiments. FIG. 3E is a perspective cross-sectional view of the heat exchanger cleaner apparatus system along cross-sectional view line IIIE-IIIE' of FIG. 3A according to some example embodiments. FIG. 3F is a plan cross-sectional view of the heat exchanger cleaner apparatus system along cross-sectional view line IIIF-IIIF' of FIG. 3A according to some example embodiments.

Figure 4A:
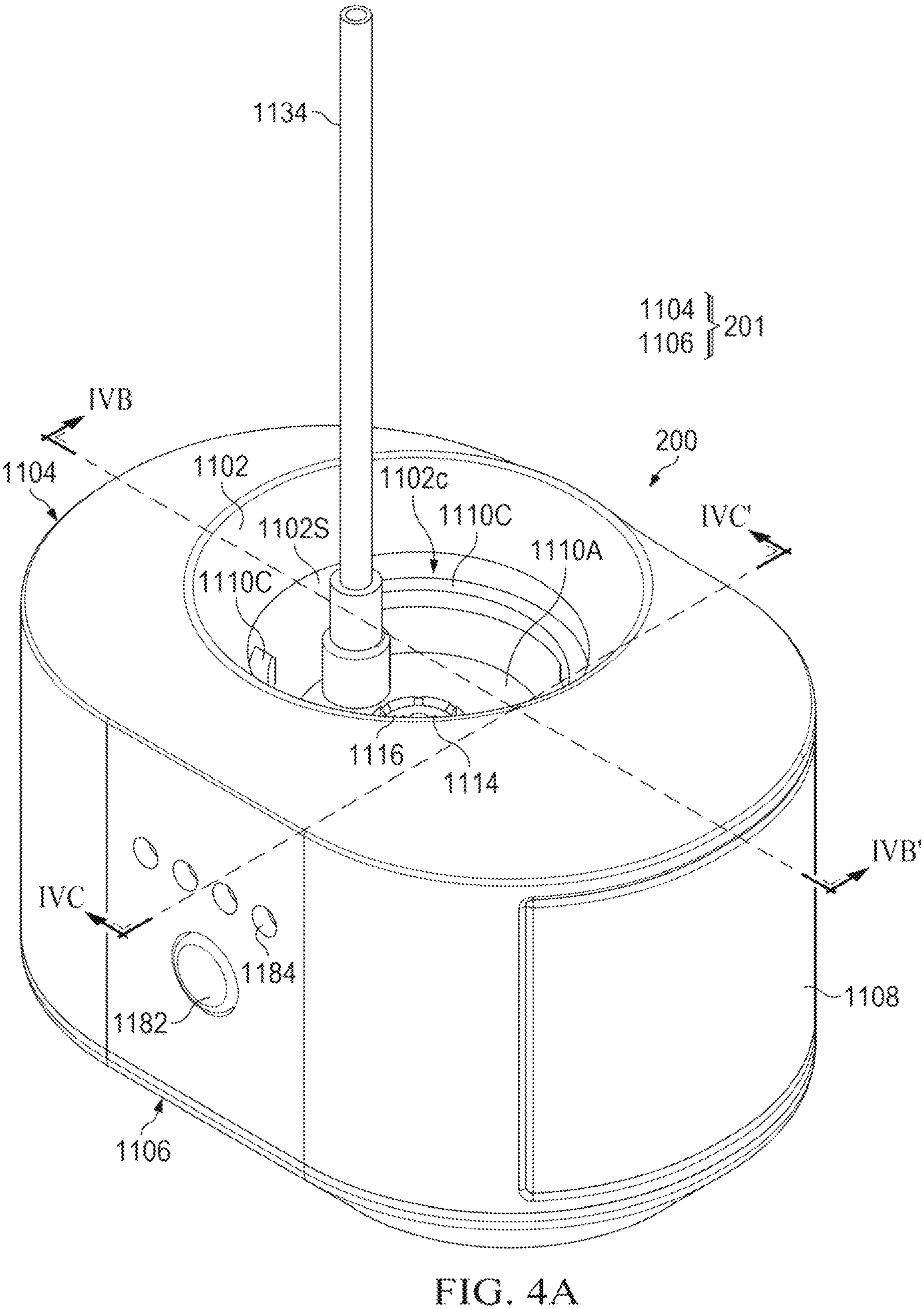
FIG. 4A is a perspective top-front-right view of the heat exchanger cleaner apparatus shown in FIG. 3A according to some example embodiments.
Figure 4B:
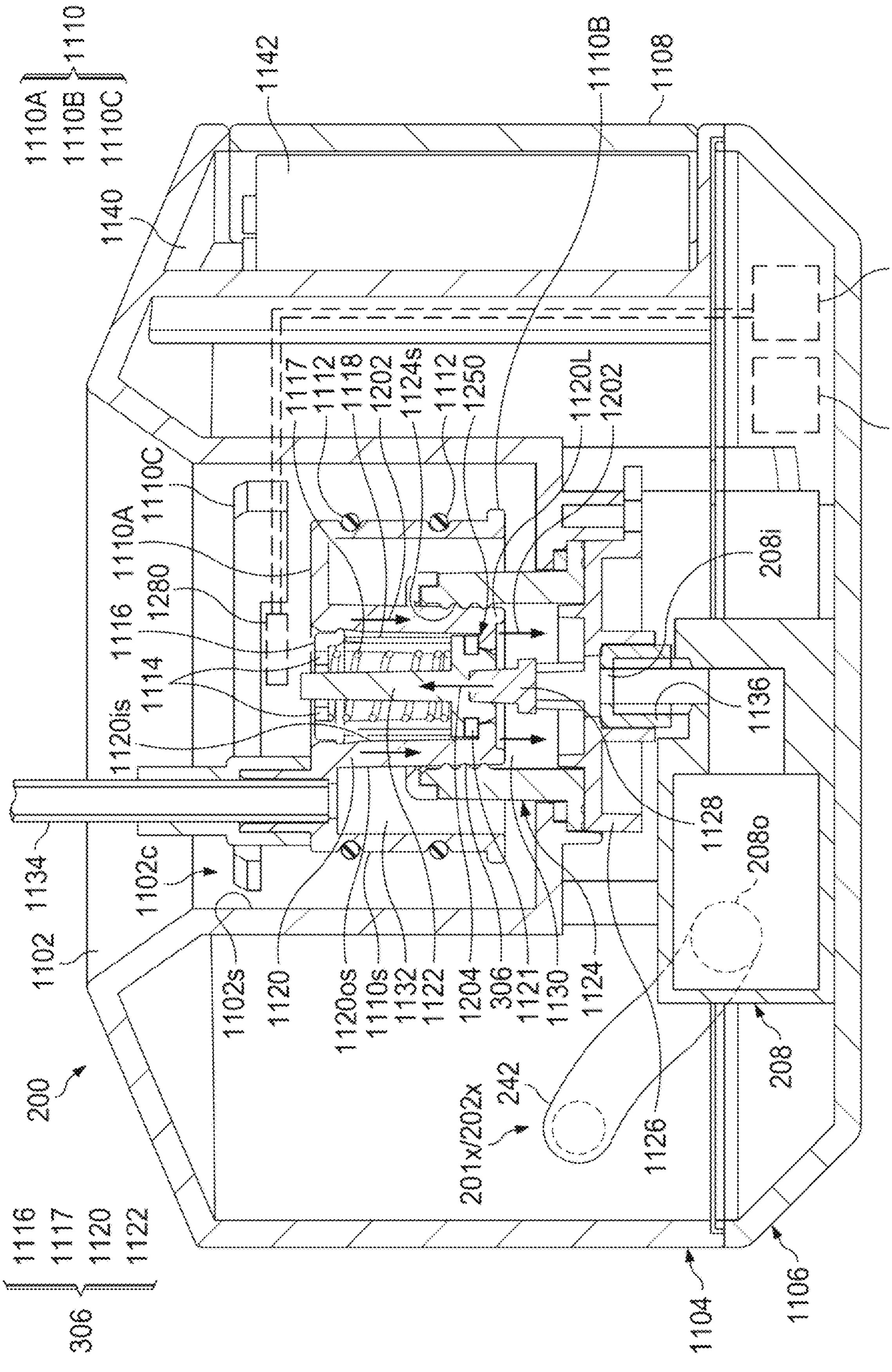
FIG. 4B is a plan cross-sectional view of the heat exchanger cleaner apparatus along cross-sectional view line IVB-IVB' of FIG. 4A according to some example embodiments.
Figure 4C:
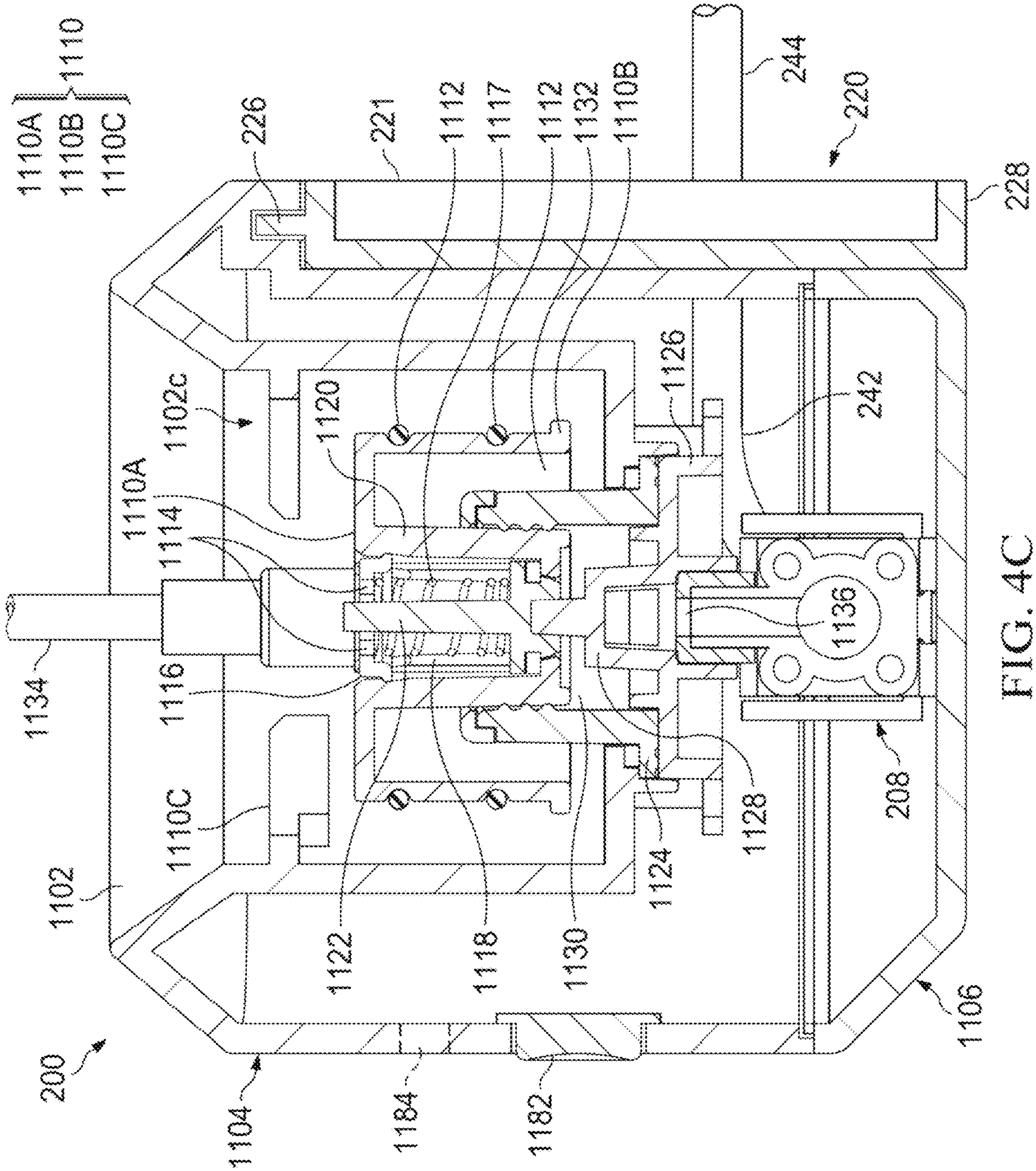
FIG. 4C is a plan cross-sectional view of the heat exchanger cleaner apparatus along cross-sectional view line IVC-IVC' of FIG. 4A.
Figure 4D:
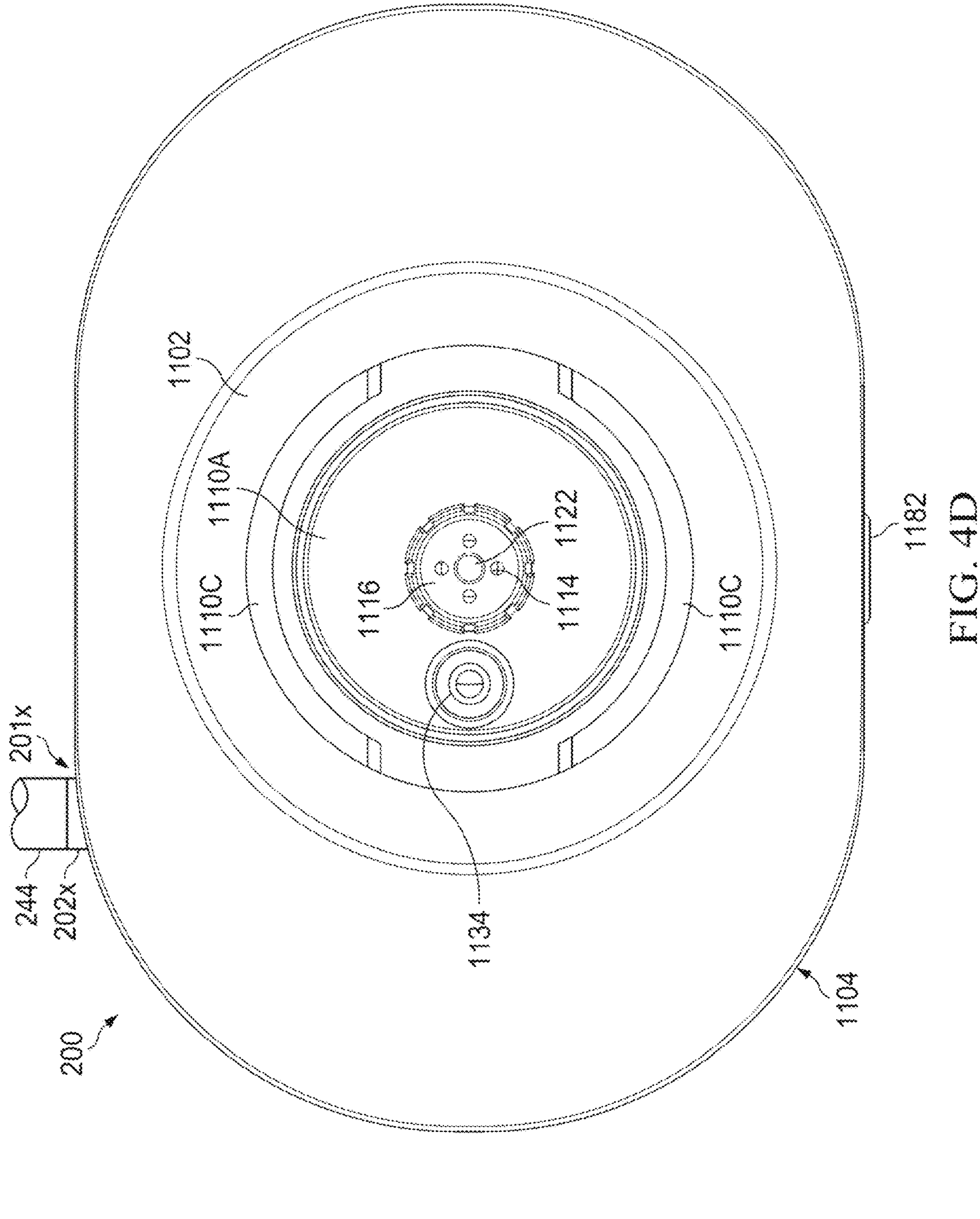
FIG. 4D is a plan top view of the of the heat exchanger cleaner apparatus of FIG. 4A according to some example embodiments.

FIG. 4A is a perspective top-front-right view of the heat exchanger cleaner apparatus shown in FIG. 3A according to some example embodiments. FIG. 4B is a plan cross-sectional view of the heat exchanger cleaner apparatus along cross-sectional view line IVB-IVB' of FIG. 4A according to some example embodiments. FIG. 4C is a plan cross-sectional view of the heat exchanger cleaner apparatus along cross-sectional view line IVC-IVC' of FIG. 4A. FIG. 4D is a plan top view of the of the heat exchanger cleaner apparatus of FIG. 4A according to some example embodiments.

Figure 5A:
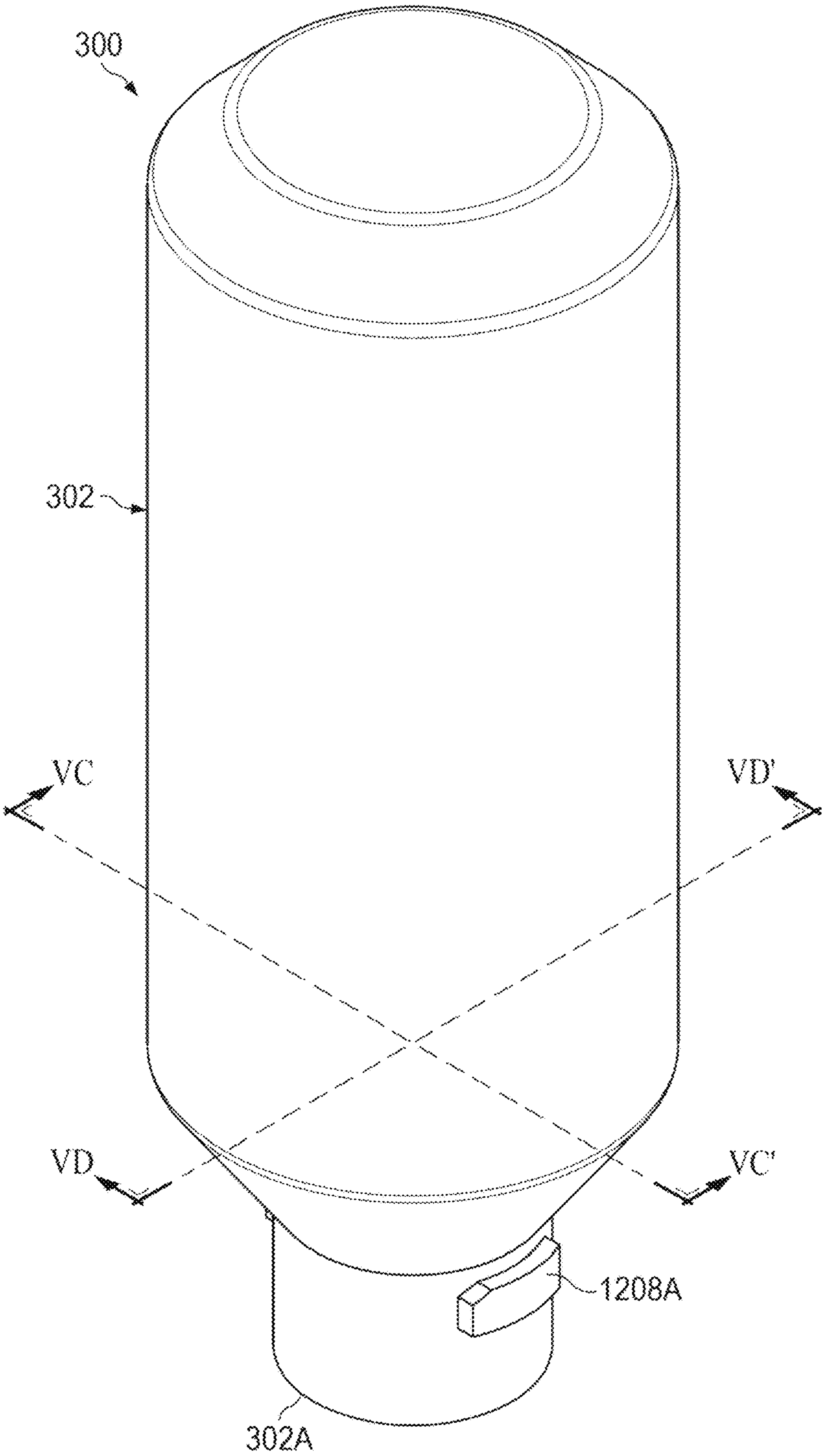
FIG. 5A is a perspective top-front-right view of the cartridge shown in FIG. 11A according to some example embodiments.
Figure 5B:
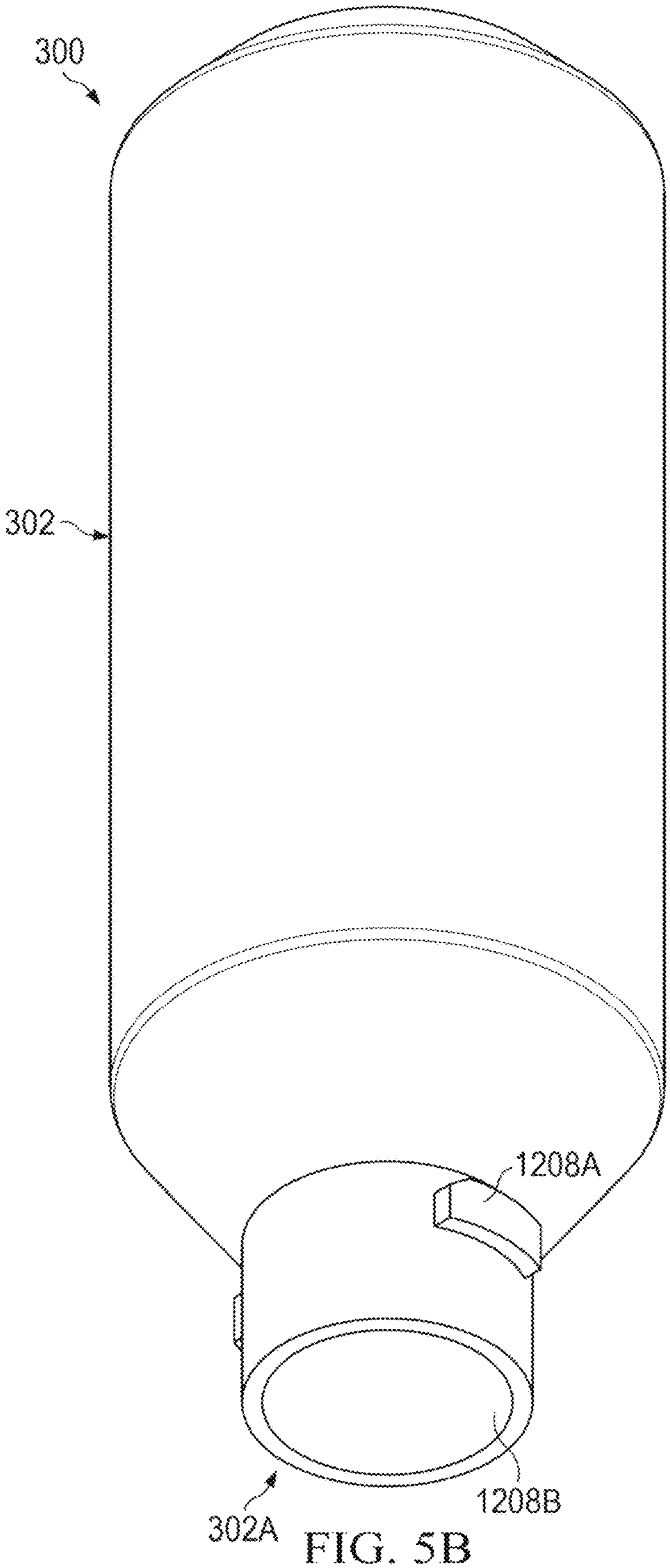
FIG. 5B is a perspective bottom-rear-left view of the cartridge shown in FIG. 5A according to some example embodiments.
Figure 5C:
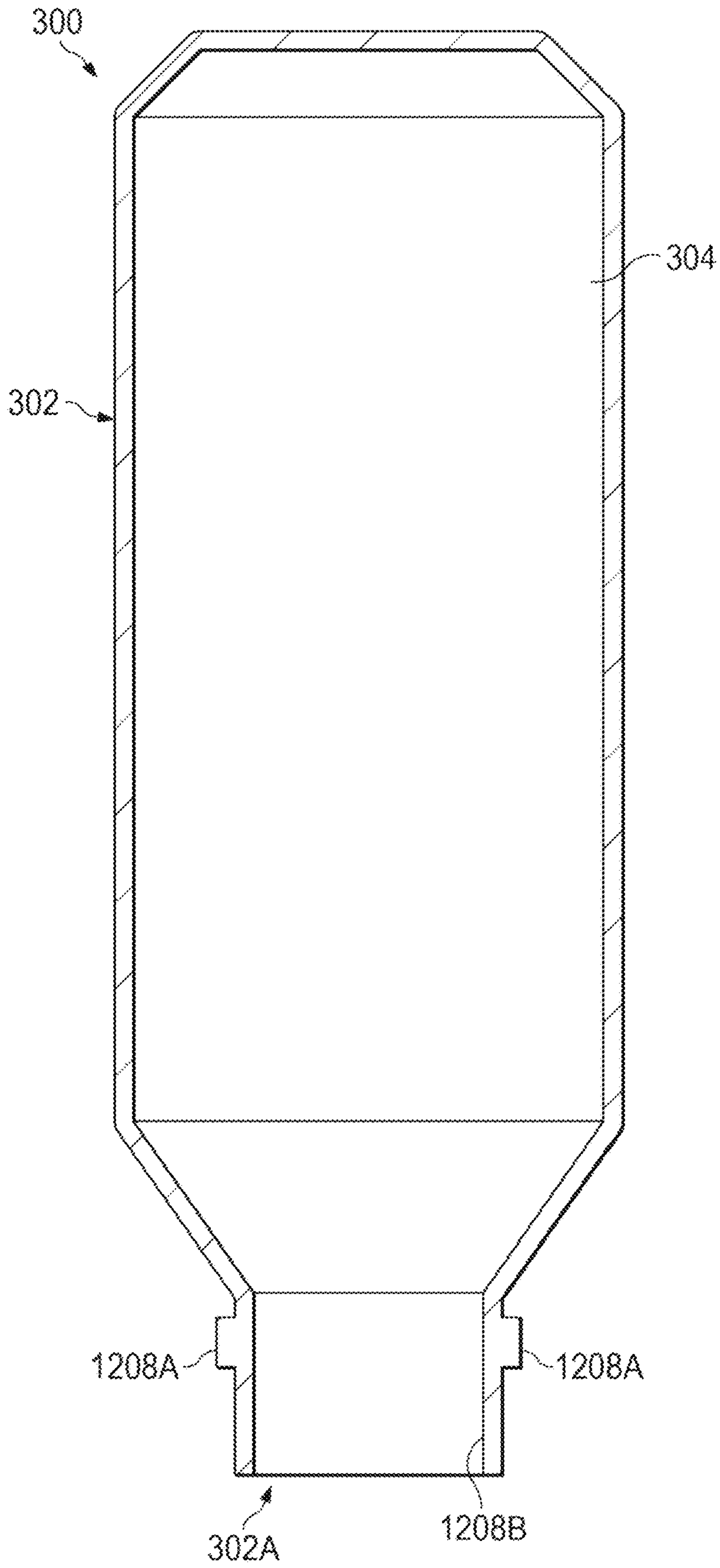
FIG. 5C is a plan cross-sectional view of the cartridge along cross-sectional view line VC-VC' of FIG. 5A according to some example embodiments.
Figure 5D:
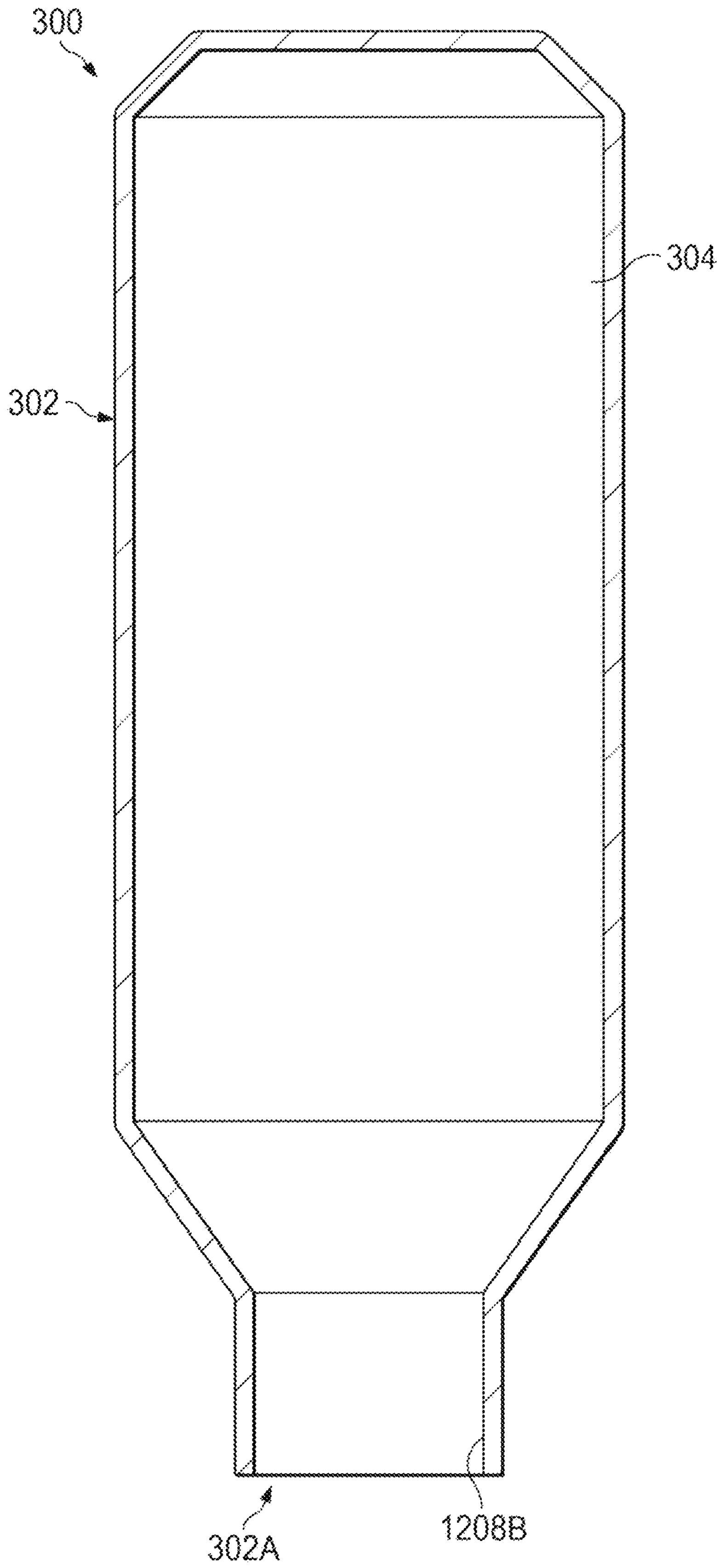
FIG. 5D is a plan cross-sectional view of the cartridge along cross-sectional view line VD-VD' of FIG. 5A according to some example embodiments.

FIG. 5A is a perspective top-front-right view of the cartridge shown in FIG. 11A according to some example embodiments. FIG. 5B is a perspective bottom-rear-left view of the cartridge shown in FIG. 5A according to some example embodiments. FIG. 5C is a plan cross-sectional view of the cartridge along cross-sectional view line VC-VC' of FIG. 5A according to some example embodiments. FIG. 5D is a plan cross-sectional view of the cartridge along cross-sectional view line VD-VD' of FIG. 5A according to some example embodiments.

It will be understood that the heat exchanger cleaner apparatus 200 shown in FIGS. 3A-4D may include any of the elements of any of the example embodiments of the heat exchanger cleaner apparatus shown in any of the drawings and/or described herein. It will be understood that the cartridge 300 shown in FIGS. 3A-3F and 5A-5D may include any of the elements of any of the example embodiments of the cartridge shown in any of the drawings and/or described herein. The heat exchanger cleaner apparatus 200 may be referred to interchangeably herein as a heat exchanger cleaner base, a heat exchanger cleaner apparatus base, a heat exchanger cleaner system base, a heat exchanger cleaner base device, a coil cleaner, or the like.

Referring generally to FIGS. 3A-5D, in some example embodiments, the heat exchanger cleaner apparatus 200 includes a housing 201 include a side housing 1104 and a base housing 1106 which are coupled together to at least partially define an interior of the heat exchanger cleaner apparatus 200. As shown, the side housing 1104 may at least partially define one or more portions of the heat exchanger cleaner apparatus 200 including, for example, the apparatus reservoir 202, a connector interface 1110C of the heat exchanger cleaner apparatus 200, or the like.

Referring to FIGS. 3A-4D and further referring to FIGS. 5A-5D, the heat exchanger cleaner apparatus 200 may be coupled (e.g., detachably coupled, reversibly coupled, etc.) with a cartridge 300 having a cartridge housing 302 enclosing a cartridge reservoir 304 holding the cleaning composition in order to establish flow communication between the cartridge reservoir 304 and the pump device 208 (e.g., an inlet, also referred to as an inlet port, of the pump device 208) of the heat exchanger cleaner apparatus 200. As shown, the apparatus reservoir 1102 (corresponding to the apparatus reservoir 202 shown in FIGS. 2A and 2B), also referred to herein interchangeably as a connection port structure, cartridge sleeve structure, internal reservoir, or the like, is configured to receive and accommodate at least a portion of the cartridge 300 holding the cleaning composition when the cartridge 300 is detachably coupled with the heat exchanger cleaner apparatus 200, such that the apparatus reservoir 1102 may include one or more inner surfaces 1102*s* that may define at least a portion of an open cylindrical enclosure 1102*c* which may at least partially enclose at least the cartridge outlet 302A of the cartridge 300 coupled to the heat exchanger cleaner apparatus 200.

As shown, the heat exchanger cleaner apparatus 200 may include a connector interface 1110 configured to couple with one or more complementary connector interfaces of the cartridge 300 to couple the cartridge 300 at the cartridge outlet 302A with the heat exchanger cleaner apparatus 200. The connector interface 1110 may include a connector structure 1111 configured to engage the cartridge outlet 302A and to establish a friction fit seal with the cartridge housing 302 to enable flow communication to be established between the cartridge reservoir 304 and the pump device 208. The connector structure 1111 may include an upper disc structure 1110A having a top surface 1110U configured to be directly exposed to the cartridge reservoir 304 when the cartridge 300 is coupled with the connector interface 1110 and a cylindrical sidewall structure 1110B having an outer sidewall surface 1110S and one or more O-rings 1112 extending circumferentially around the outer sidewall surface 1110S. As further shown, the connector structure 1111 may include one or more elements at least partially defining a check valve 306, such as the cylindrical structure 1120, but example embodiments are not limited thereto. Each of the interfaces and/or structures 1110A, 1110B, 1110C, and/or 1111 may be referred to, individually or collectively, as a connector interface of the heat exchanger cleaner apparatus 200.

The one or more complementary connector interfaces of the cartridge 300 may include, for example, connector interface 1208A and connector interface 1208B. Connector interface 1208A is a bayonet connector and complementary to bayonet connector interface 1110C. Connector interface 1208B is an inner surface of the cartridge housing 302 at the cartridge outlet 302A and configured to engage and establish a friction fit with an outer sidewall surface 1110S of the connector interface 1110 and/or an O-ring 1112 extending around the outer sidewall surface 1110S. The bayonet connector interface 1110C may be configured to couple with the connector interface 1208A of the cartridge 300 to establish a bayonet interface connection between the heat exchanger cleaner apparatus 200 and the cartridge 300. As shown, the connector interface 1110C and the connector interface 1208A of the cartridge 300 may be complementary interfaces, including complementary bayonet connector interfaces, but example embodiments are not limited thereto and may include any type of complementary connector interfaces including, for example, complementary threaded connector interfaces.

As shown, the connector interface 1110C may be a structure (e.g., bayonet connector interface structure) at least partially defined by a surface and/or structure of the apparatus reservoir 1102. For example, the apparatus reservoir 1102 structure may have an inner surface 1102*s* at least partially defining an open cylindrical enclosure 1102*c* configured to receive at least a portion of the cartridge housing 302 including the cartridge outlet 302A and in some example embodiments further include one or more complementary connector interfaces 1208B and/or 1208A, where the inner surface 1102*s* at least partially defines lateral sidewalls of the open cylindrical enclosure 1102*c* from which the connector interface 1110C structure (e.g., a bayonet interface structure configured to establish a bayonet connection with a complementary connector interface 1208A of the cartridge 300) extends into the open cylindrical enclosure 1102*c*. In some example embodiments, either or both of the complementary connector interfaces 1110C/1208A and/or 1110B/1208B may couple (e.g., detachably couple) the cartridge 300 with the heat exchanger cleaner apparatus 200. In some example embodiments, the complementary connector interfaces 1110B/1208A may be configured to couple the cartridge outlet 302A with the heat exchanger cleaner apparatus 200 to establish flow communication between the cartridge reservoir 304 and the pump device 208 via at least the inlet port 1136, and the complementary connector interfaces 1110C/1208A may secure (e.g., reversibly lock) the cartridge 300 to the heat exchanger cleaner apparatus 200.

As shown in at least FIG. 4B, the heat exchanger cleaner apparatus 200 may include an electrical switch device 1280 that may include a structure extending into the open cylindrical enclosure 1102*c* and configured to be engaged and moved from a switch-open position to a switch-closed position by at least a portion of the cartridge 300 when a connector interface of the cartridge 300 (e.g., connector interface 1208A) couples with a connector interface of the heat exchanger cleaner apparatus 200 (e.g., connector interface 1110C). The electrical switch device 1280 may be configured to close an electrical circuit that includes the controller 210 when moved to the switch-closed position, thereby enabling an electrical signal to be received at the controller 210. The controller 210 may be configured to apply electrical power to the circuit and may be configured to determine that the cartridge 300 is coupled with the heat exchanger cleaner apparatus 200 in response to determining that the circuit including the electrical switch device 1280 is closed such that an electrical signal (e.g., an induced current) is present in the circuit). The controller 210 may be configured to selectively enable or disable operating of the pump device 208 based upon whether a cartridge 300 is determined to be coupled to the heat exchanger cleaner apparatus 200 (e.g., based upon receiving an electrical signal via the circuit including the switch device 1280 to determine that the circuit is closed and thus a cartridge 300 is coupled with the heat exchanger cleaner apparatus 200 to move the switch device 1280 to the switch-closed position).

Still referring to FIGS. 3A-4D, the heat exchanger cleaner apparatus 200 may include a reservoir 1130 (corresponding to the internal reservoir 206 shown in FIGS. 2A and 2B), also referred to herein as a pump reservoir, apparatus reservoir, first reservoir of the heat exchanger cleaner apparatus 200, internal reservoir, or the like. While the reservoir 1130 is shown in FIGS. 3A-4D to be separate from the pump device 208, it will be understood that the reservoir 1130 may be referred to as being a pump reservoir included within the pump device 208, separately from pump of the pump device 208.

As shown, the heat exchanger cleaner apparatus 200 may be configured to establish flow communication from the cartridge reservoir 304 of a coupled (e.g., detachably coupled) cartridge 300 to the reservoir 1130 of the heat exchanger cleaner apparatus 200, where the reservoir 1130 is in flow communication between at least one connector interface of the heat exchanger cleaner apparatus 200 (e.g., the connector interface 1110) and an inlet 208*i* of the pump device 208, which may be the same as any of the pump devices 208 described herein according to any of the example embodiments. The pump device 208 may further be understood to be configured to be in fluid communication between the connector interface 1110 (e.g., via at least the reservoir 1130 and the inlet port 1136 and inlet 208*i*) and the spray outlet assembly 240 (e.g., the first conduit structure 242 coupled to the outlet 2080 of the pump device 208). The pump device 208 may thus be configured to be operated (e.g., by controller 210) to pump (e.g., selectively pump) an amount (e.g., a particular amount) of the cleaning composition 230 from the cartridge reservoir 304 and through the spray outlet assembly 240 (e.g., via the reservoir 1130). The pump device 208 may be configured to be controlled by the controller 210 to be operated similarly to any of the valves of any of the example embodiments of the pump device 208. The controller 210 may be configured to operate the pump device 208 to cause the amount of the cleaning composition to be pumped through the spray outlet assembly 240 to be sprayed as a fluid stream 232 in the interior 192 of the air handler 102 without manual intervention.

In some example embodiments, the pump device 208 may include a pump (e.g., any known positive displacement pump) that is configured to operate for a particular period of time to move an amount of the cleaning composition 230 from the cartridge reservoir 304 and through the spray outlet assembly 240 (e.g., via the reservoir 1130), based on a control signal generated by the controller 210.

Still referring to FIGS. 3A-4D, the connector interface 1110 may include an upper disc structure 1110A and a cylindrical sidewall structure 1110B which may be separate parts of a single piece of material (e.g., plastic) or separate pieces of material of the connector structure 1111, and where the cylindrical sidewall structure 1110B may include one or more circumferential grooves configured to accommodate separate, respective O-rings 1112 or any other known seal structure. The outer sidewall surface 1110S of the cylindrical sidewall structure 1110B and/or the O-ring(s) 1112 may be configured to engage a complementary inner surface of the cartridge housing 302 at the cartridge outlet 302A which defines the connector interface 1208B of the cartridge 300. As a result, the outer sidewall surface 1110S of the cylindrical sidewall structure 1110B, alone or in combination with one or more of the O-rings 1112, establishes a fluid seal (e.g., air-tight seal) between the cylindrical sidewall structure 1110B (and thus the connector interface 1110) and the cartridge housing 302, thereby minimizing or preventing leaking of cleaning composition from the cartridge reservoir 304 to an exterior of the cartridge 300 independently of being supplied through the spray outlet assembly 240 by the pump device 208, for example minimizing or preventing leaking of cleaning composition from the cartridge reservoir 304 into the open cylindrical enclosure 1102*c*.

As shown, when the connector structure 1111 and thus the connector interface 1110 couples with the connector interface 1208B of the cartridge 300 (e.g., at the cylindrical sidewall structure 1110B where the coupling is sealed by one or more surfaces of the cylindrical sidewall structure 1110B, the connector interface 1208B, and/or one or more of the O-rings 1112), the upper disc structure 1110A of the connector interface 1110 may be exposed directly to an interior of the cartridge reservoir 304 and at least some or any cleaning composition held in the cartridge reservoir 304.

Still referring to FIGS. 3A-4D, the connector interface 1110 may include a check valve 306 which may be configured to open in response to the connector interface 1110 coupling with one or more connector interfaces 1208A and/or 1208B of the cartridge 300 to establish fluid communication between the cartridge reservoir 304 and the pump device 208 (e.g., via the reservoir 1130). As shown, the check valve 306 may be at least partially defined by a cylindrical structure 1120 (which may be a part of a single piece of material with at least the upper disc structure 1110A of the connector structure 1111) having an inner surface 1120 is defining cylindrical side surfaces of an internal cylindrical conduit 1118, a top plate 1116 defining a top surface of the internal cylindrical conduit 1118 and having one or more ports 1114, also referred to interchangeably as openings, extending therethrough to the cylindrical conduit 1118 and configured to be directly exposed to at least the open cylindrical enclosure 1102*c* and thus to the cartridge reservoir 304 when the cartridge 300 is coupled with the connector interface 1110, a bottom structure 1122 defining a bottom surface of the internal cylindrical conduit 1118, a seal 1121 such as an O-ring extending around a lower portion of the bottom structure 1122, and a spring 1117 in contact between the top plate 1116 and the bottom structure 1122.

As shown, the bottom structure 1122 may include a pin protrusion extending axially through the cylindrical conduit 1118 and which may extend through a central opening in the top plate 1116. The bottom structure 1122, alone or together with the seal 1121, may be configured to engage against a ledge structure 1120L of the cylindrical structure 1120 to selectively seal an interface between the bottom structure 1122 and the cylindrical structure 1120. As further shown, the reservoir 1130 may be at least partially defined by a cylindrical side structure 1124 and a bottom disc structure 1126, where the bottom disc structure 1126 may at least partially define the inlet port 1136 to the pump device 208. As shown, the cylindrical side and bottom disc structures 1124 and 1126 may define an open cylindrical enclosure that is enclosed at a top end by the combined cylindrical structure 1120 and ledge structure 1120L thereof and a bottom surface of the bottom structure 1122 extending through an opening space between opposing surfaces of the ledge structure 1120L, such that inner surfaces of the structures 1124, 1126, 1120, and 1122 at least partially define the reservoir 1130. As further shown, the heat exchanger cleaner apparatus 200 may include a fixed structure 1128 which may be coupled to the bottom disc structure 1126 and may be a part of a same single piece of material as the bottom disc structure 1126. The fixed structure 1128 may project upwards into the reservoir 1130 under the bottom structure 1122 of the check valve 306.

Still referring to FIGS. 3A-4D, the connector interface 1110 is configured to move axially downwards 1202 (e.g., toward the pump device 208) in response to the cartridge 300 coupling with the heat exchanger cleaner apparatus 200 (e.g., the connector interface 1110 coupling with one or more of the connector interfaces 1208A and/or 1208B of the cartridge 300), for example based on the weight of the cartridge 300 and the cleaning composition held within pushing the connector interface 1110 downwards 1202. As shown, the outer surface 1120*os* of the cylindrical structure 1120 coupled to the upper disc structure 1110A is configured to engage and establish a seal (in some example embodiments with one or more O-rings) with the inner surface 1124*s* of the cylindrical side structure 1124 at least partially defining the reservoir 1130, thereby minimizing or preventing leakage of cleaning composition from the reservoir 1130 via the interface between surfaces 1120*os* and 1124*s*.

As the connector interface 1110 moves downward 1202 due to the weight of the cartridge 300 and cleaning composition therein (which may directly contact the top surface of the upper disc structure 1110A and the top plate 1116) may push the top plate 1116 and the cylindrical structure 1120 downwards 1202 axially, where the spring 1117 may further push the bottom structure 1122 axially downwards based on the top plate 1116 pushing the top end of the spring 1117 downwards. As shown, the top plate 1116 may engage an underside of a ledge or lip structure of the upper disc structure 1110A so that the downwards 1202 axial movement of the upper disc structure 1110A causes the top plate 1116 to move downwards 1202 axially together with the upper disc structure 1110A. As a result, the top plate 1116 together with the spring 1117 may cause the bottom structure 1122 and the cylindrical structure 1120 to move downwards 1202 together until a bottom surface of the bottom structure 1122 contacts (e.g., directly contacts) a top surface of the fixed structure 1128 in the reservoir 1130 interior. As the fixed structure 1128 is fixed to a surface at least partially defining the reservoir 1130 (e.g., fixed to the bottom disc structure 1126), the contact between opposing surfaces of the bottom structure 1122 and the fixed structure 1128 may arrest downwards axial movement of the bottom structure 1122 and compress the spring 1117 while the cylindrical structure 1120, top plate 1116, and connector interface 1110 continue to move axially downwards 1202, thereby causing the relative movement of the bottom structure 1122 in relation to the cylindrical structure 1120 to be upwards 1204, opening an annular passage 1250 between the downwards-moving ledge structure 1120L and the arrested bottom structure 1122 (and any washer or seal such as an O-ring seal 1121 configured to seal an interface between the bottom structure 1122 and the ledge structure 1120L) fixed in place between the spring 1117 and the fixed structure 1128. The opened annular passage 1250 may enable a flow along flow path 1192 (e.g., based on enabling fluid communication) through the cylindrical conduit 1118 to the reservoir 1130 via ports 1114 and the opened annular passage 1250.

As long as the weight of the cartridge 300 and the cleaning composition held therein on the connector interface 1110 is greater than the spring force of the spring 1117, the top plate 1116 and the bottom structure 1122 contacting the fixed structure 1128 may compress the spring 1117 and open the annular passage 1250 to the reservoir 1130 to enable a flow of cleaning composition along the flow path 1192 from the cartridge reservoir 304 to the reservoir 1130 via the check valve 306. When the weight of the cartridge 300 and the cleaning composition held therein on the connector interface 1110 is smaller than the spring force of the spring 1117, the spring force of the spring 1117 may enable the spring 1117 to push the top plate 1116, and thus the connector interface 1110 upwards 1204 axially away from the bottom structure 1122 and/or seal 1121 to close the annular passage 1250 and close the fluid communication between the cartridge reservoir 304 and the reservoir 1130.

Still referring to FIGS. 3A-4D, the connector structure 1111 may establish (e.g., define) an air volume 1132 in fluid communication with the ambient environment via the open cylindrical enclosure 1102*c*, and the connector interface 1110 (e.g., the connector structure 1111) may include an air tube 1134 extending through the connector interface to the upper disc structure 1110A to establish fluid connection between the air volume 1132 and a top region of the cartridge reservoir 304 when the cartridge 300 is coupled to the heat exchanger cleaner apparatus 200. The air tube 1134 may be configured to supply air into the upper portion of the cartridge reservoir 304 as cleaning composition leaves the cartridge reservoir 304 via the cartridge outlet 302A (e.g., via the check valve 306) to equalize pressure in the cartridge reservoir 304, thereby preventing vacuum in the cartridge reservoir 304 and preventing loss of flow rate of the flow along flow path 1192 into the reservoir 1130. The air tube 1134 may include a backflow prevention valve 1134*v*, such as a duckbill valve which may also be interchangeably referred to as a duck mouth valve, at a distal end, where the backflow prevention valve 1134*v* may be configured to reduce, minimize, or prevent flow of cleaning composition from the cartridge reservoir 304 into the air volume 1132 via the air tube 1134 while still enabling air to flow into the cartridge reservoir 304 from the air volume 1132 via the air tube 1134.

Still referring to FIGS. 3A-4D, the pump device 208 may be configured to be controlled (e.g., selectively operated, operated, etc.) by the controller 210 to selectively induce a flow of cleaning composition drawn along the flow path 1194 from the reservoir 1130 to the spray outlet assembly 240 (e.g., via at least the first and second conduit structures 242 and 244 as shown), thereby dispensing the cleaning composition from the heat exchanger cleaner apparatus 200. The pump device 208 may operate, and/or may be configured to be controlled to operate, in the same way as any of the pump devices 208 described herein according to any of the example embodiments.

Accordingly, as shown in at least FIGS. 3A-4D, the pump device 208 may be configured to be operated (e.g., selectively operated) based on a control signal (e.g., an electrical current) generated (e.g., transmitted) by the controller 210 to establish a flow path 1194 through the pump device 208 (e.g., through inlet 208*i* and outlet 2080) to the spray outlet assembly 240, and the heat exchanger cleaner apparatus 200 may include a reservoir 1130 (e.g., internal reservoir) that is in flow communication between the check valve 306 and the pump device 208, such that the connector interface 1110 is configured to detachably couple with the connector interface 1208A of the cartridge 300 to establish flow communication (e.g., flow path 1192) from the cartridge reservoir 304 to the reservoir 1130, and the pump device 208 may be configured to be operated (e.g., by controller 210) to pump (e.g., selectively pump) an amount of the cleaning composition from the reservoir 1130 and through the spray outlet assembly 240.

While FIGS. 3A-4D show a heat exchanger cleaner apparatus 200 and cartridge 300 configured to couple via a connector interface 1110 which includes a check valve 306, it will be understood that example embodiments are not limited thereto, and in some example embodiments different configurations of connector interfaces 1110 and/or connector structures 1111 may be present in the heat exchanger cleaner apparatus 200. In some example embodiments, the check valve 306 may be omitted. For example, in some example embodiments the cartridge 300 may include a flexible membrane (e.g., a silicone membrane) extending transversely across the cartridge outlet 302A, and the connector interface 1110 may include at least a puncturing structure (e.g., one or more needles) configured to puncture the membrane when the cartridge 300 is coupled with the connector interface 1110 in order to establish fluid communication between the cartridge reservoir 304 and the pump device 208 (e.g., via reservoir 1130). The connector interface 1110 may include another puncturing structure (e.g., similar in function to air tube 1134) configured to allow air to flow into an upper portion of the cartridge reservoir 304 to enable pressure equalization as cleaning composition flows out of the cartridge reservoir 304. The connector interface 1110 may include a protecting plate defining a recess having openings aligned with the puncturing structures and that is spring-loaded by a spring and is configured to move vertically between an upper rest position where the puncturing structures are underneath the protecting plate and external to the recess and a lower compressed position where the spring is compressed and where the puncturing structures extend through the openings in the protecting plate to be located within the recess. The protecting plate may be configured to receive the cartridge outlet 302A into the recess such that the cartridge 300 pushes the protecting plate downwards against the spring to expose the puncturing structures to puncture the membrane of the cartridge 300 and to establish fluid communication between the cartridge reservoir 304 and the pump device 208 (e.g., via the reservoir 1130). Upon removal of the cartridge 300 from the heat exchanger cleaner apparatus 200, the protecting plate may rise, under load from the spring, back to the rest position to obscure the puncturing structures. A distal portion of the cartridge 300 including the cartridge outlet 302A may be indented (e.g., include a notch structure or cavity) in relation to a remainder to the cartridge housing 302, and the heat exchanger cleaner apparatus 200 may include a spring-loaded locking mechanism configured to engage and couple with the indented portion of the cartridge 300 when the cartridge 300 is inserted into the apparatus reservoir 1102 to hold the cartridge 300 coupled with the heat exchanger cleaner apparatus 200. The locking mechanism may further be configured to lock the protecting plate in the upper rest position when the locking mechanism is in a spring-loaded rest position. The locking mechanism may be configured to move (e.g., move horizontally) against the spring to a compressed position to unlock the vertical movement of the protecting plate, based on the locking mechanism engaging a surface of a cartridge 300 being inserted into the heat exchanger cleaner apparatus 200, thereby enabling the cartridge outlet 302A to enter the recess of the protecting plate and push the protecting plate downwards to expose the puncturing structures. The cartridge 300 may be configured to include the indented portion that is positioned to engage the locking mechanism when the cartridge outlet 302A is inserted into the bottom of the recess of the protecting plate and the protecting plate is moved downwards to the lower, compressed position. When the locking mechanism engages the indented portion, the locking mechanism may return from the compressed position to an at least partial rest position, where the locking mechanism engaged with the indented portion may be in locking engagement with the cartridge 300 and may lock the cartridge 300 in place in relation to the heat exchanger cleaner apparatus 200. The heat exchanger cleaner apparatus 200 may include a release mechanism configured to release the locking mechanism from locking engagement with the cartridge 300 to enable decoupling of the cartridge 300 from the heat exchanger cleaner apparatus 200.

As further shown in FIGS. 3A-4D, the heat exchanger cleaner apparatus 200 may include a power supply compartment 1140 which may be at least partially defined by the housing 201 (e.g., the side housing 1104) and in which a power supply (e.g., batteries 1142 may be located and may be electrically coupled (e.g., via internal circuitry of the heat exchanger cleaner apparatus 200) with the pump device 208, the controller 210, a network communication interface 224, etc., or the like of the heat exchanger cleaner apparatus 200. The heat exchanger cleaner apparatus 200 may include a power supply cover plate 1108 which may be configured to couple with the housing 201 to cover the power supply compartment 1140 and to at least partially define an outer surface of the heat exchanger cleaner apparatus 200.

Still referring to FIGS. 3A-4D, the heat exchanger cleaner apparatus 200 may include a user interface 1182 (e.g., a button) with which a user may interact (e.g., press the button) to control operation of the heat exchanger cleaner apparatus 200, for example to turn the heat exchanger cleaner apparatus 200 on or off (e.g., activate or deactivate the heat exchanger cleaner apparatus 200), to cause the controller 210 to enable/activate controlling of the pump device 208 to be operated to pump cleaning composition at fixed intervals and/or to cause the controller 210 to disable/deactivate the pump device 208 from being actuated at fixed intervals. It will be understood that the controller 210 of the heat exchanger cleaner apparatus 200 may include any of the elements of any of the example embodiments of the controller 210 as described herein and/or illustrated in any of the drawings. It will be understood that the heat exchanger cleaner apparatus 200 shown in FIGS. 3A-4D may include any of the elements of any of the example embodiments of the heat exchanger cleaner apparatus 200 as described herein and/or illustrated in any of the drawings, including for example a network communication interface 224.

The heat exchanger cleaner apparatus 200 and/or any portion thereof (e.g., controller 210, network communication interface 224, etc.) may be configured to perform any of the functions described herein and/or illustrated in any of the drawings with regard to any of the example embodiments. For example, in some example embodiments the controller 210 may be configured to operate the pump device 208 in response to a determination, by the controller 210, of an elapse of a particular (e.g., predetermined, fixed) period of time. The controller 210 may be configured to repeatedly operate the pump device 208 at a fixed time interval that is the particular period of time, based on monitoring a timer (which may be implemented by the controller 210) that increments a timer value at a fixed frequency, operating the pump device 208 in response to the timer value reaching a particular time value corresponding to the elapse of the particular period of time, and resetting the timer value to an initial timer value in response to operating the pump device 208. The controller 210 may be configured to monitor a counter (which may be implemented by the controller 210) that increments a counter value in response to each operation of the pump device 208, and generate a depletion signal (which may be communicated to an external device via the network communication interface 224 and/or may be used to generate a visual signal by one or more light indicators 1184 such as activating a yellow LED thereof) in response to the counter value reaching a particular counter value that corresponds to at least partial depletion of a fixed reservoir (e.g., the reservoir 1130 and/or the cartridge reservoir 304) of the cleaning composition.

In some example embodiments, the controller 210 may be configured to adjust (e.g., calibrate) the particular counter value to correspond to a number of operations of the pump device 208 corresponding to a particular volume of the cartridge reservoir 304. For example, in some example embodiments, the cartridge reservoir 304 is configured to hold a volume of about 36 oz of cleaning composition, but example embodiments are not limited thereto; for example, the heat exchanger cleaner apparatus 200 may be configured to couple with various sizes of cartridges 300 having similar connector interfaces 1208A and 1208B configured to couple with the connector interface 1110 of the heat exchanger cleaner apparatus 200 but having different volumes of cartridge reservoir 304, including a volume of 36 oz, 72 oz, or the like. The controller 210 may be configured to determine a volume of the cartridge reservoir 304 in response to receiving a command signal indicating the volume of the cartridge reservoir, and adjust the particular counter value based on the determination of the volume of the cartridge reservoir. For example, in some example embodiments the heat exchanger cleaner apparatus 200 may be configured to receive a command signal indicating the cartridge reservoir 304 volume of a coupled cartridge 300 via a command from a remote computing device 700 received via the network communication interface 224 based on human user interaction with at least a portion of an interface of the remote computing device 700 (e.g., the interface 760, which may be a touchscreen display) to cause the remote computing device 700 to inform the heat exchanger cleaner apparatus 200 of the volume of the coupled cartridge 300 and/or to command the heat exchanger cleaner apparatus 200 to adjust the particular counter value to correspond to the volume of the coupled cartridge 300. In another example, in some example embodiments the heat exchanger cleaner apparatus 200 may be configured to receive a command signal indicating the cartridge reservoir 304 volume of a coupled cartridge 300 via a command received from a user interface 1182 of the heat exchanger cleaner apparatus 200 via user interaction therewith.

In another example, in some example embodiments the heat exchanger cleaner apparatus 200 may be configured to receive a command signal indicating the cartridge reservoir 304 volume of a coupled cartridge 300 based on sensor data generated by a sensor device of the heat exchanger cleaner apparatus 200. The heat exchanger cleaner apparatus 200 may include a pressure sensor (e.g., any known pressure sensor) that is exposed to the reservoir 1130, the cylindrical conduit 1118, the upper surface of the upper disc structure 1110A configured to be directly exposed to the cartridge reservoir 304 of a coupled cartridge 300, or any portion of the heat exchanger cleaner apparatus 200 configured to be in fluid communication with the cartridge reservoir 304 of a coupled cartridge 300. The pressure sensor may generate sensor data indicating a static pressure of cleaning composition at the location of the pressure sensor in the heat exchanger cleaner apparatus 200 and may communicate such sensor data to the controller 210. The controller may be configured to process the sensor data to determine a pressure value indicated by the sensor data and may determine a corresponding volume of cleaning composition held in a cartridge reservoir 304 of a coupled cartridge 300 based on applying the sensor data and/or pressure value indicated thereby to an empirically-determined look-up table that associates sensor data and/or indicated pressure values with corresponding magnitudes of volume of cleaning composition held in the cartridge reservoir 304 of a coupled cartridge 300. The controller 210 may be configured to monitor variations in the pressure data and/or corresponding volume indicated by the sensor data and look-up table over time. In response to a rate of change of the pressure and/or volume indicated by the sensor data that exceeds a threshold rate of change that is stored at the controller, where exceeding the threshold rate is associated with an at least partially depleted cartridge 300 being replaced with a new, more full cartridge

300 being newly coupled to the heat exchanger cleaner apparatus 200, the controller 210 may responsively monitor a new volume indicated by the sensor data and look-up table subsequent to the rate of change of indicated volume/pressure value subsequently dropping below the threshold rate to indicate that the newly-coupled cartridge 300 is stabilized, where the new volume determined based on processing the sensor data in view of the look up corresponds to the volume of the cartridge reservoir 304. The controller 210 may responsively adjust the particular counter value to a value corresponding to a quantity of pumpings (each pumping corresponding to causing the pump device 208 to pump (e.g., dispense, supply, etc.) a particular amount (e.g., volume) of cleaning composition (such as 3 oz) that is at least a particular proportion of the determined volume of the new cartridge reservoir 304 (e.g., 90% of the determined volume).

In some example embodiments, the heat exchanger cleaner apparatus 200 may include a network communication interface 224 that is configured to establish a network communication link with a remote device (e.g., a remote computing device). The controller 210 may be configured to cause a depletion signal to be transmitted to the remote computing device 700 via the network communication link. The controller 210 may be configured to cause the counter value to be reset to an initial counter value in response to receiving a reset signal from the remote computing device via the network communication link. It will be understood that the controller 210 and/or the network communication interface 224 may be configured to perform any of the communications and/or interactions with one or more remote computing devices 700 as described herein with regard to any of the example embodiments of the heat exchanger cleaner apparatus 200, the remote computing device 700, or the like, including the operations and/or interactions between the heat exchanger cleaner apparatus 200 and a remote computing device 700 via network communication link 702 as described herein with regard to at least FIGS. 2A, 2B. 7, 8, or the like.

Still referring to FIGS. 3A-4D, the heat exchanger cleaner apparatus 200 may include light indicators 1184 (e.g., light emitting diodes, or LEDs) which may extend through respective openings in the housing 201 (e.g., respective openings in the side housing 1104 as shown) and may be configured to provide visible indications of a status of the heat exchanger cleaner apparatus 200. For example, referring to FIG. 11A, the light indicators 1184 may include a left-most green LED configured to selectively emit green light, a center-left yellow LED configured to selectively emit yellow light, a center-right red LED configured to selectively emit red light, and a right-most blue LED configured to selectively emit blue light. The controller 210 may selectively activate the green LED to emit green light to indicate that the heat exchanger cleaner apparatus 200 is activated (e.g., based on human user interaction with the user interface 1182 and/or with a remote computing device 700 to cause the remote computing device 700 to command the heat exchanger cleaner apparatus 200 to activate via a network communication link 702) and/or to indicate that the controller 210 is presently implementing a timer to enable operating the pump device 208 at a fixed frequency (e.g., fixed intervals). The controller 210 may be configured to selectively activate the yellow LED to emit yellow light to indicate a depletion signal in response to a determination that a counter value implemented by the controller 210, as described herein, reaches a particular counter value that corresponds to at least partial depletion of a fixed reservoir (e.g., the cartridge reservoir 304) of the cleaning composition as described herein according to any of the example embodiments. It will be understood that the controller 210 may be configured to selectively deactivate operation of at least the pump device 208 (e.g., disable the periodic operation of the pump device 208), activate a visual indicator such as the yellow LED, and/or transmit a warning signal to a remote computing device 700 via a network communication link 702 to cause the remote computing device to generate (e.g., transmit) a warning (e.g., a graphic indication shown on the interface 760) to warn a supported human user that the cartridge reservoir 304 is at least partially depleted in response to determination that the counter value has reached or exceeded the particular counter value. The controller 210 may be configured to selectively activate the red LED to emit red light in response to a determination that the electrical circuit including the electrical switch device 1280 is open, such that the controller 210 determines that the heat exchanger cleaner apparatus 200 is not coupled with a cartridge 300 while the heat exchanger cleaner apparatus 200 is activated. It will be understood that the controller 210 may be configured to selectively deactivate operation of at least the pump device 208 (e.g., disable the periodic operation of the pump device 208), activate a visual indicator such as the red LED, and/or transmit a warning signal to a remote computing device 700 via a network communication link 702 to cause the remote computing device to generate (e.g., transmit) a warning (e.g., a graphic indication shown on the interface 760) to warn a supported human user that the heat exchanger cleaner apparatus 200 has disabled operation of the pump device 208 due to non-coupling of the heat exchanger cleaner apparatus 200 with a cartridge 300. The controller 210 may be configured to selectively activate the blue LED to emit blue light to indicate that the network communication interface 224 has established an active network communication link 702 with at least one remote computing device 700.

Figure 6A:
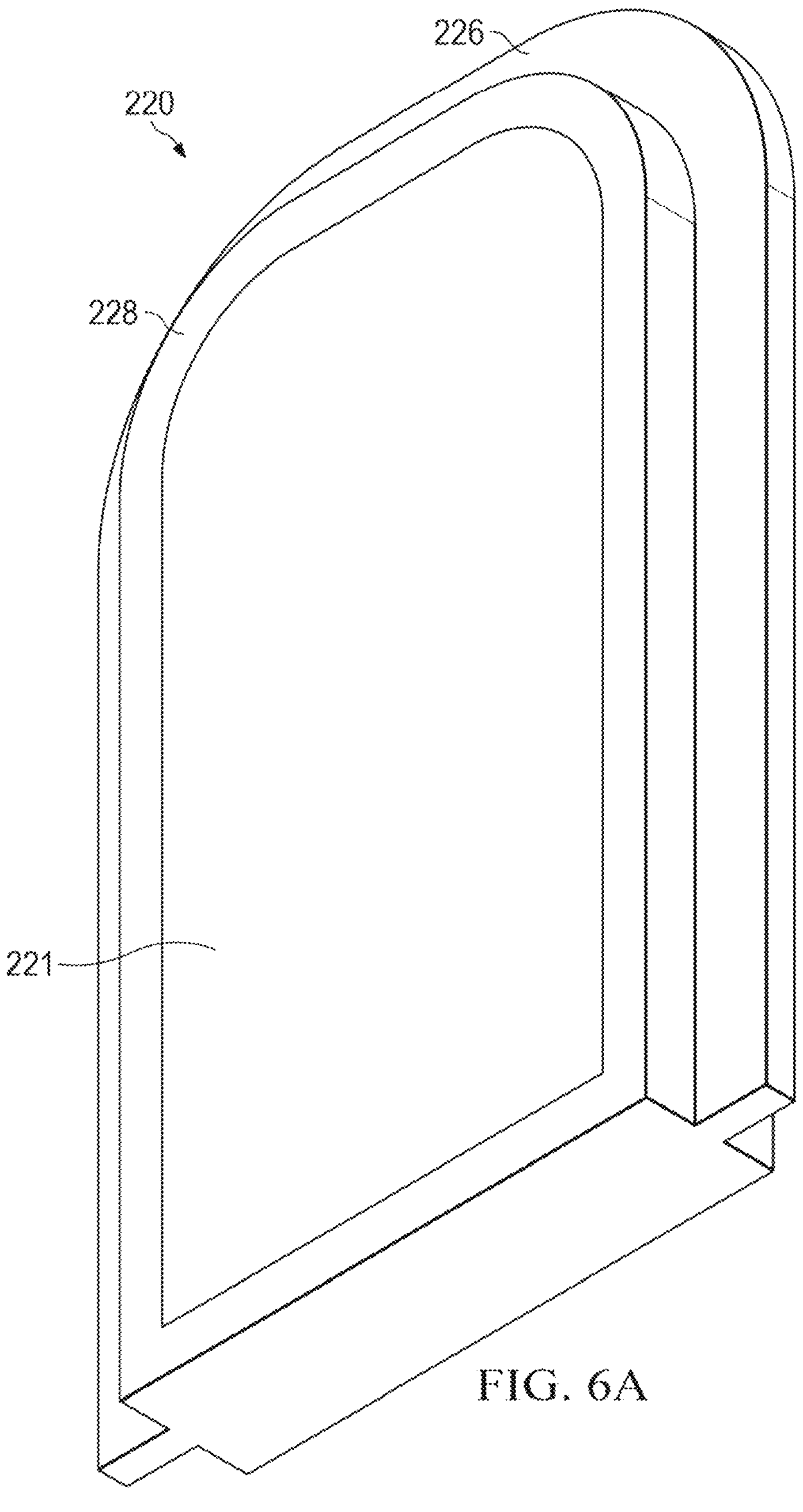
FIG. 6A is a perspective bottom-rear-left view of the structure connector shown in FIG. 3A according to some example embodiments.
Figure 6B:
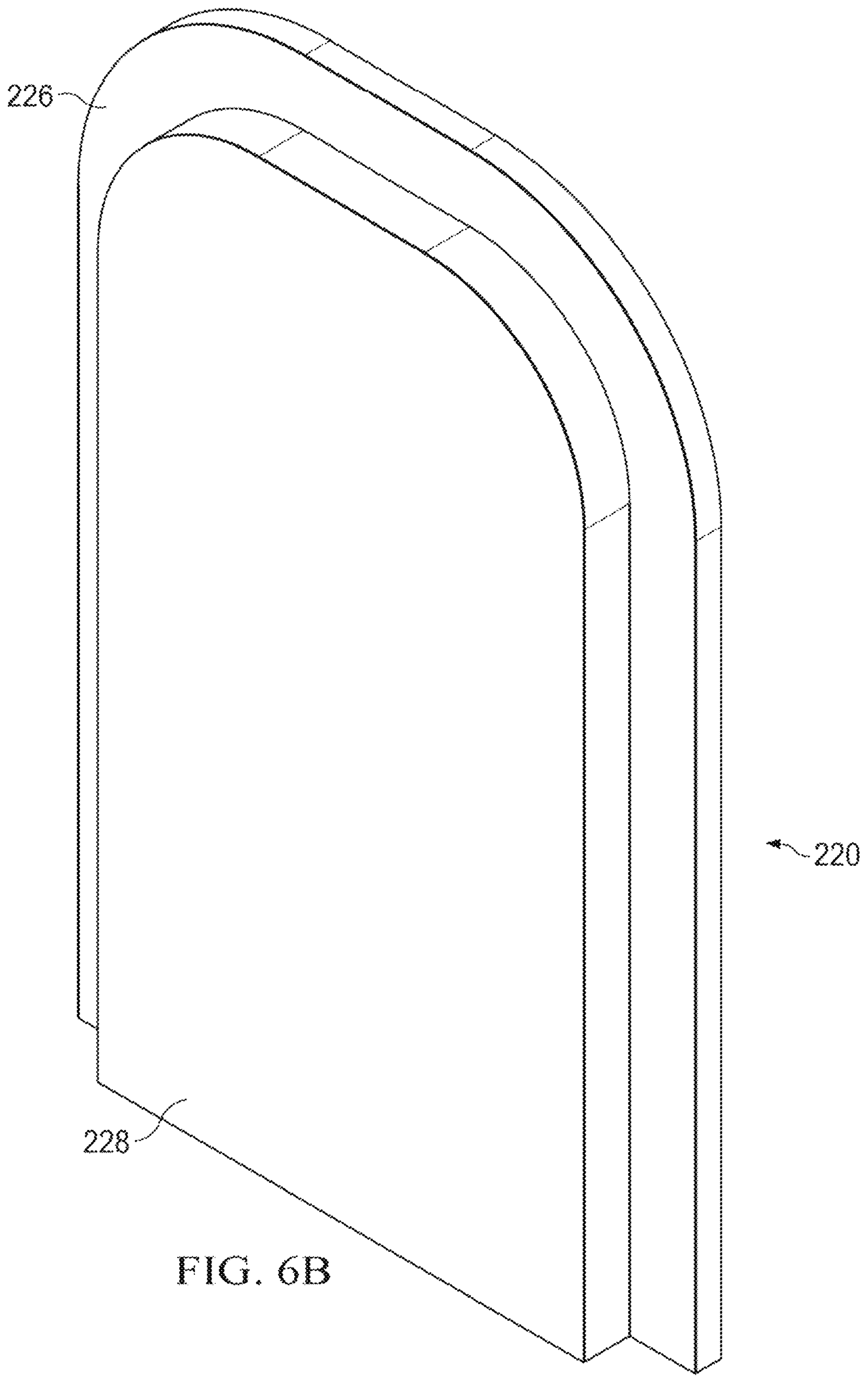
FIG. 6B is a perspective top-front-right view of the structure connector shown in FIG. 6A according to some example embodiments.
Figure 6C:
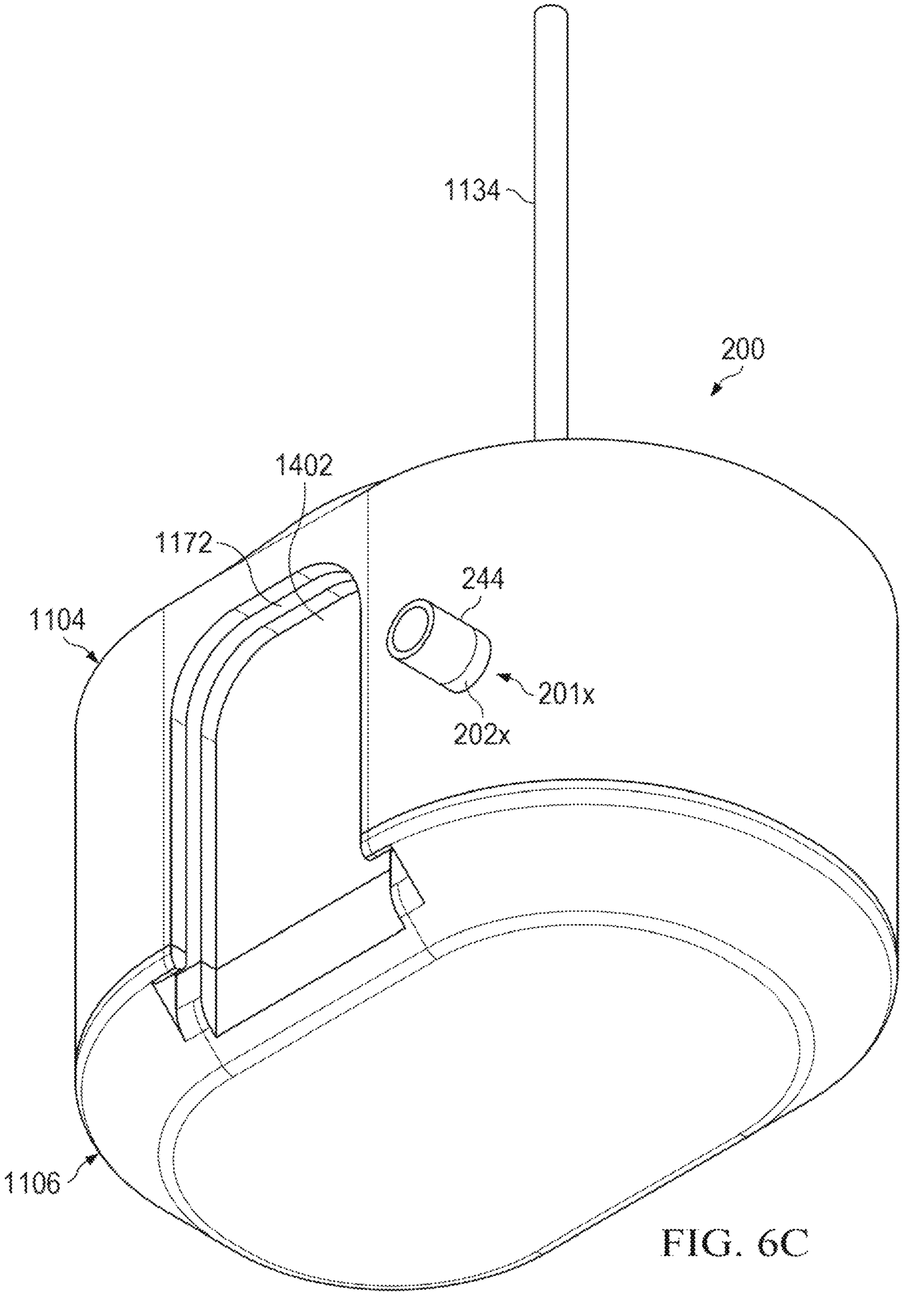
FIG. 6C is a perspective view of the heat exchanger cleaner apparatus according to some example embodiments.
Figure 6D:
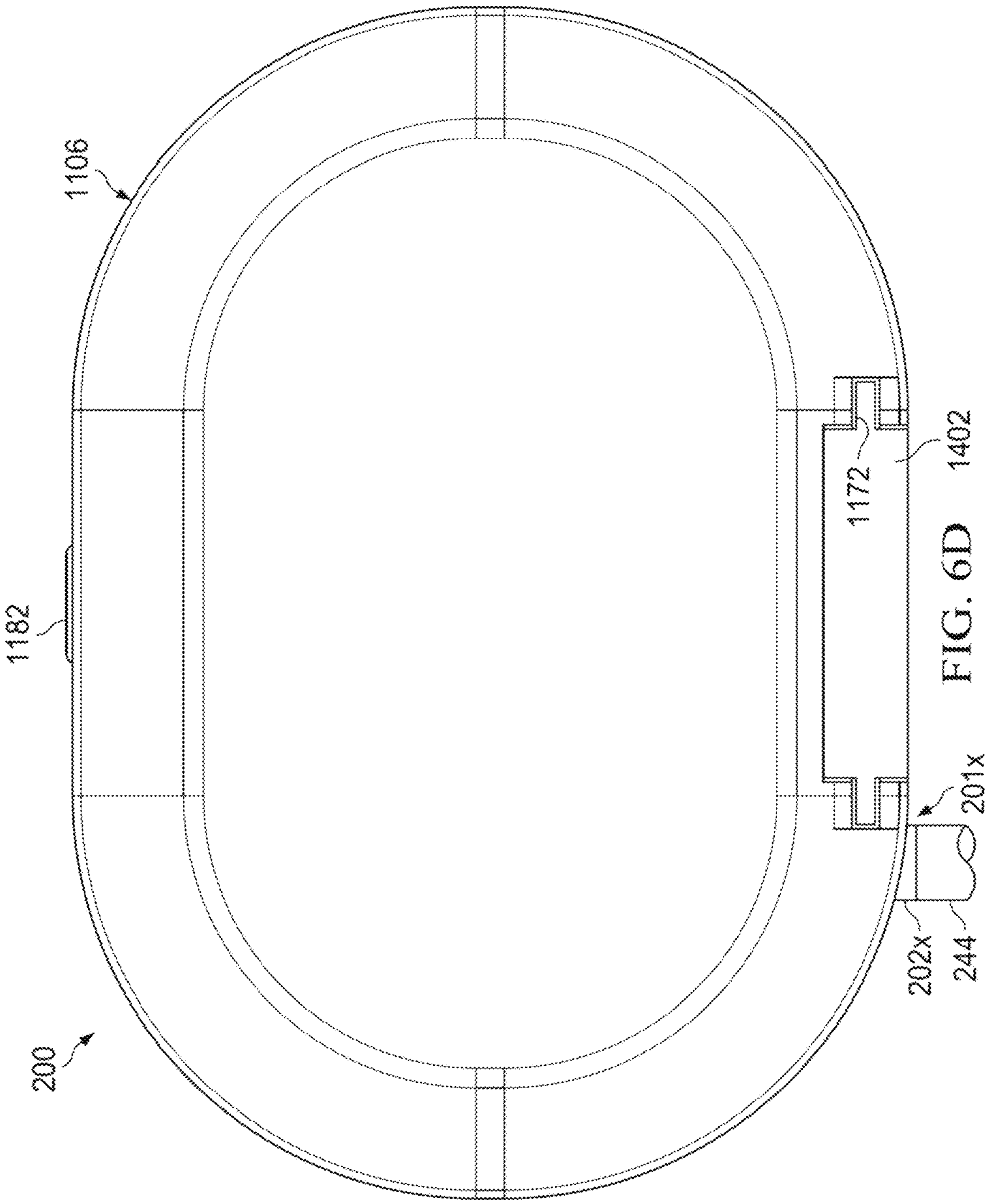
FIG. 6D is a plan bottom view of the heat exchanger cleaner apparatus according to some example embodiments.

FIG. 6A is a perspective bottom-rear-left view of the structure connector shown in FIG. 3A according to some example embodiments. FIG. 6B is a perspective top-front-right view of the structure connector shown in FIG. 6A according to some example embodiments. FIG. 6C is a perspective view of the heat exchanger cleaner apparatus according to some example embodiments. FIG. 6D is a plan bottom view of the heat exchanger cleaner apparatus according to some example embodiments. It will be understood that the structure connector 220 and the heat exchanger cleaner apparatus 200 shown in FIGS. 6A-6D may include any of the elements of any of the example embodiments of the structure connector and/or the heat exchanger cleaner apparatus shown in any of the drawings and/or described herein.

As shown in FIGS. 6A-6D, the structure connector 220 may include a housing structure 228 (e.g., a plastic structure), a coupling structure 221 that is coupled (e.g., adhered via an adhesive) to the housing structure 228, and an interface structure 226 configured to engage a complementary coupling structure 1172 of the heat exchanger cleaner apparatus 200 to couple the structure connector 220 to the heat exchanger cleaner apparatus 200 and thus enable the structure connector 220 to couple the heat exchanger cleaner apparatus 200 to the fixed structure to which the coupling structure 221 is coupled.

In some example embodiments, the coupling structure 221 is or includes a magnet configured to magnetically attach the structure connector 220 to a fixed external structure, such as a metal surface of the external structure, for example a metal housing 101 of an air handler 102 as shown in FIG. 1. Thus, the magnet coupling structure 221 may configure the structure connector 220 to be magnetically coupled to a metal external structure such as a metal housing 101 of an air handler 102. In some example embodiments, the coupling structure 221 may include an adhesive material configured to adhere to a surface of an external structure.

As shown in FIGS. 6A-6D, in some example embodiments, the interface structure 226 may include a flange or bracket structure configured to slidably engage with a complementary, downwards-opening complementary coupling structure 1172 (e.g., complementary flange or bracket structure) at least partially defining a slot or cavity 1402 in the heat exchanger cleaner apparatus 200 housing 201 that is configured to accommodate at least a portion of the structure connector 220 due to relative downwards motion of the heat exchanger cleaner apparatus 200 in relation to the structure connector 220 (e.g., downwards sliding engagement of the complementary coupling structure 1172 with the interface structure 226 of the structure connector 220 so that at least a closed top portion of the complementary coupling structure 1172 engages a top portion of the interface structure 226 to transfer a load or weight of the heat exchanger cleaner apparatus 200 and any cartridge 300 coupled thereto to the structure connector 220. As a result of the structure connector 220 being coupled (e.g., magnetically coupled) to a fixed external structure via the coupling structure 221 (e.g., magnet) being coupled to the fixed external structure, the heat exchanger cleaner apparatus 200 and any cartridge 300 coupled thereto (e.g., the heat exchanger cleaner apparatus system 1100, which may be referred to interchangeably herein as a heat exchanger cleaner system, coil cleaner system, coil cleaner, or the like) may at least partially rest upon the structure connector 220 to be held in place in relation to the external structure (e.g., to at least partially transfer a load or weight of the heat exchanger cleaner apparatus system 1100 to the fixed external structure via the structure connector 220. It will be understood that the heat exchanger cleaner apparatus 200 and the cartridge 300 coupled (e.g., connected, detachably connected, etc.) thereto may collectively partially or entirely comprise the heat exchanger cleaner apparatus system 1100, which may be referred to interchangeably herein as a heat exchanger cleaner system.

It will be understood that the structures of the interface structure 226 and the complementary coupling structure 1172 may be different from the example embodiments shown in FIGS. 3A-3F and 6A-6D. As shown, the interface structure 226 of the structure connector 220 may be a protruding tab (e.g., male, or flange) connector structure and the complementary coupling structure 1172 may be a complementary slot (e.g., female) connector structure configured to slidably engage the interface structure 226 to receive the structure connector 220 into the cavity 1402, but example embodiments are not limited thereto. For example, in some example embodiments, the interface structure 226 of the structure connector 220 may be a slot (e.g., female) connector structure and the complementary coupling structure 1172 may be a complementary protruding tab (e.g., male, or flange) connector structure configured to slidably engage the interface structure 226 to receive the structure connector 220 into the cavity 1402. In some example embodiments, the heat exchanger cleaner apparatus 200 may include an interlock structure configured to lock the structure connector 220 together with the heat exchanger cleaner apparatus 200. In some example embodiments, the structure connector 220 may be configured to be detachably coupled to the heat exchanger cleaner apparatus 200 or may be a fixed part of the heat exchanger cleaner apparatus 200, omitting the interface structure 226 while the heat exchanger cleaner apparatus 200 omits the complementary coupling structure 1172, that is configured to not be detached from the heat exchanger cleaner apparatus 200.

Figure 7:
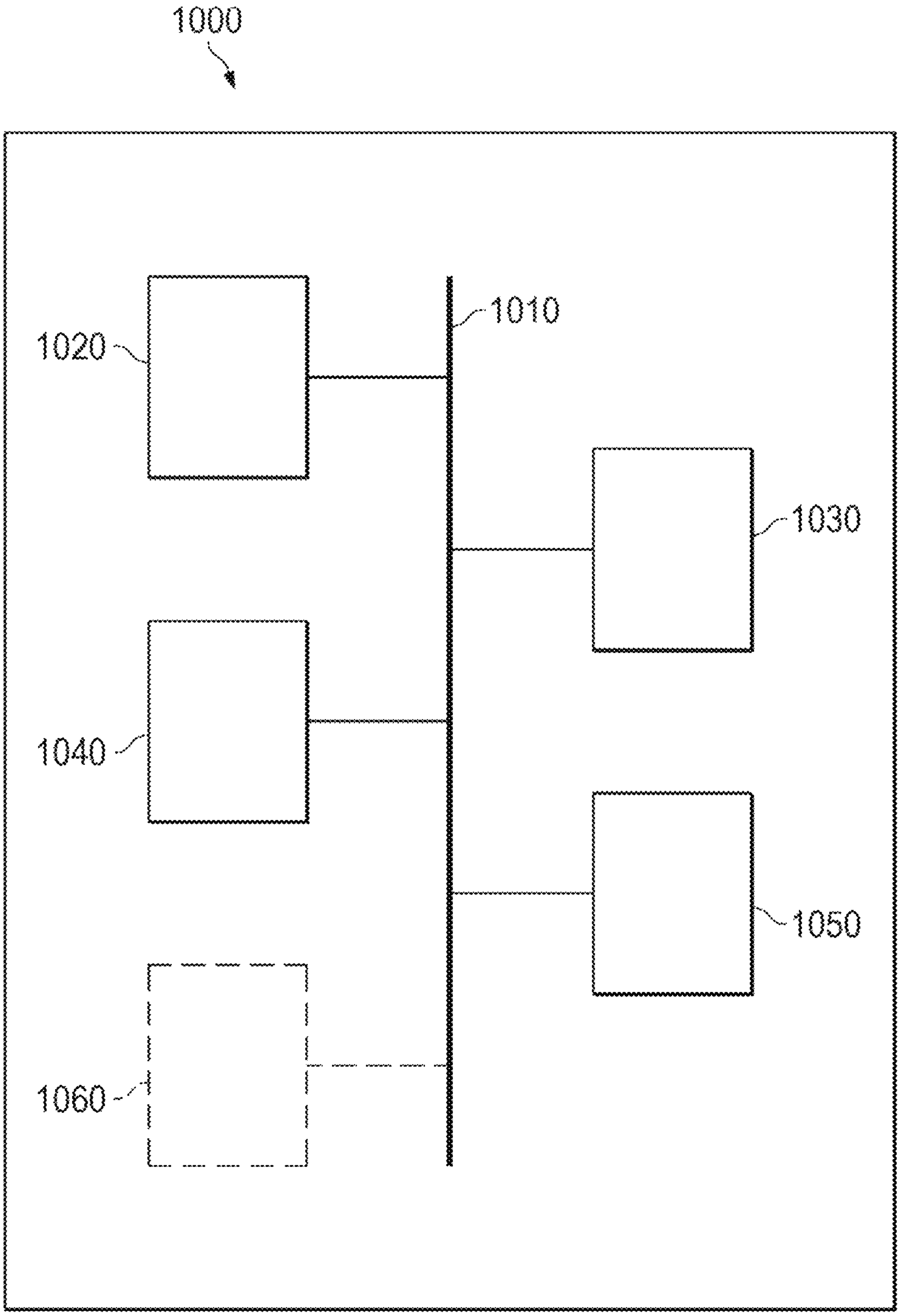
FIG. 7 is a schematic view of a computing device according to some example embodiments.

FIG. 7 is a schematic view of a controller of a computing device 1000 according to some example embodiments. The computing device 1000 may implement any of the computing devices, controllers, processors, or the like according to any of the example embodiments, including controller 140, controller 210, and any portion of remote computing device 700.

As shown in FIG. 7, the computing device 1000 may include some or all of a processor 1020 (e.g., a CPU), a memory 1030 (e.g., a solid state drive, or SSD), a communication interface 1040 (e.g., a wireless network communication interface, which may for example implement network communication interface 224, network communication interface 750, a network communication interface of the air conditioning system 100, or the like), and a power supply 1050 that are communicatively coupled together via a bus connection 1010. It will be understood that any type of non-transitory computer readable storage device may be used as the memory 1030 in addition or alternative to an SSD. The computing device 1000 may include additional devices, including a user interface device 1060 (e.g., "interface") that may include a display device (e.g., an LED display screen, OLED display screen, etc.), a touchscreen display, a button interface, any combination thereof, or the like. The user interface device 1060 may be communicatively coupled to the bus connection 1010.

In some example embodiments, some or all of any of the computing device 1000 may include, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. In some example embodiments, the processing circuitry may include a non-transitory computer readable storage device, or memory (e.g., memory 1030), for example a solid state drive (SSD), storing a program of instructions, and a processor (e.g., processor 1020) that is communicatively coupled to the non-transitory computer readable storage device (e.g., via a bus connection 1010) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, etc.) that is described as "implementing" an element (e.g., controller 210, heat exchanger cleaner apparatus 200, controller 140, air conditioning system 100, remote computing device 700, etc.) will be understood to implement the functionality of said implemented element and/or any other elements (e.g., the functionality of the controller 210, the functionality of the heat exchanger cleaner apparatus 200, the functionality of the controller

140, the functionality of the air conditioning system, the functionality of the remote computing device 700, etc.).

Figure 8:
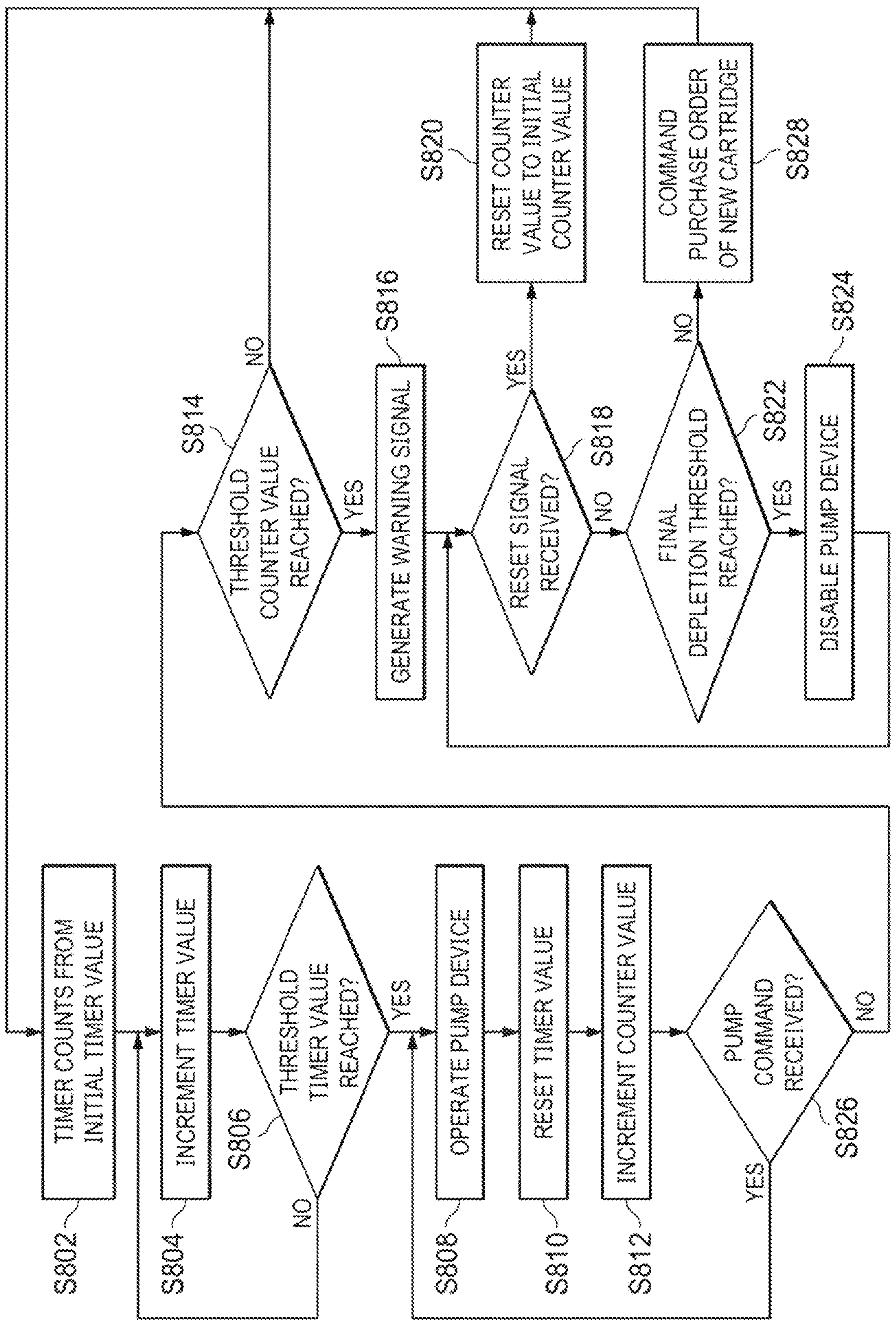
FIG. 8 is a flowchart illustrating a method of operation of the heat exchanger cleaner apparatus according to some example embodiments.

FIG. 8 is a flowchart illustrating a method of operation of the heat exchanger cleaner apparatus according to some example embodiments. The method shown in FIG. 8 may be implemented by any example embodiment of the heat exchanger cleaner apparatus 200 according to any example embodiments.

It will be understood that operations of the method shown in FIG. 8 may be changed in order relative to what is shown in FIG. 8. It will further be understood that one or more operations of the method shown in FIG. 8 may be omitted from the method shown in FIG. 8. It will further be understood that one or more operations may be added to the method shown in FIG. 8.

The method shown in FIG. 8 includes a method for operating a heat exchanger cleaner apparatus 200 according to any of the example embodiments to pump (e.g., dispense, supply, etc.) a cleaning composition 230 into an interior 192 of an air handler 102 to contact an outer surface 110*s* of a heat exchanger 110 (e.g., evaporator coil) of the air handler 102. As shown, the method of FIG. 8 includes controlling a pump device 208 of the heat exchanger cleaner apparatus 200 to cause the pump device 208 to pump an amount (e.g., 3 oz) of the cleaning composition 230 from a reservoir in fluid communication with an inlet of the pump device 208 (e.g., an internal reservoir 206 of the heat exchanger cleaner apparatus 200, a cartridge reservoir 304 of a cartridge 300 detachably coupled to the heat exchanger cleaner apparatus 200) and through the spray outlet assembly 240 without manual intervention (e.g., without human intervention). It will be understood that some or any of the operations shown in FIG. 8 may be performed (e.g., performed by controller 210) without human intervention (e.g., some or any operations may be performed by controller 210 based on programming of the controller 210 and may be performed independently of any commands or signals received at the controller 210 based on human interaction with an interface (e.g., button, touchscreen display, etc.)).

At S802 and S804, a timer of the controller 210 may count (e.g., increment a timer value at a fixed frequency) from an initial timer value (e.g., 0). At S806, the controller 210 compares the timer value with a threshold (e.g., particular) timer value (e.g., 7 days) that may be stored at the controller 210 and determines whether the present timer value has reached (e.g., is equal to or greater than) the threshold timer value. If not, the controller 210 permits the timer to continue to increment at S804. If so, at S808, the controller 210 operates the pump device 208 (e.g., causes electrical power to be supplied to the pump device 208 to cause the pump device 208 to operate) in response to cause the pump device 208 to operate to pump (e.g., dispense, supply, etc.) a particular amount of cleaning composition 230 (e.g., 3 oz), thereby operating the pump device 208 in response to an elapse of a particular period of time.

At S810, in response to the pumping at S808, the controller 210 causes the timer to reset to the initial timer value (0) and resume counting to enable a repeated performance of S802-S808 (at least partially depending upon an outcome of the determination at S826, described further below), thereby repeatedly operating the pump device 208 to pump a particular amount of cleaning composition at a fixed time interval that is the particular period of time, based on monitoring a timer that increments a timer value at a fixed frequency at S802-S806, operating the pump device 208 at S808 in response to the timer value reaching a particular time value corresponding to the elapse of the particular period of time, and resetting the timer value to an initial timer value at S810 in response to pumping the pump device 208 at S808.

At S812, in response to the operating at S808, the controller 210 causes a counter to count (e.g., increment) a counter value from an initial counter value (e.g., 0), thereby tracking a quantity of pumping operations (S808) and thus a cumulative amount of cleaning composition 230 that is pumped.

At S826, a determination is made regarding whether a pumping command signal is received, for example based on human interaction with an interface (e.g., button) of the heat exchanger cleaner apparatus 200 and/or based on a pump signal being received from a remote computing device 700 via a network communication link 702 based on a pumping (e.g., selective pumping) of cleaning composition 230 being commanded at the remote computing device 700. If not, the method continues at S814. If so, the method moves to S808 and the controller 210 operates the pump device 208.

At S814, the controller 210 compares the counter value with a threshold (e.g., particular) counter value (e.g., 10, 11, 12, etc.) that may be stored at the controller 210 and determines whether the present counter value has reached (e.g., is equal to or greater than) the threshold counter value. If not, the controller 210 returns to S802 and continues the method. If so, at S816, the controller 210 generates a warning signal. The controller 210 may monitor multiple possible threshold values, including a partial depletion threshold counter value (e.g., 10 and/or 11) and a final depletion threshold counter value (e.g., 12) and the controller 210 may generate a particular warning signal (e.g., indicating partial depletion or final depletion (e.g., complete depletion) of cleaning composition 230 held in the heat exchanger cleaner apparatus 200) based on which threshold is determined to be reached at S814.

At S818, a determination is made regarding whether to reset the counter to the initial counter value. The determination may include a determination of whether a reset signal that indicates a command to reset the counter value is received. Such a determination may be based upon receiving a reset signal, which may be received from a counter reset interface 222 of the heat exchanger cleaner apparatus 200 (e.g., a button) and/or from a remote computing device 700 via a network communication link 702 (e.g., via network communication interface 224). If a reset is determined to be commanded at S818 (e.g., a reset signal is determined to be received at S818), at S820 the controller 210 resets the counter value to the initial counter value. If not, at S822 a further determination is made regarding whether the threshold determined to be reached at S814 is a final depletion threshold (e.g., 12) that indicates complete depletion (e.g., final depletion) of cleaning composition 230 in the heat exchanger cleaner apparatus 200.

If a final depletion threshold is not reached at S822 (S822=NO, e.g., a partial depletion threshold of 11 was determined to be reached at S814), then at S828 the controller 210 may cause a command signal may be generated and/or transmitted from the heat exchanger cleaner apparatus 200 to a remote computing device 700 via network communication link 702 (e.g., based on the controller 210 controlling the network communication interface 224) which causes the remote computing device 700 to execute a purchase order of one or more new cartridges 300 to be purchased and delivered to a specific mailing address. Thus, the controller 210 may be understood to command the purchase order (e.g., purchase and/or delivery) of one or more new cartridges 300 to replace the at least partially-depleted cartridge 300 that is coupled to the heat exchanger cleaner apparatus 200 (the at least partial depletion being indicated based on S814=YES). The remote computing device 700 may store a delivery address information (e.g., information indicating a delivery mailing address) and purchase information which may be used to implement the purchase order (e.g., credit card information, bank account information, etc.). The remote computing device 700 may be configured to implement the purchase order, for example based on network communication with a remote purchase ordering service (which may be supported and/or implemented by one or more computing devices which may have a similar structure and configuration to the remote computing device 700 as illustrated and described herein), in response to receiving the signal generated and/or transmitted from the heat exchanger cleaner apparatus 200 (e.g., based on operation of the controller 210 to control the network communication interface 224) at S828. The remote computing device 700 may implement the purchase order (e.g., generate and/or transmit a command to purchase and deliver one or more new cartridges 300 to a specified mailing address which may be stored at the remote computing device and/or at the remote purchase ordering service) using the mailing address information, purchase information, or the like. Subsequent to the commanding of the purchase order at S828, the method may return to S802.

In some example embodiments, operation S828 may not be performed (e.g., may be skipped) in response to each determination of S822=NO. For example, operation S828 may be performed once in response to a first determination of S814=YES and S822=NO but may be skipped in response to subsequent determinations of S814=YES and S822=NO until a subsequent determination of S818=YES and/or performance of the resetting at S820, after which operation S828 may be performed in response to the next subsequent determination of S814=YES and S822=NO. For example, if, subsequent to performing the commanding of a purchase order at S828, the controller 210 subsequently determines that a final depletion threshold is not reached at S822 prior to a determination that a final depletion threshold is reached (e.g., determining S822=NO subsequent to performing S828 and proceeding back to S802, and prior to determining S822=YES), the operation at S828 may be skipped in response to subsequent determinations of S822=NO, and such subsequent determinations of S822=NO may proceed directly to S802 until S820 is performed in response to a determination of S818=YES. In some example embodiments the threshold counter value at S814 is one value less than the final depletion threshold value at S822 (e.g., S814=YES if the counter value is equal to or greater than 11 and S822=YES if the counter value is equal to or greater than 12), such that the operation S828 is not skipped if S814=YES and S822=NO as the next subsequent determination at S822, subsequent to an incrementing of the counter value at S812, causes the counter value to reach the final depletion threshold value (S822=YES).

If a final depletion threshold is reached at S822 (e.g., S822=YES), at S824 the controller 210 may inhibit further operation of the pump device 208 (e.g., disable the pump device 208) until a determination is made at S818 to perform a reset at S820 (e.g., until a reset signal is determined to be received at S818). Such operations at S822 and S824 may reduce or prevent the likelihood of the heat exchanger cleaner apparatus 200 continuing to operating the pump device 208 in the absence of cleaning composition 230 in the heat exchanger cleaner apparatus 200. At S824, the controller 210 may further generate another warning signal indicating that the pump device 208 is inhibited (e.g., disabled). Additionally or alternatively, such an indication may be included in the warning signal generated at S816 in response to a determination at S814 that a final threshold counter value is reached.

In some example embodiments, in response to receiving and processing a signal, from a part of the air conditioning system 100 (e.g., controller 140) and/or a remote computing device via a wired or wireless connection, to determine that the air conditioning system 100 is at least partially shut down and/or to determine that pump device 208 inhibition is commanded, the controller 210 may inhibit (e.g., disable) further operation of the pump device 208. In some example embodiments, in response to receiving and processing a signal, from a part of the air conditioning system 100 (e.g., controller 140) and/or a remote computing device via a wired or wireless connection, to determine that the air conditioning system 100 is at least partially started (e.g., initialized) and/or to determine that pump device 208 activation is commanded, the controller 210 may activate (e.g., enable) further operation of the pump device 208 as shown in FIG. 8.

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. A cleaner apparatus for spraying a cleaning composition, the cleaner apparatus comprising:

an apparatus housing at least partially defining an interior of the cleaner apparatus;

a spray outlet assembly extending from the apparatus housing to an exterior of the apparatus housing, the spray outlet assembly configured to be directly exposed to an interior of a separate device;

a pump device configured to pump an amount of the cleaning composition through the spray outlet assembly such that the spray outlet assembly is configured to spray the amount of the cleaning composition as a fluid stream;

a controller configured to operate the pump device to cause the amount of the cleaning composition to be pumped through the spray outlet assembly without manual intervention; and a structure connector that is configured to connect the cleaner apparatus to an external structure to at least partially hold the cleaner apparatus in place in relation to an opening in a housing of the separate device, such that the apparatus housing of the cleaner apparatus is external to the separate device, and the spray outlet assembly is at least partially inserted into the interior of the separate device through the opening in the housing of the separate device, such that the spray outlet assembly extends from the apparatus housing external to the separate device and through the opening in the housing of the separate device to the interior of the separate device.

2. The cleaner apparatus of claim 1, wherein the spray outlet assembly includes a conduit having a proximate end and a distal end, the proximate end coupled in fluid communication with an outlet of the pump device, the conduit configured to extend at least from the proximate end and through the opening in the housing of the separate device and into the interior of the separate device such that the distal end of the conduit is within the interior of the separate device, and a spray nozzle coupled to the distal end of the conduit and configured to spray the amount of the cleaning composition as the fluid stream.

3. The cleaner apparatus of claim 2, wherein the conduit includes a plurality of structures coupled in series between the spray nozzle and the pump device.

4. The cleaner apparatus of claim 1, wherein the cleaner apparatus includes a reservoir that is in fluid communication with the pump device and is configured to hold the cleaning composition, such that the pump device is configured to receive the amount of the cleaning composition from the reservoir and to pump the amount of the cleaning composition received from the reservoir through the spray outlet assembly.

5. The cleaner apparatus of claim 1, wherein the controller is configured to operate the pump device to cause the amount of the cleaning composition to be pumped through the spray outlet assembly in response to an elapse of a particular period of time.

6. The cleaner apparatus of claim 5, wherein the controller is configured to repeatedly operate the pump device at a fixed time interval that is the particular period of time, based on monitoring a timer that increments a timer value at a fixed frequency, operating the pump device to cause the amount of the cleaning composition to be pumped through the spray outlet assembly in response to the timer value reaching a particular time value corresponding to the elapse of the particular period of time, and resetting the timer value to an initial timer value in response to operating the pump device.

7. The cleaner apparatus of claim 6, wherein the controller is configured to monitor a counter that increments a counter value in response to each operation of the pump device by the controller to cause the amount of the cleaning composition to be pumped through the spray outlet assembly, and generate a depletion signal in response to the counter value reaching a particular counter value.

8. The cleaner apparatus of claim 7, wherein the controller is configured to cause the counter value to be reset to an initial counter value in response to receiving a reset signal.

9. The cleaner apparatus of claim 8, further comprising:

a network communication interface that is configured to establish a network communication link with a remote computing device, wherein the controller is configured to perform at least one of causing the depletion signal to be transmitted to the remote computing device via the network communication link, or causing the counter value to be reset to the initial counter value in response to receiving the reset signal from the remote computing device via the network communication link.

10. The cleaner apparatus of claim 1, further comprising:

a network communication interface that is configured to establish a network communication link with a remote computing device, wherein the controller is configured to operate the pump device to cause the amount of the cleaning composition to be pumped through the spray outlet assembly in response to a pumping command signal received from the remote computing device via the network communication link.

11. The cleaner apparatus of claim 1, further comprising:

a connector interface configured to detachably couple with a complementary connector interface of a cartridge having a cartridge reservoir configured to hold the cleaning composition, to establish flow communication between the cartridge reservoir and the pump device, such that the pump device is in fluid communication between the connector interface and the spray outlet assembly, and the pump device is configured to be operated to pump the amount of the cleaning composition from the cartridge reservoir and through the spray outlet assembly.

12. The cleaner apparatus of claim 1, wherein the structure connector is configured to detachably connect the cleaner apparatus to the separate device, such that the spray outlet assembly is reversibly at least partially inserted into the interior of the separate device through the opening in the housing based on the structure connector detachably connecting the cleaner apparatus to the separate device.

13. The cleaner apparatus of claim 1, wherein the structure connector is configured to connect the cleaner apparatus to the separate device to at least partially structurally support the cleaner apparatus in relation to the opening in the housing of the separate device.

14. The cleaner apparatus of claim 1, wherein the structure connector includes an adhesive material configured to adhere to a surface of the external structure.

15. The cleaner apparatus of claim 1, wherein the structure connector is configured to connect the cleaner apparatus to an outer surface of the housing of the separate device.

16. A method for operating the cleaner apparatus of claim 1, the method comprising:

controlling the pump device of the cleaner apparatus to cause an amount of cleaning composition to be pumped through the spray outlet assembly without manual intervention.

17. The method of claim 16, further comprising:

operating the pump device in response to an elapse of a particular period of time.

18. The method of claim 17, further comprising:

repeatedly operating the pump device at a fixed time interval that is the particular period of time, based on monitoring a timer that increments a timer value at a fixed frequency, operating the pump device in response to the timer value reaching a particular time value corresponding to the elapse of the particular period of time, and resetting the timer value to an initial timer value in response to operating the pump device.

19. The method of claim 18, further comprising:

monitoring a counter that increments a counter value in response to each operation of the pump device, and generating a depletion signal in response to the counter value reaching a particular counter value.

20. A system, comprising:

an air conditioning system, the air conditioning system including an air handler; and the cleaner apparatus of claim 1, the structure connector of the cleaner apparatus coupling the cleaner apparatus to an external structure to at least partially hold the cleaner apparatus in place in relation to an opening in a housing of the air handler, such that the apparatus housing of the cleaner apparatus is external to the air handler, the spray outlet assembly is at least partially inserted into the interior of the air handler through the opening in the housing of the air handler, such that the spray outlet assembly extends from the apparatus housing external to the air handler and through the opening in the housing of the separate device to the interior of the air handler, and the controller of the cleaner apparatus is configured to operate the pump device to cause the amount of the cleaning composition to be pumped through the spray outlet assembly and into the interior of the air handler without manual intervention.

* * * * *